(12) United States Patent
Rouhi et al.

(10) Patent No.: US 7,353,274 B1
(45) Date of Patent: Apr. 1, 2008

(54) METHOD, APPARATUS, AND SYSTEM FOR DETERMINING WHETHER A COMPUTER IS WITHIN A PARTICULAR LOCATION

(75) Inventors: Adam G. Rouhi, Pacific Palisades, CA (US); Ramin Ron Rouhi, Pacific Palisades, CA (US)

(73) Assignee: Medisys/RJB Consulting, Inc., Pacific Palisades, CA (US)

( * ) Notice: Subject to any disclaimer, the term of this patent is extended or adjusted under 35 U.S.C. 154(b) by 0 days.

(21) Appl. No.: 09/568,568

(22) Filed: May 9, 2000

(51) Int. Cl.
*G06F 15/173* (2006.01)
(52) U.S. Cl. .............. 709/225; 709/227; 709/228; 463/16; 463/17; 463/41; 463/42; 705/14; 379/88.2; 379/88.17; 379/88.19; 379/93.13
(58) Field of Classification Search ............... 709/225, 709/200, 217, 219; 379/88.17, 88.21, 142.02, 379/142.1, 201.02, 201.07, 210.02, 265.01, 379/265.09, 88.13, 212.01, 142.11, 142.04; 340/5.74, 5.8, 426.1; 713/192
See application file for complete search history.

(56) References Cited

U.S. PATENT DOCUMENTS

| | | | | |
|---|---|---|---|---|
| 4,992,783 A | * | 2/1991 | Zdunek et al. ............. | 340/5.74 |
| 5,646,839 A | * | 7/1997 | Katz ..................... | 379/142.11 |
| 5,796,810 A | * | 8/1998 | Lim et al. ............... | 379/142.02 |
| 5,889,866 A | * | 3/1999 | Cyras et al. ................ | 713/192 |
| 6,024,641 A | * | 2/2000 | Sarno ........................... | 463/17 |
| 6,198,812 B1 | * | 3/2001 | Weber .................... | 379/142.04 |
| 6,277,026 B1 | * | 8/2001 | Archer ........................ | 463/42 |
| 6,300,863 B1 | * | 10/2001 | Cotichini et al. ............ | 340/5.8 |
| 6,322,446 B1 | * | 11/2001 | Yacenda ...................... | 463/16 |

OTHER PUBLICATIONS

Website www.allfreelotto.com, record created on May 25, 1999, Email-Lotto, 20 Forest Ave. # 100, Fond du lac. WI 54395.*
Website www.email-lotto.com, Email-lotto, 20 Forest Ave. #100, Fond du lac, WI 54395.*

* cited by examiner

*Primary Examiner*—Yves Dalencourt
(74) *Attorney, Agent, or Firm*—Adeli Law Group

(57) ABSTRACT

Some embodiments provide a method of determining whether a lottery player or the player's computer is within a particular location. The player's computer is connected to a computer network. The method transmits, through the computer network, a pass code and a telephone number to the lottery player's computer. The method requests the lottery player or the player's computer to call the number and provide the pass code within a pre-determined amount of time. The method determines whether the pass code is provided within a predetermined amount of time after the transmission of the pass code from a telephone specified to be within the particular location. The method verifies whether the lottery player or player's computer is within the particular location, based on the determination.

17 Claims, 32 Drawing Sheets

Item Tables item_table
- item_id
- store_id
- forum_id
- game_id
- item_description
- item_lt_allowed item_address_table
- item_id
- item_street
- item_city
- item_state
- item_zip
- item_zip_+4
- item_country
- item_phone
- item_last_name
- item_first_name item_property_table
- item_id
- item_free
- item_property_class
- item_property_icon
- item_property_image
- item_property_audio
- item_property_video
- item_property_language
- item_property_location (x,y)
- item_property_vmsg_language
- item_property_vmsg_audio_message
- item_property_vmsg_video_message

*FIGURE 17*

METHOD, APPARATUS, AND SYSTEM FOR DETERMINING WHETHER A COMPUTER IS WITHIN A PARTICULAR LOCATION

BACKGROUND OF THE INVENTION

The Internet is a global interconnection of computer networks that share a common set of protocols. Most computers that connect to the Internet use the well-known Transport Control Protocol layer and the Internet Protocol layer for data communication. The combination of the Transport Control Protocol (TCP) and the Internet Protocol (IP) are commonly referred to as TCP/IP. By sharing a set of nonproprietary well-defined data communication protocols, the Internet allows almost any computer system to communicate with any other computer system.

Sets of higher-level application protocols use the TCP/IP layers for lower communication. Some of the better-known Internet application protocols include file transfer protocol (FTP), the network news protocol (NNTP), and the simple mail transport protocol (SMTP) for file transfer, discussion groups, and email, respectively.

One particular Internet application protocol, the HyperText Transport Protocol (HTTP) has become the dominant application protocol. The HyperText Transport Protocol (HTTP) was created for sharing HyperText Markup Language (HTML) documents. HyperText Markup Language (HTML) documents may include rich multi-media elements such as text, images, audio, and video.

The HTTP protocol and the HTML document format enabled the creation of simple to use but media rich documents that could easily be "browsed." By linking together HTML documents located on various servers throughout the world using embedded hyperlinks, a "World Wide Web" (WWW) of interconnected hypertext documents was created. Due to the simple, yet powerful nature of HTML and HTTP, the World Wide Web (WWW) portion of the Internet has become the most well known form of Internet communication.

The WWW has quickly become a new mass media system for information distribution. New media companies have created thousands of news, sports, entertainment, and special interest web sites. Commercial web sites have also been created to perform financial transactions.

Commercial activity that is performed electronically over a computer network (such as the Internet) is commonly referred to as electronic commerce ("e-commerce"). E-commerce involves a unique set of parameters that distinguish it from ordinary storefront based commerce. With e-commerce, a transaction can take place between a consumer and a merchant that are at distant locations at the time of the transaction. Furthermore, the computers used for electronic commerce may perform a number of functions to facilitate the transaction. For example, the computer systems may be used to search databases for a particular item, determine availability of items, and calculate the cost of items.

The Internet has transformed e-commerce, particularly the retail industry, due to its convenience, reliability and increased security. Internet based commerce has been growing at an exponential rate during the late 1990s. For example, e-commerce sales increased by several hundred percent in 1999.

Despite the enormous popularity and growth in e-commerce, the technology available for e-commerce is still in its infancy. For instance, many of the technologies used today for performing advertising and marketing for e-commerce are relatively crude. Currently, e-commerce consumers primarily encounter passive electronic marketing and advertising in the form of countless banner advertisements ("banner ads").

These "banner ads" are generally of poor aesthetic quality, offer limited or "teaser" information, and serve only as a "click-on" entry to other web site that feature the advertised product. In addition, banner ads lack reliable measurability. Unless a consumer actually clicks on the banner ad, it is difficult to measure the effectiveness of the advertisement or the extent of the consumer's interaction with the subject product.

Traditional e-commerce advertising and marketing efforts often fail to distinguish companies and their products, due to the speed, volume, and non-interactivity of traditional e-commerce advertisements. Existing electronic marketing methodologies also fail to develop brand imaging. Current e-commerce marketing methodologies also fail to collect useful information regarding consumer habits and to measure advertising responses, likes and dislikes of products, and the effectiveness of advertisements reaching consumers.

Therefore, there is a need in the art for new methods that efficiently and effectively capture consumer attention, and thereby allow e-commerce merchants to effectively advertise and sell their products. Ideally, such methods should generate brand imaging and collect consumer information. The collected behavioral information can then be used to target consumers continually with advertising and products that specifically match their unique interests. Such methods should also ideally entertain consumers to best capture their attention.

SUMMARY OF THE INVENTION

The invention is directed to methods, apparatuses, and systems for recording user interactions with an electronic information distribution system. The invention is also directed to methods, apparatuses, and systems for entertaining users of an electronic information distribution system. The invention is further directed to methods, apparatuses, and systems for presenting three-dimensional shopping destinations through an electronic information distribution system. The invention is also directed to methods, apparatuses, and systems for purchasing lottery through an electronic information distribution system.

Some embodiments of the invention include a computer system that through the Internet presents electronic game shows and electronic shops. The computer system encourages users to browse the electronic shops when they cannot register for a particular game show and have to wait for the next game show. When it is time to register for the next game show, the computer system then gauges each user's past interactions in the electronic shops to determine the order for inviting users to register for the game show.

In some embodiments of the invention, the computer system presents three-dimensional electronic shopping scenes through the Internet. Such shopping scenes can be malls, stores, or departments within stores. In some embodiments, the three-dimensional shopping scenes include several selectable and non-selectable objects.

The three-dimensional shopping scenes are displayed on a computer display device of a shopper that contacts the computer system through the Internet. The shopper can browse the three-dimensional shopping scene by selecting the selectable objects in the scene. The shopper can select a selectable object through a cursor-control operation, such as a click operation of a cursor controller (like a mouse or a touch-pad). Also, in some embodiments, the computer system automatically generates a click operation when the shopper maintains the cursor over a selectable object for more than a first threshold period.

In some embodiments, the computer system records the shopper's cursor-control operations (such as click or auto-click operations) in order to collect information about the shopper's interests and activities. Some embodiments also detect when the shopper maintains the cursor over a selectable object for more than a second threshold period, which is less than the first threshold period. These embodiments then record this detected cursor operation, which indicates the shopper's passive viewing of a selectable object.

In addition, some embodiments of the invention use a computer system to allow an individual to purchase lottery through the Internet. State lottery sales are often restricted to individuals who are physically located in the state at the time of purchase of the lottery tickets. To ensure that only individuals who are physically located within the state can purchase the state's lottery, some embodiments provide to each prospective lottery player a code and a telephone number through the Internet. These embodiments ask the player or the player's computer to call the number and supply the code within a pre-specified time interval. The player or the player's computer can supply the code by verbally stating or dialing the code, or using other mechanisms to convey the code once the telephone session has been successfully established. In these embodiments, the player or the player's computer cannot provide the pass code when the telephone number is dialed from outside of the state. For instance, in some embodiments, the computer system or the telephone company rejects calls to the telephone number from outside of the state.

BRIEF DESCRIPTION OF THE DRAWINGS

The novel features of the invention are set forth in the appended claims. However, for purpose of explanation, several embodiments of the invention are set forth in the following figures.

FIG. 17 illustrates item tables of the computer system.

DETAILED DESCRIPTION OF THE INVENTION

The invention is directed to methods, apparatuses, and systems for recording user interactions with an electronic information distribution system. The invention is also directed to methods, apparatuses, and systems for entertaining users of an electronic information distribution system. The invention is further directed to methods, apparatuses, and systems for presenting three-dimensional shopping destinations through an electronic information distribution system. The invention is also directed to methods, apparatuses, and systems for purchasing lottery through an electronic information distribution system.

In the following description, well-known structures and devices are shown in block diagram form in order not to obscure the description of the invention with unnecessary detail. In other instances, numerous details are set forth for purpose of explanation. However, one of ordinary skill in the art will realize that the invention may be practiced without the use of these specific details. For example, the invention is described below by reference to the Internet, the World Wide Web (WWW) and technology related to the Internet and the WWW. However, the same techniques can easily be applied to other types of electronic information distribution systems. For instance, the invention can be applied to computer networks that use other data communication protocols and/or use next generation Internet protocols.

Some embodiments of the invention include a computer system that presents electronic game shows through the Internet. This computer system also presents a number of electronic shops over the Internet. In some embodiments, the system presents the shops in form of an electronic shopping mall. Also, in some embodiments, the computer system sells or facilitates the sale of lottery through the Internet.

Figure 1:
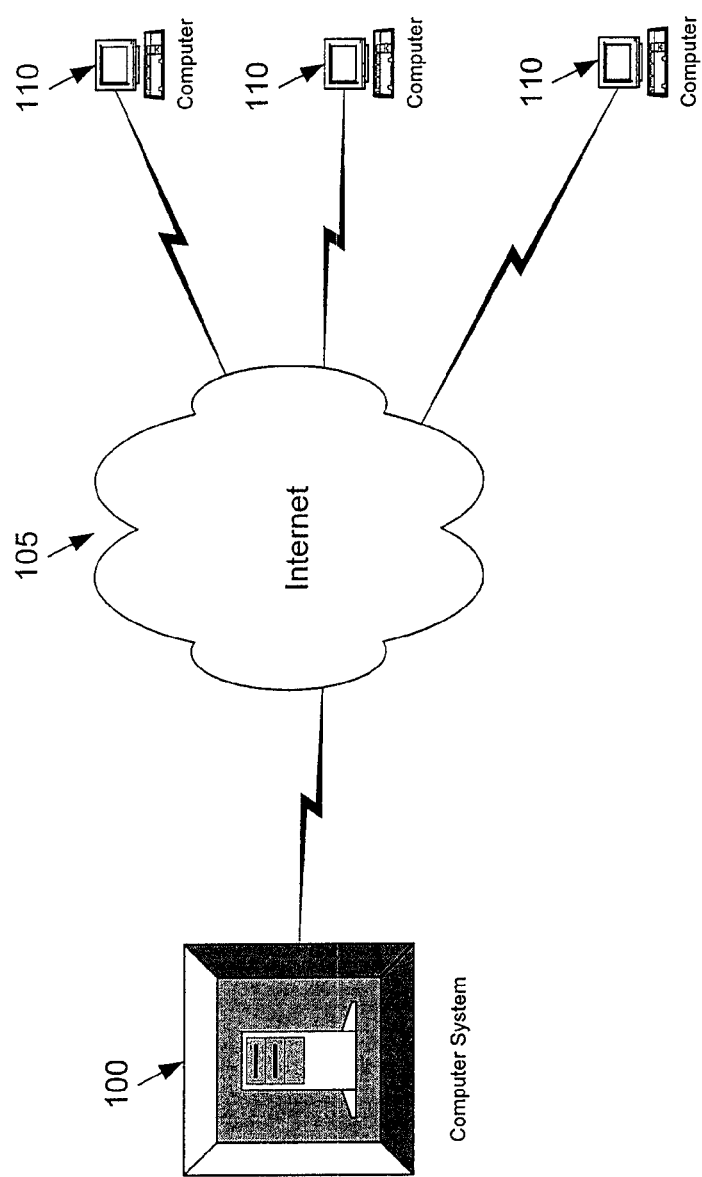
FIG. 1 illustrates a computer system that provides electronic game shows, shopping sites, and lottery through the Internet.

FIG. 1 illustrates one such computer system 100. As shown in this figure, this computer system 100 connects to the Internet 105. Hence, individuals that have computers 110 connected to the Internet can communicate with the computer system 105 through the Internet, in order to participate in interactive game shows, browse electronic shops, and purchase lottery.

Figure 30:
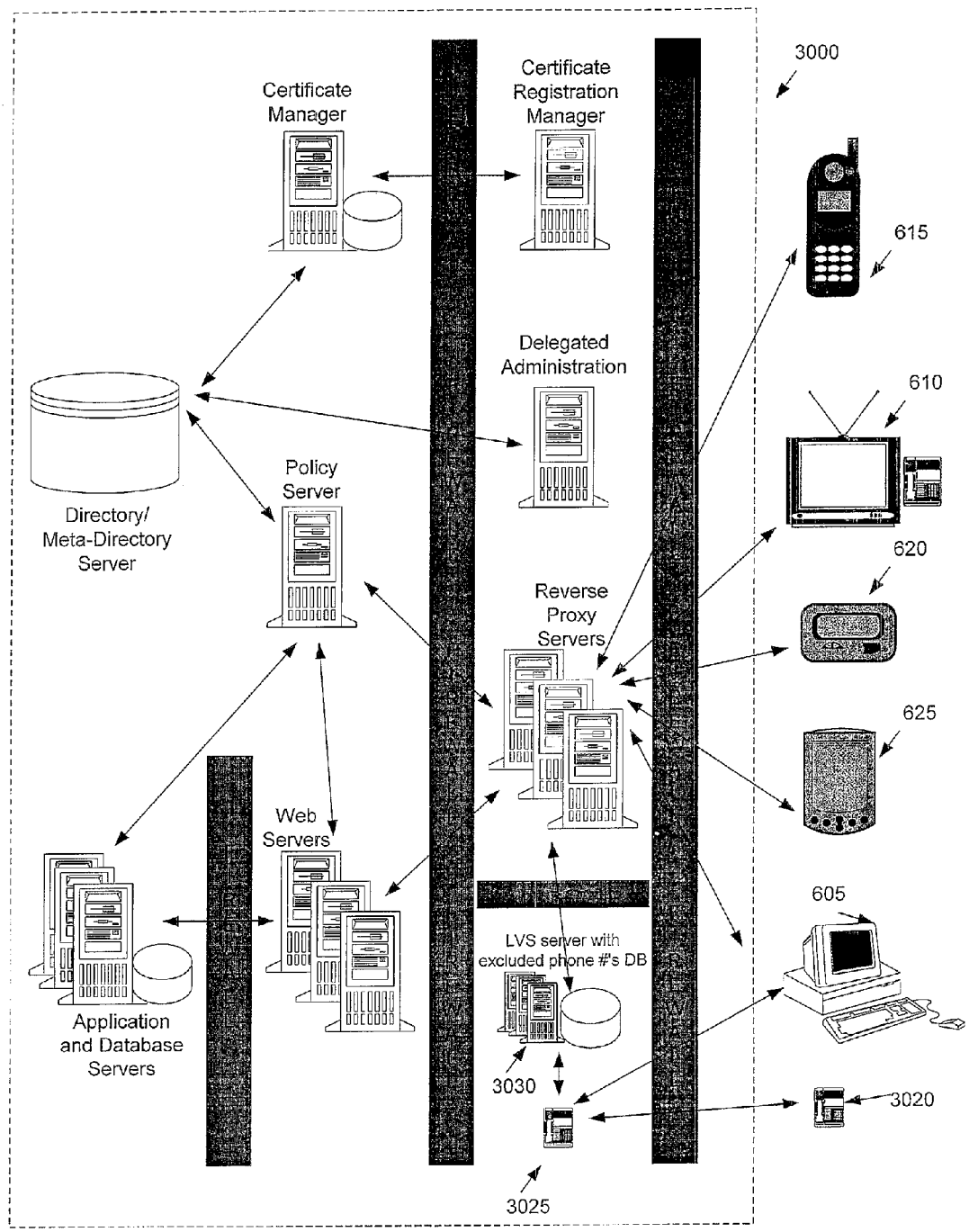
FIG. 30 illustrates an architectural diagram for a computer system that can verify the location of a user who interacts with the computer system.
Figure 31:
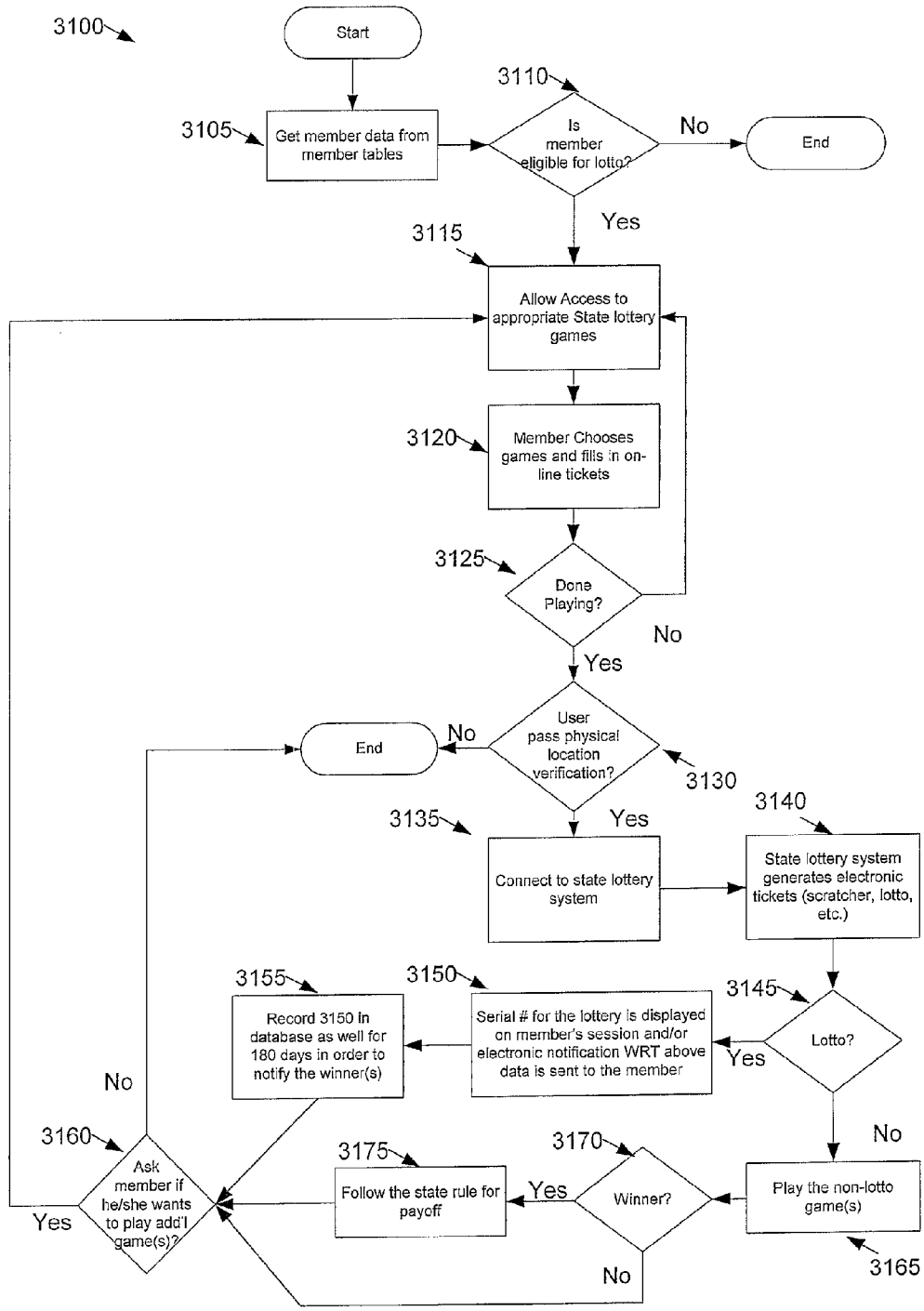
FIG. 31 illustrates a process that the computer system performs to allow a member to purchase a state's lottery through the Internet.

The computer system 100 is further described below by reference to FIGS. 2-31. FIGS. 2-5 illustrate the interactions between the computer system 100 and individuals who interact with this system through the Internet. FIGS. 6-17 illustrate more detailed diagrams of the hardware and software components of the computer system 100. FIGS. 18-22 illustrate the processes performed by the computer system 100 to present game shows. FIGS. 23-29 present the software components and processes used by the computer system 100 to facilitate a user's browsing though its shopping sites. Finally, FIGS. 30-31 illustrate the process for purchasing lottery through the computer system.

I. Interactive Flow.

For some embodiments of the invention, FIGS. 2-5 present conceptual block diagrams that illustrate the interactions between the computer system 100 and users who wish to participate in the game shows or browse the shops offered by the system. In some embodiments of the invention, each block in these figures corresponds to one or more web pages presented to the users.

Figure 2:
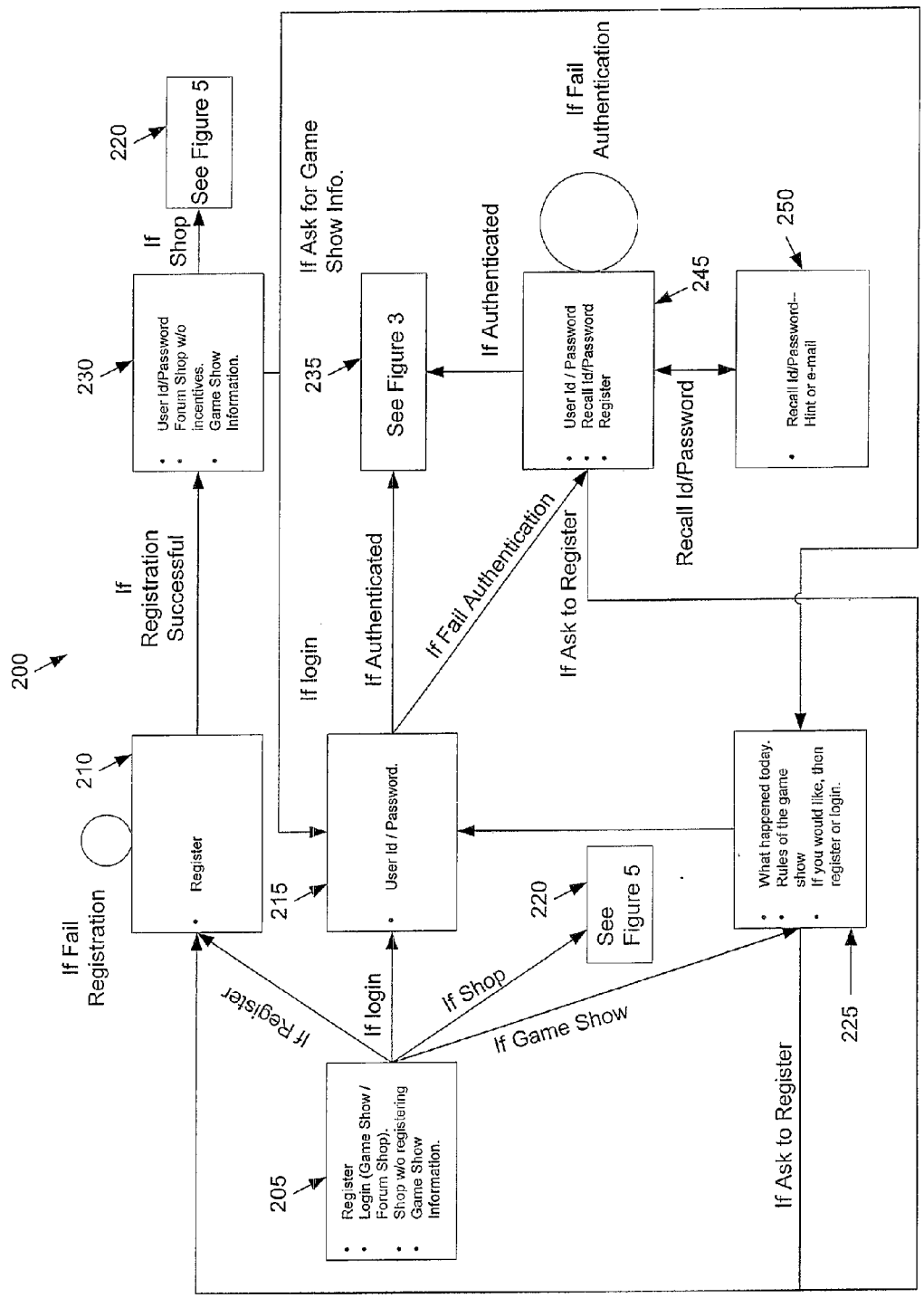
FIGS. 2-5 illustrate the interactions between the computer system of FIG. 1 and individuals who interact with this system through the Internet.

As shown in FIG. 2, after a user contacts the computer system, the system prompts (at 205) the user to either (1) register as a new user, (2) login as an existing member, (3) enter the forum shops without logging in or registering, or (4) receive information about game shows. If the user elects (at 205) to register, the system presents (at 210) the user with a registration form to fill out. Some embodiments require the user to provide his or her age and address as part of the registration process. These embodiments use the age and/or address information to determine which game shows to allow the user to participate. If the user provides an incorrect address or age at this stage, the user can later be disqualified from receiving a prize that a game show awards.

If the user fills out (at 210) the registration form incorrectly, the computer system asks the user to fill out the registration form again. If the user successfully registers as a new member, the system then prompts (at 230) the user to either (1) login as an existing member, (2) enter the forum shops without logging in or registering, or (3) receive information about game shows.

If the user decides (at 205 or 230) to login as an existing member, the system prompts (at 215) the user to supply his or her user identification and password. Even though some embodiments of the invention requires the members to manually login, one of ordinary skill will understand that other embodiments might allow the members to login automatically. For instance, some of these embodiments register certificates on each member's computer that enable the computer system 100 to recognize and login each member automatically. Other embodiments, on the other hand, use a combination of manual and automatic login techniques to authenticate members when the members first access the computer system.

If the user enters (at 215) the correct identification and password, the computer system then allows (at 235) the user to interact with its game show and shopping applications (i.e., to browse its game show and shopping sites) as an authenticated member. The flow of interactions between the user and the game show applications will be explained below by reference to FIGS. 3-4, while the flow of interactions between the user and the shopping applications will be explained below by reference to FIG. 5.

When the users browse the game show and shopping sites as authenticated members, the system can keep track of their browsing activities, and reward these members for their browsing of the system's web sites. For instance, the system can reward members who repeatedly browse the game show and forum shopping sites, by providing them with better estimates of when the members can register for game shows. Alternative embodiments might even provide their V.I.P members (i.e., the members who repeatedly browse the game show and forum shopping sites) the exact time intervals for registering for game shows.

In addition, some embodiments of the system reward frequent shoppers by providing them with credit towards purchases through the system's shops. In some embodiments, the system also rewards its shoppers by placing free items in its stores, and awarding these items to the shoppers when they select these items for browsing.

If the user fails (at 215) to enter the correct identification and password, the system (at 245) allows the user to try to login again. The system stays at 245 if the user repeatedly fails to login. From 245, the system also allows users to receive (at 250) hints about their passwords or to register (at 210) as new users.

If the user decides (at 205 or 230) to enter the forum shops without registering, the system allows (at 220) the user to enter the forum shop sites as an unauthenticated member. While an unauthenticated user interacts with the forum shop sites, some embodiments of the system gauge the user's interactions and try to entice the user to become a registered member by showing the user the amount of credit he or she would have gained. In some embodiments, the system tracks the interactions of unauthenticated users by their session identification, which can be mapped to their IP addresses.

If the user decides (at 205) to review game show information, the system provides (at 225) the user with a variety of information regarding the game shows. For instance, the system can tell the user about the prizes offered or awarded that day, or about the rules of the various game shows. At this point, the system can also provide the user with the option of registering as a new user or logging in an as existing member. If the user decides to login, the system prompts (at 215) the user to supply his or her user identification and password. Alternatively, if the user elects (at 225) to register, the system presents the user (at 210) with a registration form to fill out.

Figure 3:
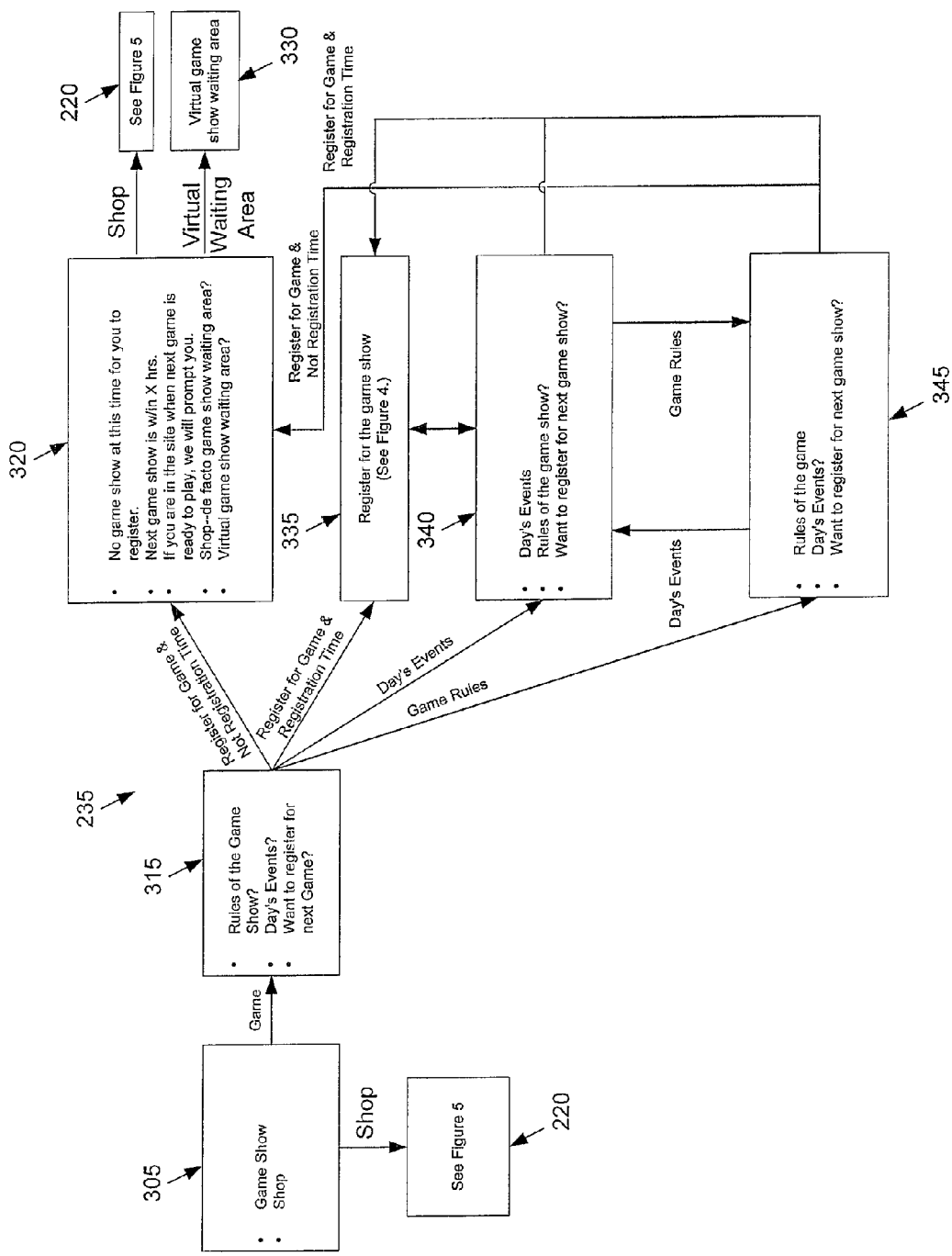

FIG. 3 illustrates the flow of interactions between the computer system 100 and an authenticated member. Once a user is authenticated (at 215) as a member, the system provides (at 305) the member with the opportunity to check on the game shows or browse through its shops. If the member elects (at 305) to browse through the shops, the system allows (at 220) the user to interact with its shopping applications. The flow of this interaction is described below by reference to FIG. 5.

On the other hand, if the member elects (at 305) to check on the game shows (i.e., to interact with the game show applications), the system provides (at 315) the member with several options to select. For instance, in the embodiment shown in FIG. 3, the member can (1) examine the rules of the game show, (2) examine the events of the day, or (3) register for the next game show.

If the member asks (at 315 or at 340, which is described below) to review the game show rules, the system provides (at 345) the member with these rules, and also allows the user to check on the events of that day or to register for a game show. Alternatively, if the member asks (at 315 or 345) to check on the events of that day, the system informs (at 340) the member about the events of that day (e.g., the prizes offered on that day), and then allows the user to review the game show rules or to register for game show.

If the member asks (at 315, 340, 345) to register for the next game show, the system has to determine whether the user can register for the game show. In the embodiments that have different game shows that run concurrently or consecutively, the system can allow the member to select which particular game show he or she wishes to play. In these embodiments, the system would then check on the registration time of the next requested game show. Alternatively, in some embodiments, the system might not provide the user with the option of selecting which game show he or she wishes to play, and instead might simply check on the availability of the next game show.

If it is not time to register for the next game show, the system informs (at 320) the member that he or she cannot register for the next game show. The system also provides the member with a range of time during which the member can register for the next game show. As further discussed below, in some embodiments, this range is different for different members. For instance, members that repeatedly browse the system's web sites or purchase items through the system's shops, receive a smaller range than members that browse the system's sites more sporadically. This is to encourage the members to browse the system's sites and to purchase items from these sites.

The system also informs (at 320) the member that it will notify the member to register when it is time to register for the next game show, so long as the member browses the system's sites actively until it is time to register for the next game show. The system provides (at 320) the member the option of waiting for the next game show by browsing the system's shopping sites, which serve as a de facto game-show waiting area. The interactive process for browsing the shopping sites will be explained below by reference to FIG. 5.

The system 100 also provides (at 320) the member with an opportunity to wait for the game show by viewing or interactively browsing one or more sites that resemble virtual game-show waiting areas. If the member selects this option, the system presents (at 330) the member with a virtual game-show waiting area. The system can present this area as an image of the outside or inside of an auditorium, where advertisements are presented to the member.

As further described below, some embodiments of the system 100 monitor the member's browsing in de facto game-show waiting area (i.e., the shopping sites) and the virtual game-show waiting area to ensure that the member actively browses the system's sites while waiting for the next game show. Moreover, to ensure the member's active browsing further, some embodiments request the member to perform random interactive steps (e.g., clicking on randomly appearing objects) while waiting in the de facto and/or virtual waiting areas. In some embodiments, the system preferentially treats members that actively browse the system's sites while waiting for game shows. This preferential treatment can take the form of an earlier notice of the registration time to the more active members.

Figure 4:
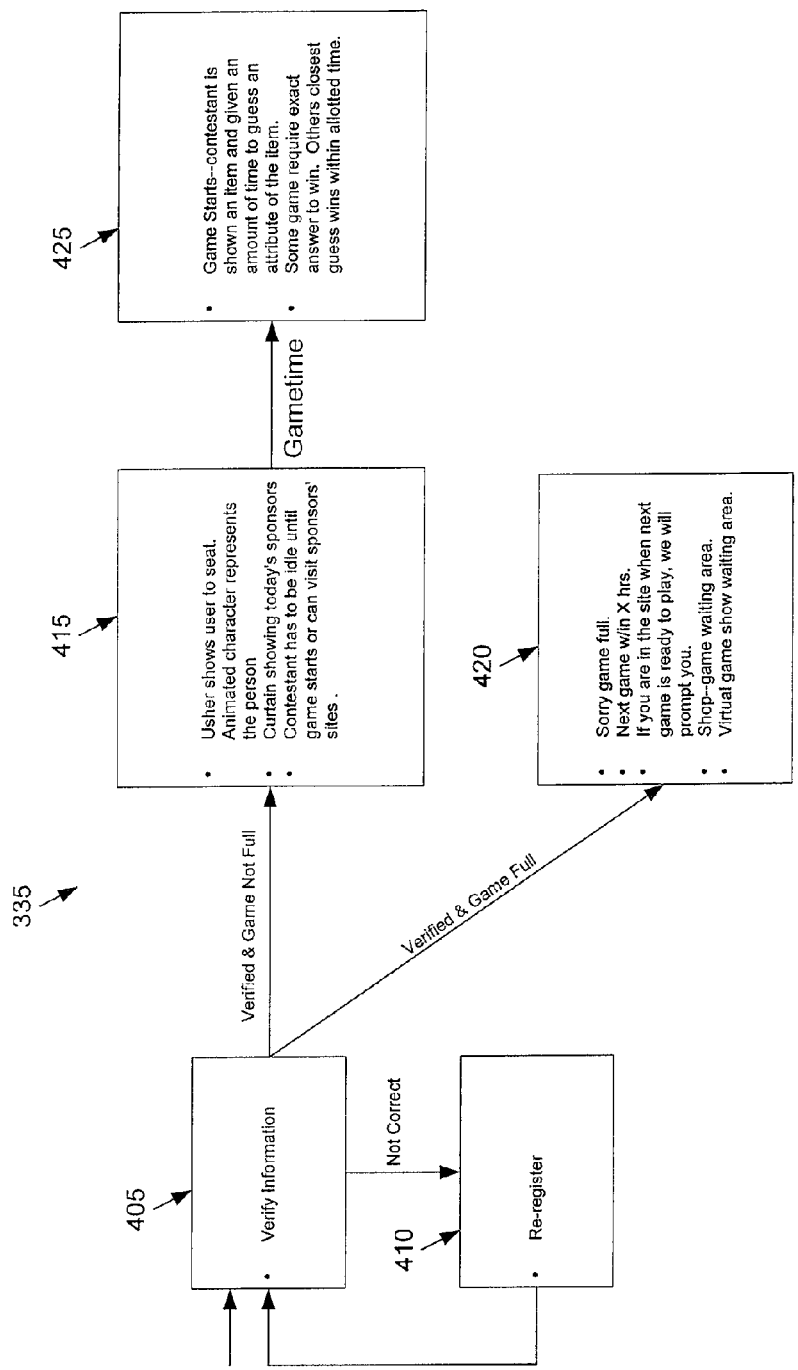

If the system determines (at 315, 340, or 345) that it is time to register for the next game show, the system initiates a registration process 335. FIG. 4 illustrates the interactive flow for this process. As shown in this figure, the system requests (at 405) that the member verify information (such as age, address, etc.) that the system has about the member. If the information is not accurate, the system requires (at 410) the member to re-register, and then requires (at 405) the member to verify information submitted during the re-registration. It is important for the member to verify his or her information before playing a game show, because some embodiments disqualify game show winners when it is determined that they did not provide accurate information (such as age and address information). These embodiments disqualify the members in these instances, in order to encourage members to provide accurate information.

Accurate information about the members is highly valuable for a variety of reasons. For instance, such information can be used to perform demographic analysis of the members. The system can then offer a statistical analysis of all the members or a group of members to the merchants that sell items through the system's sites or place advertisements on the system's sites. The member merchants can then use this statistical analysis to determine which products to market through the site. Also, the members need to enter their age accurately since some activities provided through the system might not be suitable for certain ages. For instance, some of the game shows might not be suitable for members under eighteen or twenty-one.

Once the member verifies (at 405) that his or her information is correct, the system then needs to determine whether the maximum number of members have registered for the game show. If this maximum number has been reached (i.e., there are no more seats in the requested game show), the system informs (at 420) the member that the game show is full and there's no more room for additional contestants.

At this stage, the system also provides the member with a range of time during which the member can register for the next game show. As mentioned above, the size of this range depends on the member's browsing history. Members that repeatedly browse the sites offered by the system or purchase items through the system receive smaller ranges than members who browse the system's sites more sporadically. The system also informs the member that it will notify the member to register for the next game show, so long as the member browses the system's sites actively until it is time to register for the next game show. As before, the member can wait for the next game show in either the virtual or de facto game-show waiting areas.

On the other hand, if the system determines that the maximum number of members have not registered for the game show, the system allows (at 415) the member to be a contestant for the next-game show. Some embodiments display a virtual waiting area to the member, while the member is waiting for the game show to start. A variety of Web pages can simulate the virtual waiting area.

For instance, some embodiments display an animated usher that seats an animated virtual member (corresponding to the admitted member) in seats in an auditorium. In some embodiments, an advertisement is displayed on the usher's uniform. The auditorium seats face a curtain that conceals the pending game show. While the curtain is down, the names of that day's sponsoring merchants appear on the face of the curtain.

While waiting for the game show to start, some embodiments allow contestants to click on the sponsors to visit the merchants' Web sites to familiarize themselves with the merchants' products. This will enable contestants to prepare for the game show, which requires specific knowledge regarding the sponsoring merchants' products. The more a contestant has knowledge of the merchants sponsored products, the higher the contestant's chances of winning.

Other embodiments remove items from the system's sites a predetermined amount of time before the start of the game show, in order to encourage would-be contestants to repeatedly check the system's sites. Some of these embodiments require the contestants to stay idle in the auditorium so that they pay attention to the advertisements presented on the curtain. Also, some embodiments have mechanisms to assure that the contestant view these advertisements while they are waiting for the game show to start. For instance, some embodiments might require the contestants to click on icons that randomly appear on random locations on the curtain, in order to show that they are viewing the Web page of the game-show waiting area.

The system starts (at 425) the game show when the game show time is reached. In some embodiments, the system starts the game show by raising the curtain in the game-show auditorium. The system can offer a variety of game shows (such as name my price, scavenger hunt, Wheel of Fortune®, Jeopardy®, etc.). In the embodiment illustrated in FIG. 4, the game show presents contestants with an item (e.g., a product or a service), and asks the contestants to guess one or more attributes of the item. For instance, the game show might require the contestants to guess the item's name, price, or manufacturer. Alternatively, the game show might require the contestants to identify the location of the item in the shops of the system.

In some embodiments, the item featured in a game show is an item from one of the shops in the system's shopping mall. A contestant's success in a particular game show depends on his or her knowledge of the featured item. By featuring merchant items sold through the system's sites, the system allows its merchants to develop brand imaging of their products. After all, the success of the contestants depends on their knowledge of the merchants' items. Consequently, the game shows serve as an effective marketing tool to promote merchant products. This approach to brand imaging is ultimately more effective than traditional approaches.

After the contestants are shown (at 425) an item, some embodiments require the contestants to provide the requested answer within a predetermined amount of time. In some embodiments, the contestant who answers the question first is awarded the specific prize offered in the game show. Some embodiments identify the contestant who answered first as the contestant whose answer the system received first. Other embodiments store cookies on the contestants' desktop, and these cookies time stamp the contestants' response.

Some embodiments of the invention require the winning contestant to produce documentation to verify the information that the member submitted during the registration process and during the verification process at 405. Winning contestants who cannot submit documentation to verify their information are disqualified. This is to again encourage members to provide accurate demographic information about themselves.

If no contestant answers the question correctly, some embodiments award the prize to the contestant who provided the answer closest to the correct question. Other embodiments do not award any prize when none of the contestants correctly answer the question. Some embodiments give credit towards purchases in the forum shops to some or all (e.g., the first and second runner-ups) of the losing contestants. The amount of this credit can be based upon the frequency of their interactions with the system's sites.

Figure 5:
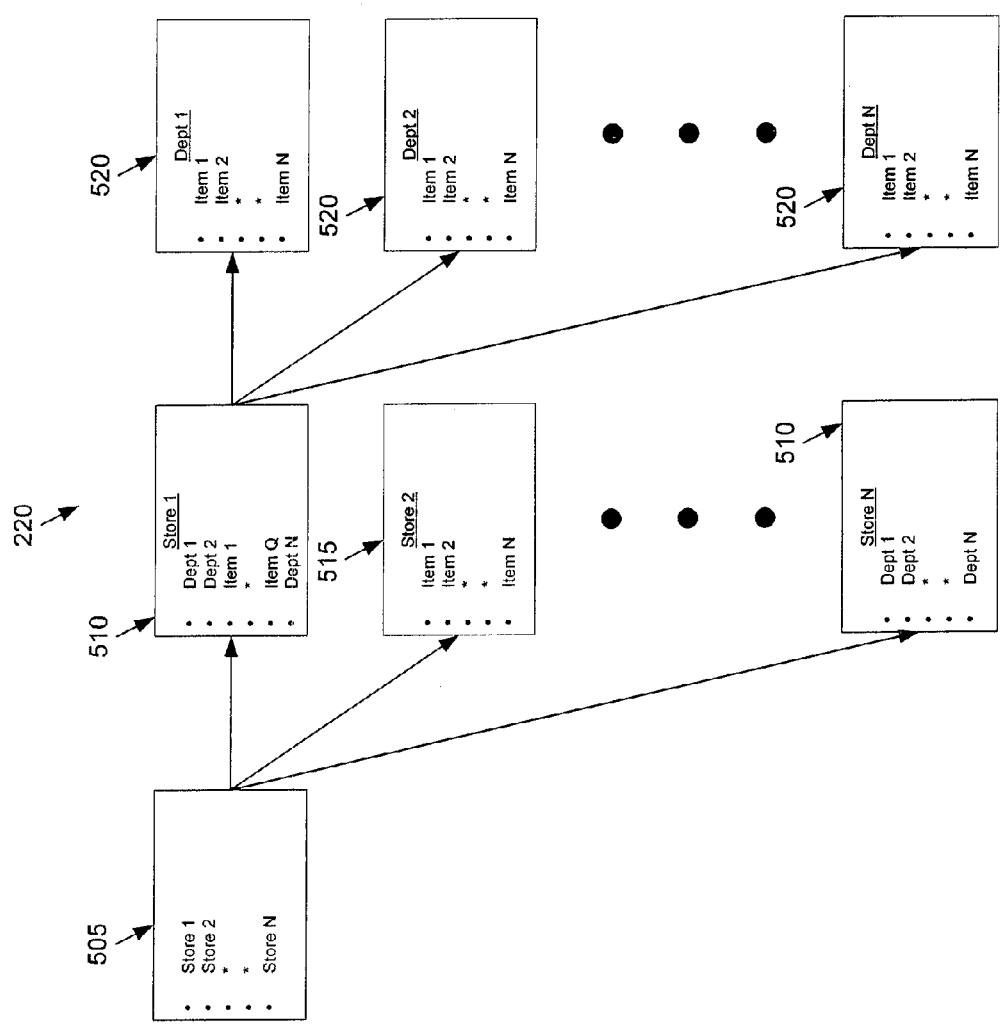

For some embodiments of the invention, FIG. 5 illustrates the flow of interactions between the computer system 100 and a user who wishes to browse the system's shopping sites. As shown in this figure, some embodiments initially require (at 505) the user to select a particular store or item in a forum shop site. As further described below by reference to FIGS. 23-29, some embodiments present the forum shop site to the user as a three-dimensional image of a shopping mall. Some embodiments also present a three-dimensional graphical image for each store in the shopping mall and each department within each store.

Once the user selects a store, the user has to select (at 510) a department within that store if that stores has a number of departments or an item within the store if the store has items outside of the departments. If the user selects a department, the user has to select (at 520) an item within the department. Alternatively, for stores that are not divided into departments, the user can simply select (at 515) an item within the store directly.

Some embodiments of the invention use an interactive virtual sales force to provide sales presentations, answer questions of the shoppers, and/or entice shoppers to purchase items. In some of these embodiments, the computer system presents virtual sales people in a graphical format to the shoppers. These virtual sales people can be the animated representation of actual sales people who interact with the shoppers through the computer system. Alternatively, the virtual sales people can be controlled solely by the computer system.

In some embodiments, the consumers provide specific information to the animated sales force regarding their shopping preferences. Based on this information, the virtual sales force then offers the consumers merchandise that matches their specifications and provide specific information about the desired products. The animated sales force can also offer comparison-shopping. To do this, the animated sales force can use a search engine to find the lowest available price for the desired item.

In some embodiments, the interactive virtual sales force constantly communicates with the system's merchants in order to facilitate sales transactions. For example, after a consumer views a particular item in a merchant's store, a virtual salesperson can communicate between the consumer and the merchant in order to negotiate a discount. If the consumer decides not to purchase an item after interacting with the virtual sales force, the system at a later time notifies the consumer of sales or discounts for that item. The system can so notify the consumer at the consumer's next visit or through a private-invitation e-mail, similar to a private sale announcement at a walk-in store.

Some embodiments also use the interactive sales force to give away free items that are hidden in the system's shops. For instance, in some embodiments, an interactive salesperson might appear as a shopper browses an item that has been secretly designated as a free item. The interactive salesperson then provides a sales pitch about the merchant or the item. At the end of the sales pitch, the shopper is informed that he or she has received the item for free. If the shopper terminates the presentation before it is completed, the shopper will be disqualified from receiving the item for free. This is to encourage shoppers to listen to all sales presentations in the hope of receiving a free item at the end of the presentations.

II. System Architecture.

A. Computer System.

Figure 6:
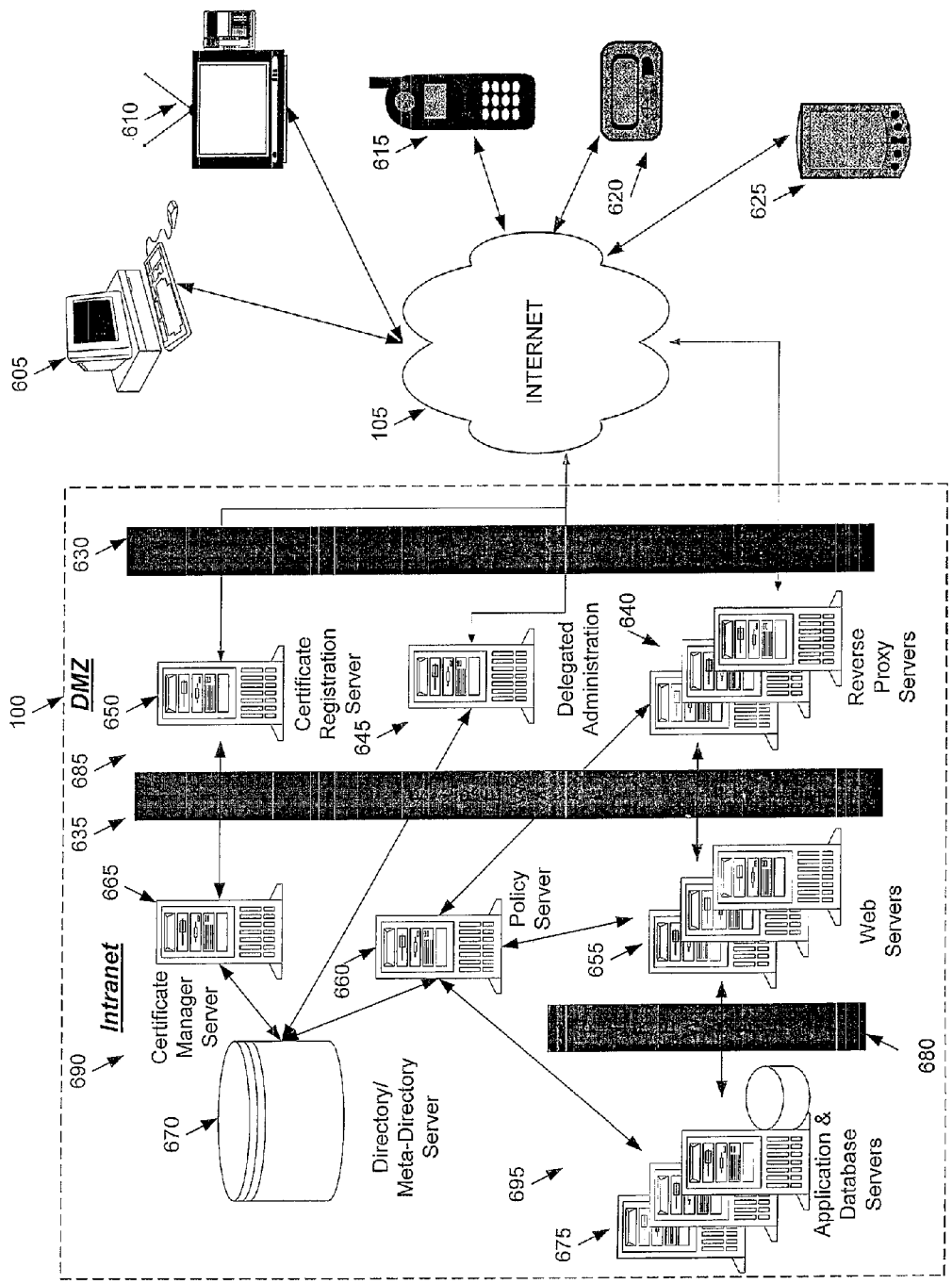
FIG. 6 presents a more detailed view of the computer system of FIG. 1.

FIG. 6 presents a more detailed view of the computer system 100. As shown in this figure, this computer system can be accessed through the Internet by a number of users via a variety of devices. These devices include desktop or laptop computers 605, Internet appliances 610 (such as WebTV®), mobile phones 615, pagers 620, and PDA's 625. Each of these devices might use a different protocol (such as HTTP, WAP, VAST, Palm.Net, etc.) to communicate through the Internet.

In the embodiment shown in FIG. 6, a network of servers forms the computer system. This network includes (1) firewalls 630, 635, and 680, (2) reverse proxy servers 640, (3) delegated administration server 645, (4) certificate registration server 650, (5) Web servers 655, (6) policy server 660, (7) certificate manager server 665, (8) meta-directory server 670, and (9) application and database servers 675. In the embodiment shown in FIG. 6, multiple proxy, Web, application and database servers are used to distribute the load for the various operations that the system has to perform. One of ordinary skill will realize that other embodiments of the invention can be implemented with fewer or more servers. For instance, some embodiments of the invention use one or two servers to perform all the operations of the servers shown in FIG. 6.

The firewalls are used to protect the system servers from attacks from outside the system's network. In some embodiments of the invention, each firewall is a separate server that relays to system's servers only the data packets that are clearly intended and authorized to reach these servers. As shown in FIG. 6, the firewalls 630, 635, and 680 divide the system architecture into three sections 685, 690, and 695. The first section 685 is a DMZ area, where the less mission critical servers are placed. The second section 690 is a first Intranet (i.e., the site's internal network where the more critical servers are placed). The third section 695 is a second Intranet 695 that includes the most critical servers, which in this case are the application and database servers 675.

The DMZ section 685 serves as the entry point for the system's users to access the site's internal servers. This section includes the reverse proxy servers 640, the delegated administration server 645, and the certificate registration server 650. The reverse proxy server provides a layer of security for the system's internal servers. It establishes connections (e.g., HTML sessions) between users that contact the system through the Internet and the system's Intranet servers, such as the Web and policy servers 655 and 660.

The Web servers 655 in conjunction with the application and database servers 675 provide the browsing experience to the users of the site. The application servers provide the back-end logic for formulating responses to user requests often by resorting to data stored in their databases, while the Web servers 655 are responsible for generating the Web pages that provide the front-end graphical, audio, and textual experience to the users.

The meta-directory server 670 stores information relating to the system's users. In some embodiments, these users include registered members who interact with the game-show and shopping applications of the system, and merchants who sell products through the shopping sites of the system.

The policy server 660 sets the rules for accessing and modifying user profiles that meta-directory server 670 stores. The other servers (such as the Web and applications servers) at times need to retrieve the user profile from the meta-directory through the policy server, in order to determine the response to a user request or provide a certain presentation to a user.

For instance, in some embodiments, the policy server is used to register new members and log in (i.e., authenticate) existing members. These embodiments require users to login before they can engage in certain interactions with the system (e.g., before they can participate in game shows). For some embodiments, the registration process is as follows. The policy server receives a request from the Web server to register a new member. Based on the nature of the request, the policy server asks the Web server to generate a particular HTML page for the user to fill out. Once the user fills out this form, the Web server receives the user's information through the proxy server. The Web server passes this information to the policy server, which records the information in the meta-directory server.

In some embodiments, the authentication process is as follows. Through the proxy server, the Web server receives a request from an existing member to login. The Web server generates a particular HTML page for the user to fill out. Once the user submits his or her identification and password, the Web server receives the user's information through the proxy server. The Web server passes this information to the policy server, which checks it against the information in the meta-directory server. If the submitted identification and password match the information stored in the meta-directory server, then the policy server reports the verified results to the Web server. The Web server then notifies an application server that an existing member has logged on to the system.

Other techniques can be used to register new users and authenticate existing members. Specifically, the system 100 includes the certificate registration server 650 and the certificate manager 665 to enable the users to login automatically. For this to happen, the certificate registration server 650 initially needs to store a certificate (e.g., a file or cookie) on a user's computer. The certificate manager will recognize this cookie the next time that the user accesses the site, and automatically logs in the user.

Some embodiments use a combination of manual and automatic login techniques. The policy server defines the authentication method that the system will use to login a member. It should be noted that the policy server also enables different users of the system (e.g., merchants who sell their products through the system's shopping sites) to personalize their content through access management. The policy server further allows the management of certain user groups (e.g., shoppers) to be delegated to other user groups (e.g., merchants).

The system 100 also includes the delegated administration server 645. This server handles certain administrative tasks. For instance, this server allows certain users to modify their own or other user account information in the meta-directory, in cases where the policy server allows such modification.

B. Computer Hardware Diagram.

Figure 7:
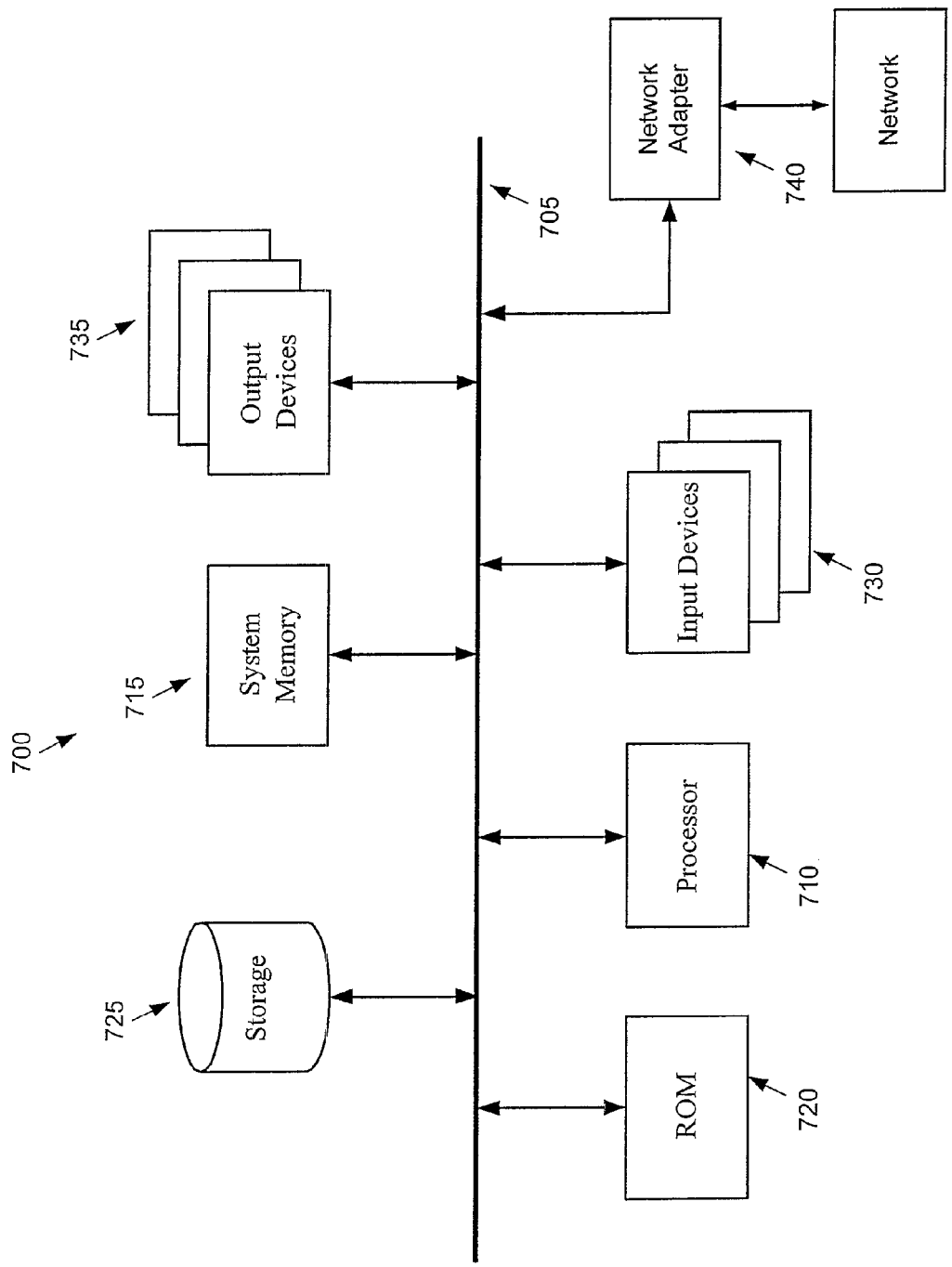
FIG. 7 presents a block diagram of a computer that can be used as a server computer or user computer of the computer system of FIG. 1.

FIG. 7 presents a block diagram of a computer 700 that can be used as a server computer of the computer system 100 or the computer of one of the system's users. This computer 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer 700. For instance, the bus 705 communicatively connects the processor 710 with the read-only memory 720, the system memory 715, and the permanent storage device 725. From these various memory units, the processor 710 retrieves instructions to execute and data to process.

The read-only-memory (ROM) 720 stores static data and instructions that are needed by the processor 710 and other modules of the computer. The permanent storage device 725, on the other hand, is read-and-write memory device. This device is a non-volatile memory unit that stores instruction and data even when the computer 700 is off. Some embodiments of the invention use a mass-storage device (such as a magnetic or optical disk and its corresponding disk drive) as the permanent storage device 725. Other embodiments use a removable storage device (such as a floppy disk or Zip® disk, and its corresponding disk drive) as the permanent storage device.

Like the permanent storage device 725, the system memory 715 is a read-and-write memory device. However, unlike storage device 725, the system memory is a volatile read-and-write memory, such as a random access memory. The system memory, the permanent storage device 725, and/or the read-only memory 720 store the instructions and data that are necessary for carrying out the invention. The stored instruction and data then direct the operations of the processor 710.

The bus 705 also connects to the input and output devices 730 and 735. The input devices enable the user to communicate information and select commands to the computer. The input devices 730 include an alphanumeric keyboard and a cursor-controller (such as a mouse or a touch-pad). The output devices 735 display images generated by the computer. The output devices include printers and display devices, such as cathode ray tubes (CRT) or liquid crystal displays (LCD). Through an output display device, a user can browse the Web pages generated by the computer system 100.

Finally, as shown in FIG. 7, bus 705 also couples to a network adapter 740. The network adapter connects the computer 700 to a network of computers (such as a local area network ("LAN"), a wide area network ("WAN"), or an Intranet) or a network of networks (such as the Internet). In embodiments that use computer 700 as a user's computer, the computer can receive the information transmitted by the system through the Internet via the network adapter 740 (e.g., a network card or a modem). In the embodiments that use computer 700 as a server computer of the system, the network adapter 740 connects the server computer 700 to other server computers of the system 100. One of ordinary skill in the art will appreciate that other embodiments of the invention use computers that have different configurations and/or components than those of the computer 700 of FIG. 7.

C. Application and Database Servers.

Figure 8:
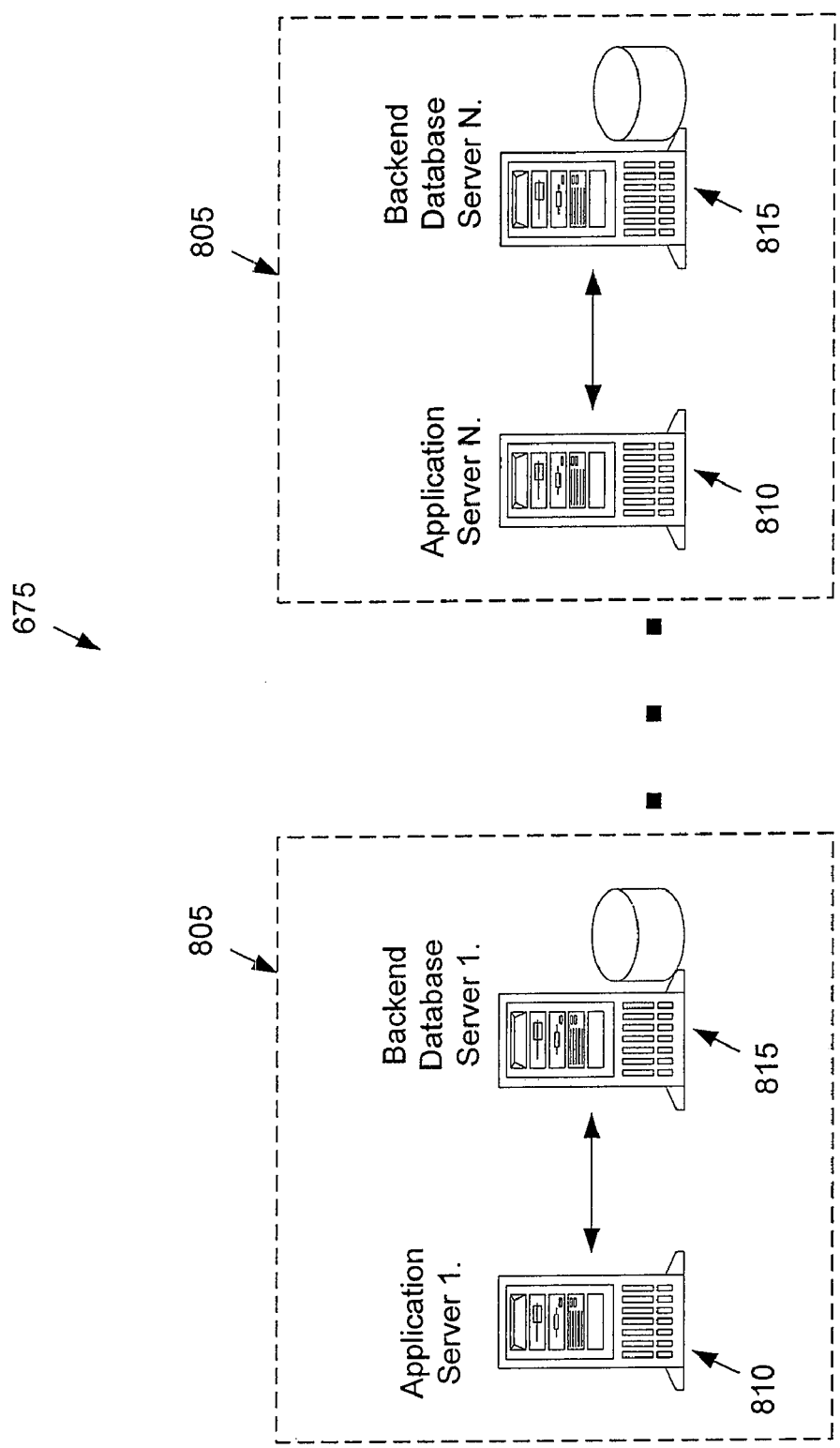
FIG. 8 illustrates N pairs of application and database servers used by the computer system.

As shown in FIG. 6, some embodiments of the invention use multiple application and database servers 675 to distribute the load for the various applications that the computer system runs. FIG. 8 illustrates N pairs 805 of application and database servers. The application server 810 of each pair 805 runs one of the applications hosted by the system. For instance, some embodiments have numerous game-show and forum-shop application servers for the various game shows and forum shops that are hosted by the system. Also, the database server 815 of each pair stores the data that its corresponding application server 810 needs.

Figure 9:
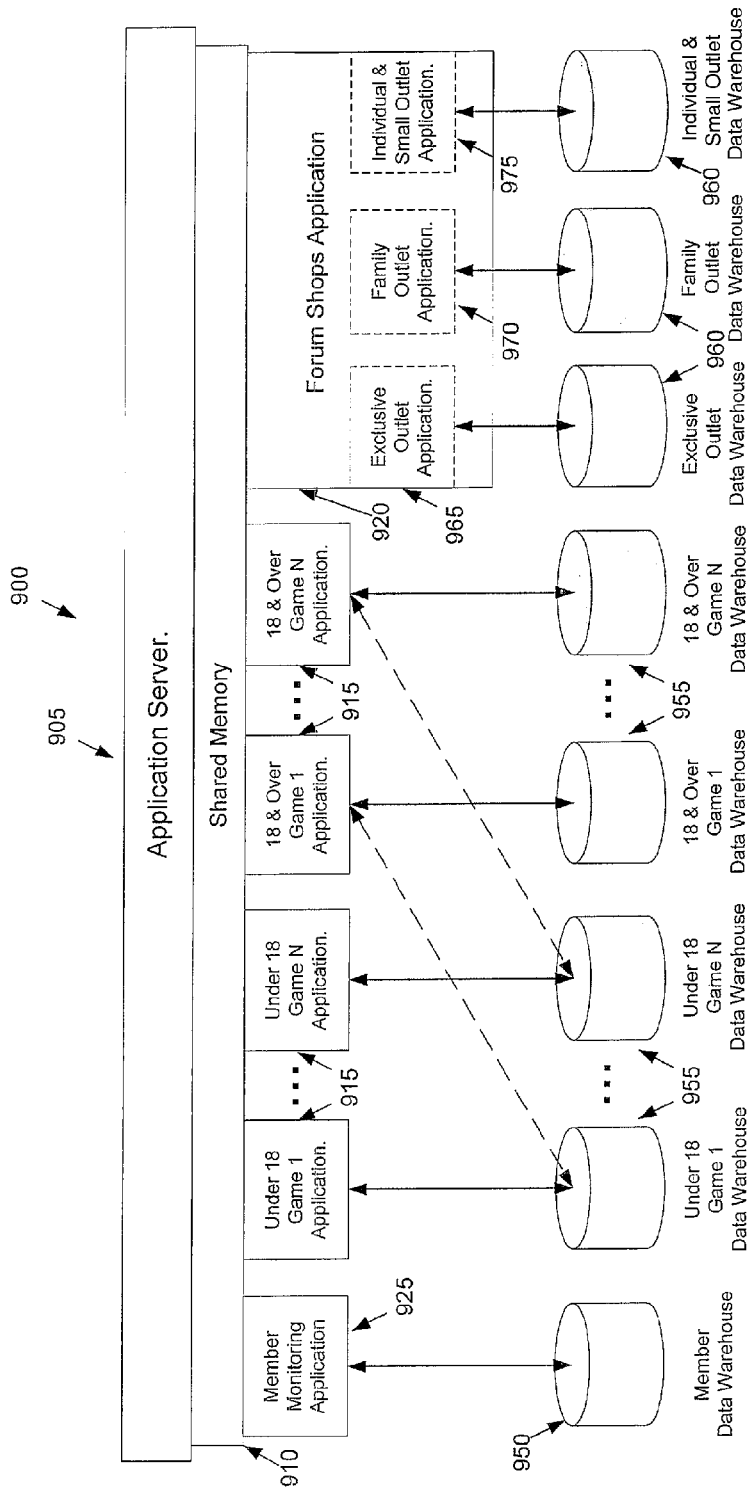
FIG. 9 illustrates the software architecture of the application and database servers that are used in some embodiments of the invention.

FIG. 9 illustrates the software architecture 900 of the application and database servers 675 that are used in some embodiments of the invention. As shown in this figure, the software architecture 900 includes (1) application server software 905, (2) a shared memory 910, (3) several game show applications 915, (4) several shopping applications 920, (5) several databases 955 and 960 for the game show and shopping applications, (6) a member monitoring application 925, and (7) a database 950 for the member monitoring application.

Some embodiments of the invention use the Netscape application server ("NAS") software as the application server 905. In these embodiments, the NAS software provides the foundation layer on top of which the game show, shopping, and monitoring applications are built. This foundation layer serves as an interface between the game show, shopping, and monitoring applications and the Web servers (which in some embodiments are the Netscape enterprise servers). This layer also enables fast and efficient real-time transactions between the various underlying applications through native API's.

The underlying game show, shopping, and monitoring applications write, read, and update data in the shared memory 910 in order to communicate. For instance, as further discussed below, some embodiments use the shared memory 910 to allow the various applications to keep track of authenticated members who have logged in to the system.

The game show applications 915 are responsible for (1) communicating with the users regarding the game shows, and (2) hosting the game shows. Each game show application 915 has a corresponding database 955 associated with it. FIG. 9 illustrates two sets of game shows, one for members older than eighteen and one for members younger than eighteen. This architecture is used because certain game shows might not be suitable for members under eighteen.

FIG. 9 also illustrates several forum shop applications 965, 970, and 975 that interact with the users to provide items for review and purchase through the computer system 100. The exclusive-outlet application 965 presents individual shops that offer high-end items. The family-outlet application 970 presents shops that carry a wide range of merchandise from different manufacturers including national name brands. The small outlet application presents items from smaller merchants that do not have the brand recognition of items from larger merchants. Each of these applications also has a corresponding database 960 associated with it. The database for each application stores information about the shops offered by each outlet application, and the items, prices, sale force, etc. for each of these shops.

FIG. 9 also illustrates a member monitoring application 925. This application is in charge of keeping member data. Such member data includes a list of all authenticated members who are browsing the site at any given moment. The member monitoring application also notifies the other applications when an authenticated member enters their application.

Specifically, when the system 100 authenticates a user, a Web server 655 notifies the member monitoring application 925 that an authenticated member has contacted the system 100. The monitoring application then creates a session record for the authenticated member in the shared memory. This session record contains the member's identification and a time-stamp that indicates the time of the last interaction between the member and the system. In some embodiments, this record also includes the location of the member in the system (i.e., the application that last interacted with the member).

If a member then decides to engage a game-show or shopping application, the monitoring application (1) updates the session record in the shared memory to indicate the new location of the member and the time of the request, and (2) informs (through an API) the game show or shopping application about the member's request. The requested application then has to update the member's session record in the shared memory so long as the member is actively interacting with it.

Each time a member switches from one application to another, the new application is notified of the location of the member's session record in the shared memory, so that the new application can update this record in the shared memory. In some embodiments, the previous application notifies the new application of this record's location in the shared memory. In other embodiments, the monitoring application notifies the new application. In yet other embodiments, the new application determines the location for the member's record in the shared memory from the member's unique ID.

The monitoring application periodically checks the shared memory to delete all session records of the inactive members (i.e., all the members whose session records expired as they did not actively interact with the system's applications). The monitoring application also stores information about the member's interactions with the system in its database. To illustrate this point, FIG. 10 presents a more specific example of the monitoring application.

Figure 10:
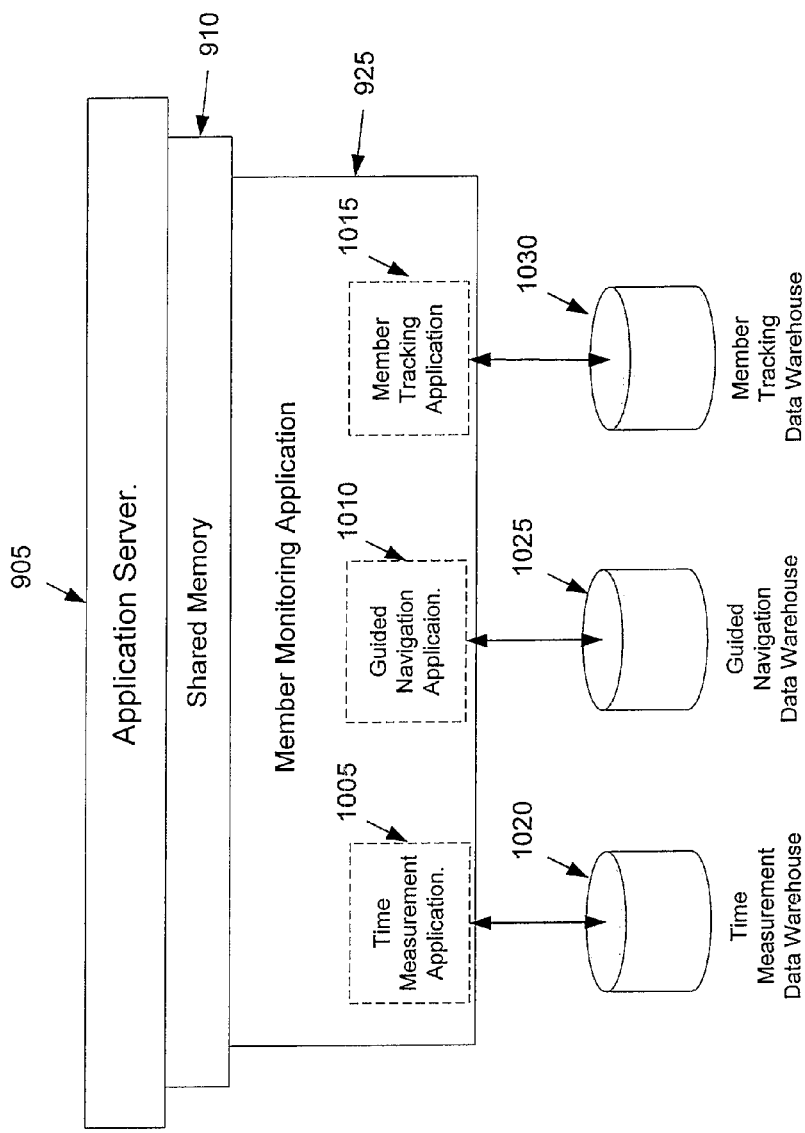
FIG. 10 presents an example of a member-monitoring application of the computer system.

As shown in FIG. 10, some embodiments of the invention use a monitoring application 925 that includes three sub-applications. These applications are the time-measurement application 1005, the guided navigation application 1010, and member-tracking application 1015. Each of these applications has a corresponding database 1020, 1025, and 1030.

The member tracking application 1015 creates and deletes the session records for authenticated members, as described above. The member tracking application also maintains certain member statistical information, which will be described below by reference to FIG. 11.

The time-measurement and interactive navigation applications 1005 and 1010 also maintain statistical information about members. Specifically, these two applications maintain statistical information about member interactions with selectable objects that some embodiments of the invention present to the system's users. For instance, some embodiments present three-dimensional shopping malls that include selectable and non-selectable objects. As further described below, in some embodiments, a selectable object is a type of screen image that the user can select through a cursor-control operation (such as a mouse-button click or auto-click operation, as described below) in order to obtain additional information regarding the selectable image. In some embodiments, the system 100 also presents selectable objects to the users of its game-show applications. For instance, the system 100 might (1) present selectable graphical icons to aspiring game-show contestants while they wait to register for a game show, and (2) ask the aspiring contestants to select the icons to indicate their active participation.

The time-measurement application 1005 records in its database 1020 the time that the members spend on selectable objects that the computer system presents to its members. This application also tracks the total session time for a member. The interactive navigation application also maintains certain statistical information about member interactions with selectable objects, as further described below by reference to FIG. 12.

In addition, the interactive navigation application 1010 retrieves from and records in its database 1025 attribute information about the selectable objects that the computer system presents to its members. The interactive navigation application also controls the system's virtual multilingual sales force. This sales force provides detailed information relating to a specific product in response to a consumer's identified preferences and/or request. These audio and video presentations take place in a variety of languages. Items, stores, and all other objects benefit from this technology by being presented in different languages.

III. Data Tables.

The data tables of the system's databases will now be described for some embodiments of the invention. One of ordinary skill in the art will understand that other embodiments of the invention use different data tables and/or different data fields in these data tables than the ones described below.

The member monitoring, game show, and shopping applications store data in and retrieve data from these data tables, in order to perform their operations. In some embodiments of the invention, these data tables are implemented in an object-oriented fashion.

Figure 11:
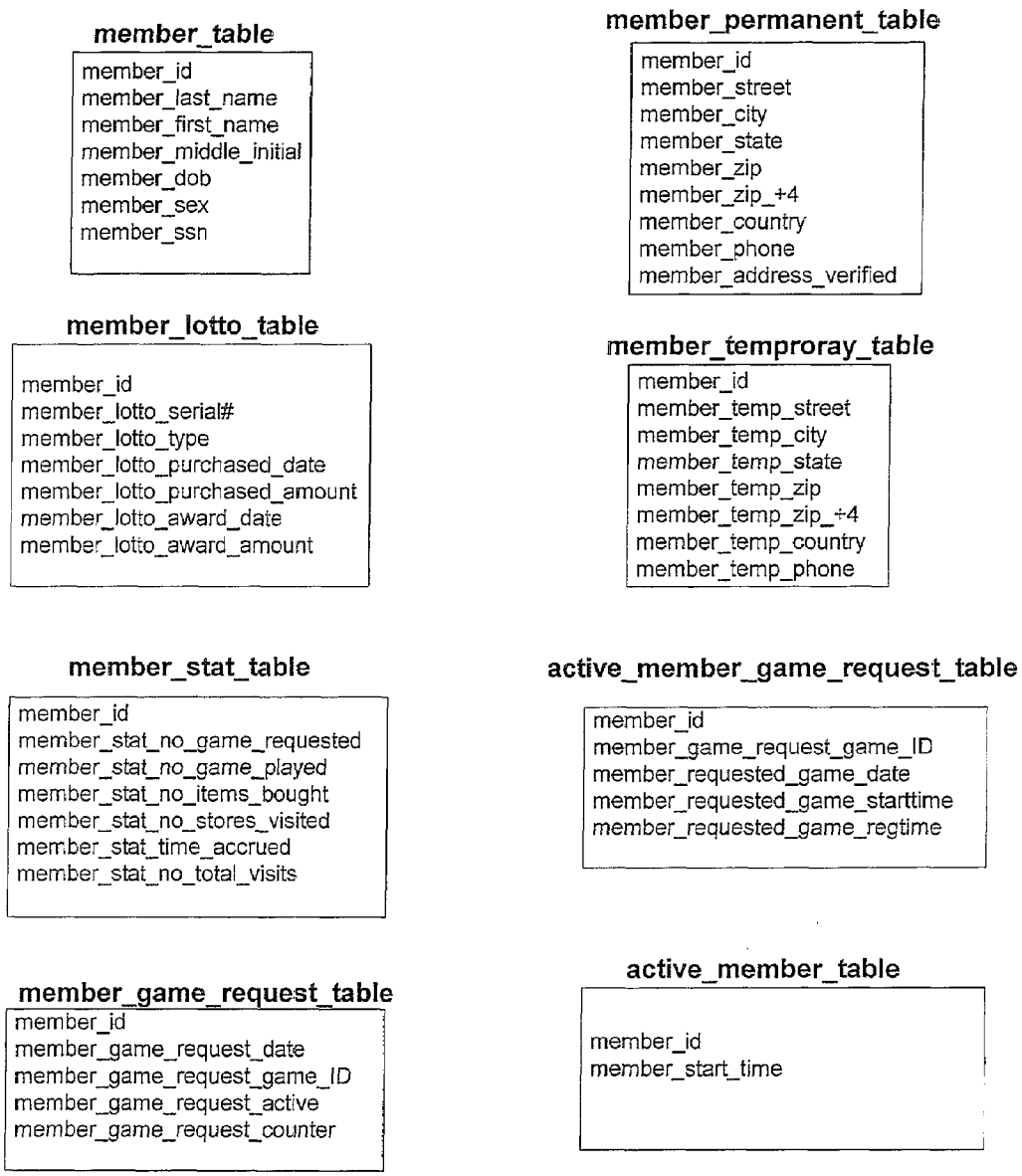
FIG. 11 illustrates the member tables that store information about the system's members.

FIG. 11 illustrates eight member tables that store information about the system's members. The eight member tables are: (1) the member_table, (2) the member_permanent_table, (3) the member_temporary_table, (4) member_lotto_table, (5) the member_stat_table, (6) the member_game_request_table, (7) the active_member_table, and (8) the active_member_game_request table.

In some embodiments, these member tables are all stored in the member-tracking database 1030. In other embodiments, only the following four tables are stored in this database: the active member_table, the active_member_game_request_table, the member_stat_table, and the member_game request_table. The remaining four tables in FIG. 11 are then stored in the meta-directory server's database.

The member tables store information regarding the system's members. Each record of a member in each of these tables includes a field called member_id. This field contains the member's internal identification and allows the system to gather and interrelate all the information about that member.

The member_table stores basic personal information regarding the members, such as a member's internal identification, first and last name, middle initial, date of birth, sex, and social security number. The member_permanent_table and member_temporary_table store the permanent and temporary address information for each member. The permanent address of the member is the member's permanent residence, whereas the temporary address is the member's location while the member is interacting with a certain application. The temporary table keeps this information because, in some embodiments of the invention, certain application (such as the lottery application) might need to record a member's precise location at the time that the member interacts with that application.

The member_permanent_table also includes a member_address_verified field, which indicates whether the system has verified the member's address independent of the information supplied by the member online. For instance, after a member wins a prize from the system, the system asks the member to supply documentation to confirm the member's address location. If the supplied documentation confirms the information supplied by the member online, the system uses the member_address_verified field to indicate this independent confirmation.

The member_lotto_table stores information about a lottery purchase of a member. Table 1 describes the purpose of the various fields in this table.

TABLE 1

| Field | Description |
| --- | --- |
| member_id | Unique ID assigned to each member. |
| member_lotto_serial # | The serial number for a particular lottery ticket. |
| member_lotto_type | The type of lottery ticket. |
| member_lotto_purchased_date | The date of purchasing the lottery ticket. |
| member_lotto_purchased_amount | The amount of the purchased lottery ticket. |
| member_lotto_award_date | The date of awarding a prize. |
| member_lotto_award_amount | The amount of the award. |

The active_member_table stores information about the active members that are interacting with the system at any given time. This table stores the identification and session start time of each active member. The active_member_game_request_table includes a record for each active member that has requested to participate in a game show that has yet to start. This record includes the member's identification as well as the requested game show's identification, date, start time, and registration time.

The member_game_request_table stores information about whether a member has asked to participate in game shows. Each time a member requests to play a game show, a record is created in this table to record the member's request. Table 2 describes the fields in this table.

TABLE 2

| Field | Description |
| --- | --- |
| member_id | Unique ID assigned to each member. |
| member_game_request_date | Date of the request. |
| member_game_request_game_id | Game show ID corresponding to an ID in the gameshow_lt_table or gameshow_gteq_table described below. |
| member_game_request_active | Indicates whether the game show registration time has passed. |
| member_game_request_counter | Indicates number of times member has checked on the start time of a game show. |

The member_stat_table stores statistical information about the member's past interactions with the system. Table 3 describes the fields in this member table.

TABLE 3

| Field | Description |
| --- | --- |
| member_id | Unique ID assigned to each member. |
| member_stat_no_game_requested | Number of times the member has requested to play. |
| member_stat_no_game_played | Number of game shows member has played. |
| member_stat_no_items_bought | Number of items purchased in forum shops. |
| member_stat_no_stores_visited | Number of stores visited in forum shops. |

TABLE 3-continued

| Field | Description |
| --- | --- |
| member_stat_time_accrued | Accrued total time member has earned while participating in a game show or visiting the forum shops. |
| member_stat_no_total_visits | Total number of logins as a member. |

Figure 12:
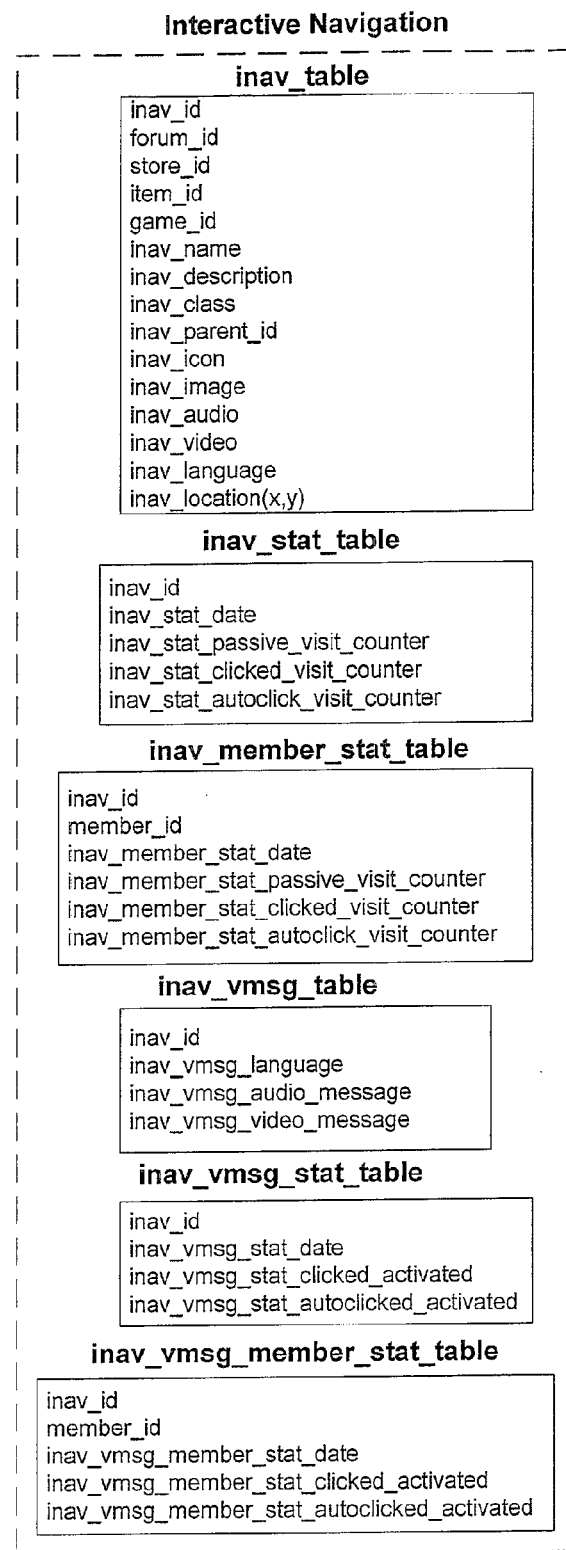
FIG. 12 illustrates interactive-navigation tables of the computer system.

FIG. 12 illustrates the interactive-navigation tables. The interactive-navigation database 1025 stores these tables, and the interactive navigation application 1010 reads from and writes to these data tables. The interactive-navigation tables store information about selectable and non-selectable objects that the system presents to its members. They also store information about the interaction between the system's members and selectable objects. In some embodiments, the interactive-navigation tables populate some of their fields (e.g., some of their attribute fields) dynamically from the game, forum, store, and item tables. Also, in some embodiments, these fields are pointer fields, and they are dynamically populated by dynamically linking them to the game, forum, store, and item tables.

Each record in the interactive-navigation tables has a field called inav_id. This field identifies the selectable and non-selectable objects corresponding to each record. Specifically, this field stores the internal identification for a selectable or non-selectable object, and thereby allows the interactive navigation application 1010 to interrelate all the information about the object.

FIG. 12 illustrates six interactive-navigation tables, which are: (1) the inav_table, (2) the inav_stat_table, (3) the inav_member_stat_table, (4) inav_vmsg_table, (5) the inav_vmsg_stat_table, and (6) the inav_vmsg_member_stat_table.

The inav_table stores the basic information (such as attribute and history information) of each selectable object of the computer system. Table 4 describes the fields in the inav_table.

TABLE 4

| Field | Description |
| --- | --- |
| inav_id | Unique ID of a selectable or non-selectable object. This ID maps to a store, forum, item or game show ID. |
| forum_id | Unique ID of the mapped forum. |
| store_id | Unique ID of the mapped store. |
| item_id | Unique ID of the mapped item in the store, forum, or game show. |
| game_id | Unique ID of game show. |
| inav_name | Name of the mapped object (forum, store, item, or game show). |
| inav_description | Description of mapped object. |
| inav_class | Indicating whether object is selectable or non-selectable. |
| inav_parent_id | ID of parent object. |
| inav_icon | Pointer to icon for the object. |
| inav_image | Pointer to image for the object. |
| inav_audio | Pointer to audio file for the object. |
| inav_video | Pointer to streaming video for the object. |
| inav_language | Language for the object. |
| inav_location(x,y) | Location of the object within a frame or browser window (e.g., location of item within store or location of store within a forum shop). In some embodiments, this location defines the position of the object with respect to the other objects that have the same parent object. Also, some |

TABLE 4-continued

| Field | Description |
|---|---|
| | embodiments set this location as a pre-defined static location, whereas other embodiments dynamically change this location. |

The inav_stat_table stores statistics for the interactions between all the members and each selectable object. Table 5 describes the fields in the inav_stat_table

TABLE 5

| Field | Description |
|---|---|
| inav_id | Unique ID of a selectable object. This ID maps to a store, forum, item or game show ID. |
| inav_stat_date | Date for the particular interaction with the selectable object. This field allows the system to analyze the interactions between the members and the selectable object on a day-by-day basis. |
| inav_stat_passive_visit_counter | Number of times the selectable object has been passively viewed on the particular date. |
| inav_stat_clicked_visit_counter | Number of times the selectable object has been viewed through a cursor-controller click (e.g., mouse-button click) operation on the particular date. |
| inav_stat_autoclick_visit_counter | Number of times the selectable object has been viewed through an auto-click operation on the particular date. |

The inav_member_stat_table stores statistics relating to the interaction of a particular member with a particular object on a particular date. Table 6 describes the fields in the inav_member_stat_table.

TABLE 6

| Field | Description |
|---|---|
| inav_id | Unique ID of the selectable object. This ID maps to a store, forum, item or game show ID. |
| member_id | Unique ID assigned to the member. |
| inav_member_stat_date | Date for the particular interaction between the particular member and the selectable object. This field allows the system to analyze the interactions between the members and the selectable object on a day-by-day basis. |
| inav_member_stat_passive_visit_counter | Number of times the member has passively viewed the selectable object on the particular date. |
| inav_member_stat_clicked_visit_counter | Number of times the member has viewed the selectable object through a click operation on the particular date. |

TABLE 6-continued

| Field | Description |
|---|---|
| inav_member_stat_autoclick_visit_counter | Number of times the member has viewed the selectable object through an auto-click operation on the particular date. |

The inav_vmsg_table stores the virtual-multilingual-sales-guide information about some or all of the selectable objects presented by the computer system. Table 7 describes the fields in the inav_vmsg_table.

TABLE 7

| Field | Description |
|---|---|
| inav_id | Unique id of the selectable object. This ID maps to a store, forum, item or game show ID. |
| inav_vmsg_language | The sales force's natural or localized language for the selectable object. |
| inav_vmsg_audio_message | The sales force's audio message for the selectable object. |
| inav_vmsg_video_message | The sales force's video message for the selectable object. |

The inav_vmsg_stat_table stores statistical information regarding the use of the virtual-multilingual-sales-guide for the selectable objects that have such a guide. Table 8 describes the fields in the inav_vmsg_table.

TABLE 8

| Field | Description |
|---|---|
| inav_id | Unique id of the selectable object. This ID maps to a store, forum, item or game show ID. |
| inav_vmsg_stat_date | Date for the member interactions with the sales force. |
| inav_vmsg_stat_clicked_activated | The number of times the sales force was activated through a click operation on the particular date. |
| inav_vmsg_stat_autoclicked_activated | The number of times the sales force was activated through an auto-click operation on the particular date |

The inav_vmsg_member_stat_table statistical information about particular member's use of the virtual-multilingual-sales-guide for the selectable objects that have such a guide. Table 9 describes the fields in the inav_vmsg_member_stat_table.

TABLE 9

| Field | Description |
|---|---|
| inav_id | Unique id of the selectable object. This ID maps to a store, forum, item or game show ID. |
| member_id | Unique ID assigned to a member. |
| inav_vmsg_member_stat_date | The date for the member's interactions with the sales force. |

TABLE 9-continued

| Field | Description |
|---|---|
| inav_vmsg_member_stat_clicked_activated | The number of times the member activated the sales force through a click operation. |
| inav_vmsg_member_stat_autoclicked_activated | The number of times the member activated the sales force through an auto-click operation. |

Figure 13:
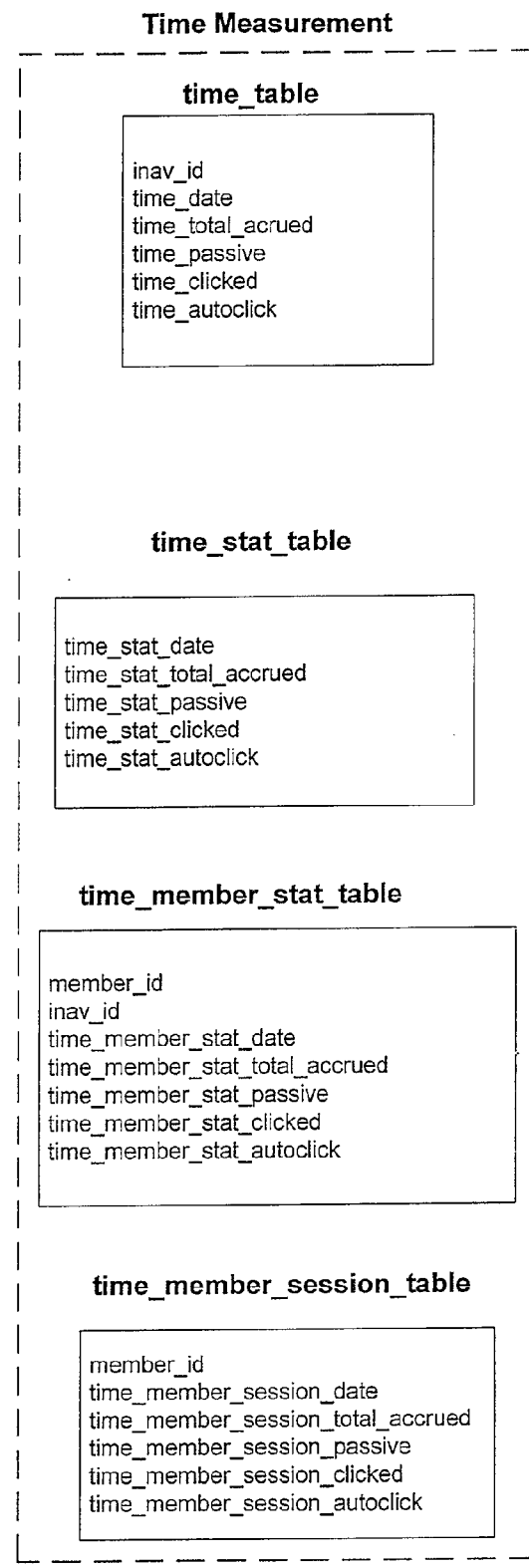
FIG. 13 illustrates time-measurement tables of the computer system.

FIG. 13 illustrates the time-measurement tables. The time-measurement database 1020 stores these tables, and the time-measurement application 1005 reads from and writes to these data tables. The time-measurement tables generally store information about how much time the members interact with the system's selectable objects and applications.

FIG. 13 illustrates four time-measurement tables, which are: (1) the time_table, (2) the time_stat_table, (3) the time_member_stat_table, and (4) time_member_session_table. The time_table stores the time spent on a particular selectable object by all members on a particular date. Table 10 describes the fields in this table.

TABLE 10

| Field | Description |
|---|---|
| inav_id | Unique ID mapping to store, forum, item, or game show ID. |
| time_date | Date for the particular interaction with the selectable object. This field allows the system to analyze the interactions between the members and the selectable object on a day-by-day basis. |
| time_total_accrued | Total time for the interactions with the particular object by all members on the particular date. |
| time_passive | Total time the members passively viewed the object on the particular date. |
| time_clicked | Total time the members select a particular object through a click operation. |
| time_autoclick | Total time the members select a particular object through a click operation. |

The time_stat_table stores the time spent on all selectable objects by all members on a particular date. Table 11 describes the fields in the time_stat_table.

TABLE 11

| Field | Description |
|---|---|
| time_stat_date | Date for a particular day. This field allows the system to analyze the interactions between the members and the selectable object on a day-by-day basis. |
| time_stat_total_accrued | Total session time for the interactions with all objects by all members on the particular date. |
| time_stat_passive | Total time spent passively viewing all objects by all members on the particular date. |
| time_stat_clicked | Total time via mouse click for all objects by all members on the particular date. |
| time_stat_autoclick | Total time via autoclick for all objects by all members on the particular date. |

The time_member_stat_table stores the time spent on a particular selectable object by a particular member on a particular date. Table 12 describes the fields in the time_member_stat_table.

TABLE 12

| Field | Description |
|---|---|
| member_id | Unique member ID |
| inav_id | Unique ID mapping to store, forum or item ID or a game show. |
| time_member_stat_date | Date for the particular interaction between the member and the selectable object. This field allows the system to analyze the interactions between the members and the selectable object on a day-by-day basis. |
| time_member_stat_total_accrued | Total time accrued on a particular object for a particular member. |
| time_member_stat_passive | Total time the member spent passively viewing the particular object. |
| time_member_stat_clicked | Total time the member spent on a particular object via mouse click. |
| time_member_stat_autoclick | Total time the member spent on a particular object via an auto-click operation. |

The time_member_session_table stores time spent by a particular member on all selectable objects during all interactive sessions between the member and the system. Table 13 describes the fields in the time_member_session_table.

TABLE 13

| Field | Description |
|---|---|
| member_id | Unique member ID. |
| time_member_session_date | Member's session date. |
| time_member_session_total_accrued | Total session time spent by a particular member on all objects. |
| time_member_session_passive | Total time the member spent passively viewing all objects. |
| time_member_session_clicked | Total click time the member spent on all the objects. |
| time_member_session_autoclick | Total auto-click time the member spent on all the objects. |

Figure 14:
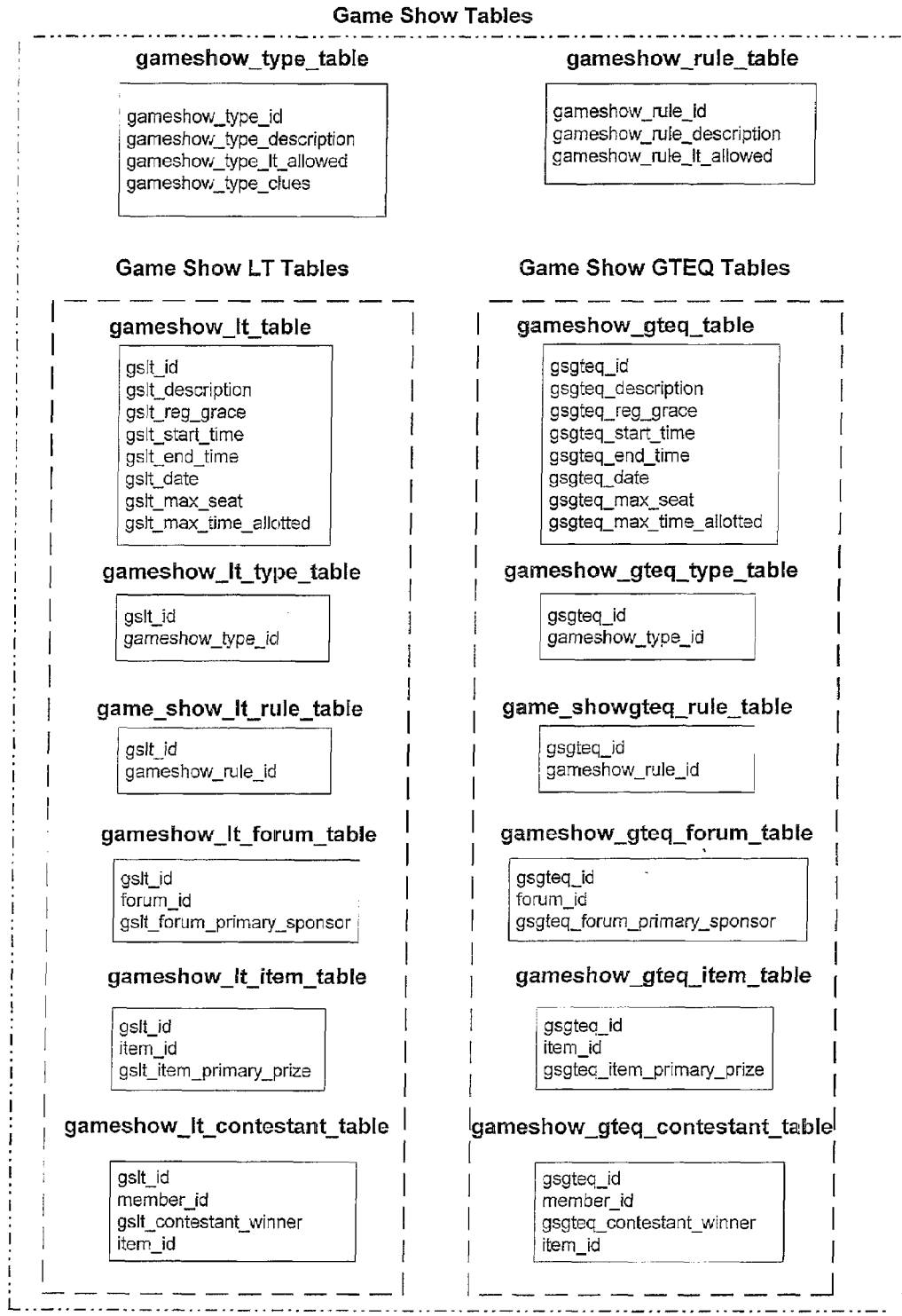
FIG. 14 illustrates game-show tables of the computer system.

FIG. 14 illustrates the game-show tables. The game-show databases 955 store these tables, and the game-show applications 915 read from and write to these data tables. The game-show tables generally store information about the game shows that the system offers.

FIG. 14 illustrates fourteen game-show tables. Two of these tables are: (1) the gameshow_type_table, and (2) the gameshow_rule_table. The gameshow_type_table provides information about game-show types, while the gameshow_rule table provides information about the game-show rules. Tables 14 and 15 describe the fields in these two tables.

TABLE 14

| Field | Description |
|---|---|
| gameshow_type_id | Unique ID of a game show type. |
| gameshow_type_description | Description of the game show. |
| gameshow_type_lt_allowed | Indicates whether a game show should be allowed to be played by members who are younger than 18. |
| gameshow_type_clues | Clues/hints for the contestants. |

TABLE 15

| Field | Description |
| --- | --- |
| gameshow_rule_id | Unique ID of a game show rule. |
| gameshow_rule_description | Description of the rules for the particular game show. |
| gameshow_rule_lt_allowed | Indicates whether a game show should be allowed to be played by members who are younger than 18. |

Of the remaining twelve tables presented in FIG. 14, six relate to game shows for members who are younger than eighteen, and six relate to game shows for members who are older than eighteen. Tables 16-21 below describe the fields in the six tables for game shows that are for members older than eighteen. The six tables for members younger than eighteen have analogous descriptions.

Table 16 corresponds to the gameshow_gteq_table in FIG. 14, and describes the attributes for a game show designed for members older than eighteen.

TABLE 16

| Field | Description |
| --- | --- |
| gsgteq_id | Unique ID of the game show. |
| gsgteq_description | Description of the game show. |
| gsgteq_reg_grace | Grace time allowed for registration. |
| gsgteq_start_time | Game show's start time. |
| gsgteq_end_time | Game show's end time. |
| gsgteq_date | The date that the game show will be aired. |
| gsgteq_max_seat | Maximum number of seats available for participants. |
| gsgteq_max_time_allotted | Maximum length of time for contestant to supply the answer. |

Table 17 corresponds to the gameshow_gteq_forum_table in FIG. 14, and describes the attributes for a game show sponsors.

TABLE 17

| Field | Description |
| --- | --- |
| gsgteq_id | Unique ID of game show. |
| forum_id | Unique ID of forum/store related to one of the game show sponsors. |
| gsgteq_forum_primary_sponsor | Game show's primary forum/store sponsor. |

Table 18 corresponds to the gameshow_gteq_item_table in FIG. 14, and describes the attributes for game show items.

TABLE 18

| Field | Description |
| --- | --- |
| gsgteq_id | Unique ID of game show. |
| item_id | Unique ID of item being offered in the game show. |
| gsgteq_item_primary_prize | Unique ID of item which is the primary prize. |

Table 19 corresponds to the gameshow_gteq_contestant_table in FIG. 14, and describes the attributes for a game show contestant.

TABLE 19

| Field | Description |
| --- | --- |
| gsgteq_id | Unique ID of game show. |
| member_id | Unique ID of member (contestant) playing the game show. |
| gsgteq_contestant_winner | Winning contestant's ID. |
| item_id | ID of item won by contestant (maps to primary prize if it was the primary winner). |

Table 20 corresponds to the gameshow_gteq_type_table in FIG. 14, and describes the type of the game show.

TABLE 20

| Field | Description |
| --- | --- |
| gsgteq_id | Unique ID of game show. |
| gameshow_type_id | Index into the gameshow_type_table. |

Table 21 corresponds to the gameshow_gteq_rule_table in FIG. 14, and describes the rule of the game show.

TABLE 21

| Field | Description |
| --- | --- |
| gsgteq_id | Unique ID of game show. |
| gameshow_rule_id | Index into the gameshow_rule_table. |

Figure 15:
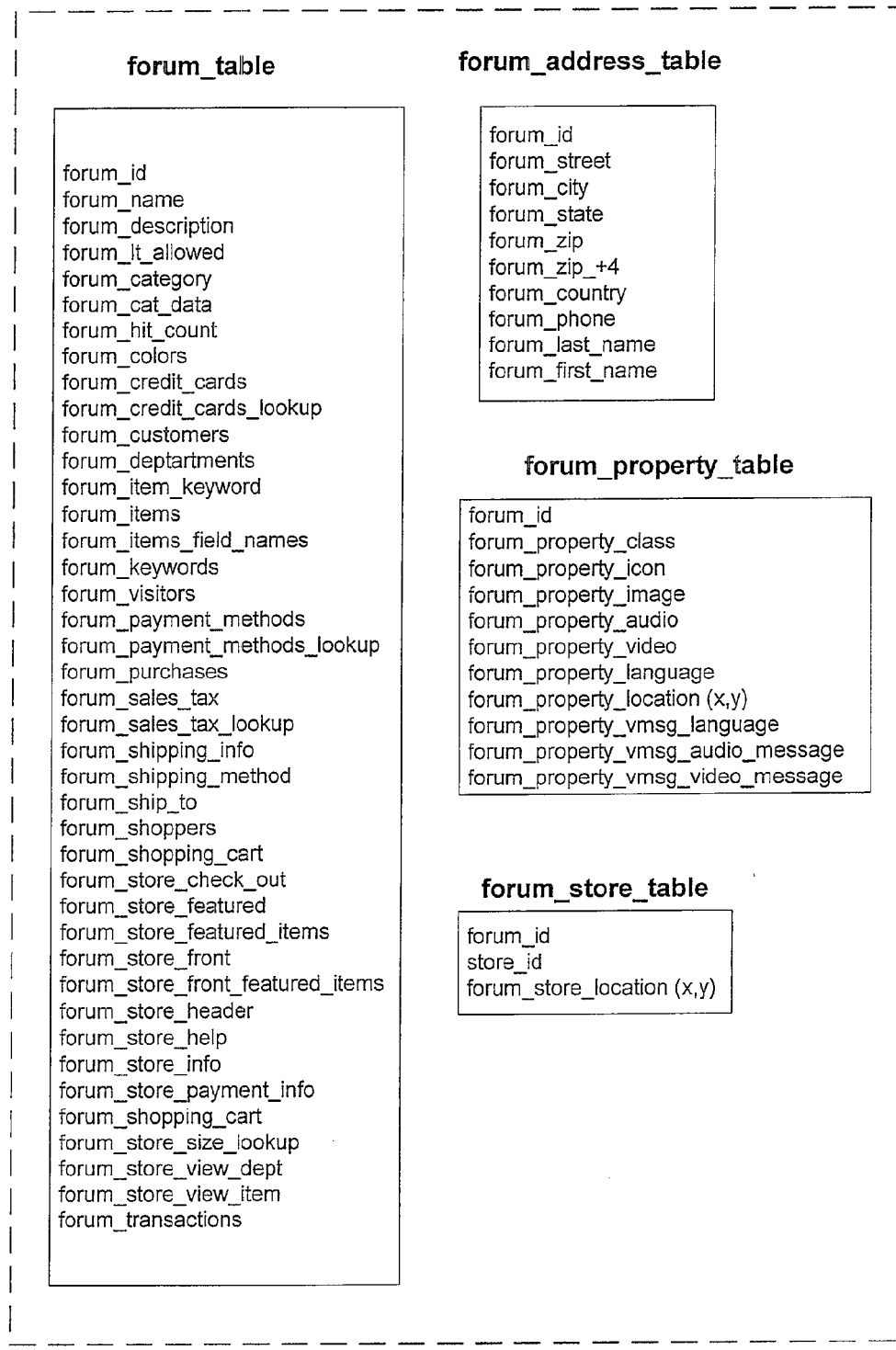
FIG. 15 illustrates forum-shop tables of the computer system.
Figure 16:
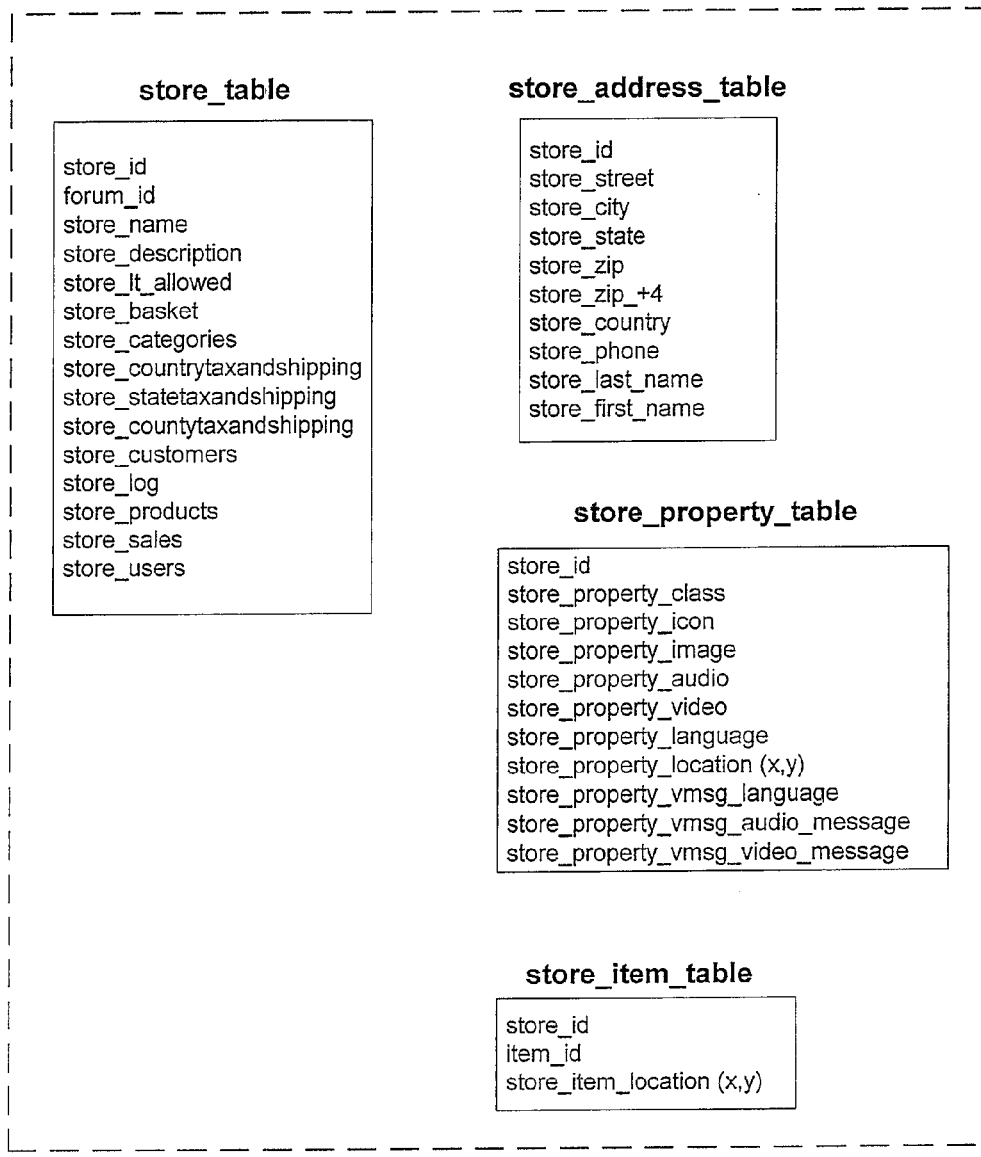
FIG. 16 illustrates store tables of the computer system.

FIGS. 15-17 illustrate the forum-shop, store, and item tables. The shopping databases 960 store these tables, and the shopping applications 920 read from and write to these data tables. These tables generally store information about the system's forum shops, stores, and items.

FIG. 15 illustrates four forum-shop tables, which are: (1) the forum_table, (2) the forum_address_table, (3) the forum_property_table, and (4) forum_store_table. Tables 22-25 respectively describe the fields in these four forum-shop tables.

TABLE 22

| Field | Description |
| --- | --- |
| forum_id | Unique id of forum. |
| forum_name | Name of forum. |
| forum_description | Description of forum. |
| forum_lt_allowed | Indicates whether members younger than 18 are allowed. |
| forum_category | The forum's category (e.g., whether boutique, etc.). |
| forum_cat_data | Forum category's data and description. |
| forum_hit_count | Number of hits on that forum. |
| forum_colors | Forum's special colors. |
| forum_credit_cards | Credit cards advertised and accepted at that forum. |
| forum_credit_cards_lookup | Lookup of the credit cards accepted at the forum. |
| forum_customers | List of customers visited that forum. |
| forum_departments | List of departments in that forum. |
| forum_item_keyword | Item keyword offered by forum. |
| forum_items | Item id offered by forum. |
| forum_items_field_names | The field name used to tag item at forum. |
| forum_keywords | Keywords describing forum. |
| forum_visitors | Visitors who have visited the forum. |
| forum_payment_methods | Payment methods accepted by forum. |

TABLE 22-continued

| Field | Description |
| --- | --- |
| forum_payment_methods_lookup | Payment method lookup. |
| forum_purchases | Total purchases made at the forum. |
| forum_sales_tax | Sales tax applicable to forum. |
| forum_sales_tax_lookup | Forum sales tax lookup. |
| forum_shipping_info | Information on shipping items from the forum. |
| forum_shipping_method | Shipping methods accepted by the forum. |
| forum_ship_to | Ship-to address for forum or forum's office address. |
| forum_shoppers | List of shoppers shopped at the forum. |
| forum_shopping_cart | Forum's shopping cart. |
| forum_store_checkout | Checkout process for each store at the forum. |
| forum_store_featured | Stored featured in each forum. |
| forum_store_featured_items | Items featured in each store of the forum. |
| forum_store_front | Store front display description and view. |
| forum_store_front_featured_items | Items featured in the store front of each store at the forum. |
| forum_store_header | Store's header for each store at the forum. |
| forum_store_help | Help media available for each store at the forum. |
| forum_store_info | Information about each store at the forum. |
| forum_store_payment_info | Information on payment methods of each store at the forum. |
| forum_shopping_cart | Overall forum shopping cart information. |
| forum_store_size_lookup | Lookup for the size of forum. |
| forum_store_view_dept | The stores and departments of the forum. |
| forum_store_view_item | The items of a store in the forum. |
| forum_transactions | Log of all transactions conducted at the forum. |

TABLE 23

| Field | Description |
| --- | --- |
| forum_id | Unique forum id. |
| forum_street | Street address of the forum's brick and mortar location or office head quarters. |
| forum_city | City location of forum office. |
| forum_state | State location of forum office. |
| forum_zip | Zip code of forum office. |
| forum_zip+4 | Zip+4 number of forum office. |
| forum_country | Country location of forum office. |
| forum_phone | Telephone of forum office. |
| forum_last_name | Last name of a contract at the forum office. |
| forum_first_name | First name of a contact at the forum office. |

TABLE 24

| Field | Description |
| --- | --- |
| forum_id | Unique id of the forum. |
| forum_property_class | Class from which the forum properties are derived. |
| forum_property_icon | Icon file which refers to the forum properties. |
| forum_property_image | Image file which represents the forum. |
| forum_property_audio | Audio file which represents the forum. |
| forum_property_video | Streaming video file which represents the forum. |
| forum_property_language | Native or localized language of the forum. |

TABLE 24-continued

| Field | Description |
| --- | --- |
| forum_property_location(x,y) | Coordinates of the forum in relation to the page or frame. |
| forum_property_vmsg_language | Virtual sales force native or localized language. |
| forum_property_vmsg audio_message | Audio message associated with virtual sales force of forum. |
| forum_property_vmsg_video_message | Video message associated with virtual sales force of forum. |

TABLE 25

| Field | Description |
| --- | --- |
| forum_id | Unique id of the forum. |
| store_id | Unique id of the store at the forum. |
| forum_store_location(x,y) | Coordinate of a store in relation to the forum on the page or frame. |

FIG. 16 illustrates four store tables, which are: (1) the store_table, (2) the store_address_table, (3) the store_property_table, and (4) store_item_table. Tables 26-29 respectively describe the fields in these four store tables.

TABLE 26

| Field | Description |
| --- | --- |
| store_id | Unique id of store. |
| forum_id | Unique id of forum where store is located. |
| store_name | Store name. |
| store_description | Description of store. |
| store_It_allowed | Indicates whether users younger than 18 are allowed in store. |
| store_basket | Shopping basket for that store. |
| store_categories | The store's category. |
| store_countrytaxandshipping | Tax and shipping information for the store's country. |
| store_statetaxandshipping | Tax and shipping information for the store's state. |
| store_countytaxandshipping | Tax and shipping information for the store's county. |
| store_customers | Store customer list. |
| store_log | Log file keeping store transactions and reports. |
| store_products | List of products store has featured. |
| store_sales | List and record of sales the store has made. |
| store_users | Users who have visited the store. |

TABLE 27

| Field | Description |
| --- | --- |
| store_id | Unique id of store. |
| store_street | Street address of store or store office head quarters. |
| store_city | City location of store or store office. |
| store_state | State location of store of store office. |
| store_zip | Zip code of location of store or store office. |
| store_zip+4 | Zip+4 code of location of store or store office. |
| store_country | Country location of store or store office. |
| store_phone | Phone of store or store office. |
| store_last_name | Contact last name of store or store office. |
| store_first_name | Contact first name of store or store office. |

TABLE 28

| Field | Description |
| --- | --- |
| store_id | Unique id of store |
| store_property_class | Class from which store property is derived. |
| store_property_icon | Icon file which refers to store properties. |
| store_property_image | Image file which represents the store. |
| store_property_audio | Audio file which represents the store. |
| store_property_video | Streaming video file which represents the store. |
| store_property_language | Native or localized language of the store. |
| store_property_location(x,y) | Coordinate location of the store on page or frame. |
| store_property_vmsg_language | Properties of the store's virtual sales force native or localized language. |
| store_property_vmsg_audio_message | Properties of the store's virtual sales force audio messages. |
| store_property_vmsg_video_message | Properties of the store's virtual sales force video messages. |

TABLE 29

| Field | Description |
| --- | --- |
| store_id | Unique id of store. |
| item_id | Unique item id. |
| store_item_location(x,y) | Coordinates location of item within store. |

The embodiments of the invention that break some or all stores into departments also include a number of department tables. Such department tables are similar to the store tables described above. For instance, in some embodiments, the department tables are identical to the store tables with the exception that instead of a store they mention a department, and instead of a forum they mention a store. In some embodiments, the department tables also do not include some of the administrative information contained in their store tables.

FIG. 17 illustrates three item tables, which are: (1) the item_table, (2) the item_address_table, and (3) the item_property_table. Tables 30-32 respectively describe the fields in these three item tables.

TABLE 30

| Field | Description |
| --- | --- |
| item_id | Unique id of an item. |
| store_id | Unique id of a store that the item is associated with. |
| forum_id | Unique id of a game that the item is associated with. |
| game_id | Unique id of a game that the item is associated with. |
| item_description | Description of an item. |
| item_lt_allowed | Indicates whether the item is allowed to be accessed by users younger than 18. |

TABLE 31

| Field | Description |
| --- | --- |
| item_id | Unique id of an item. |
| item_street | Street address of item. |

TABLE 31-continued

| Field | Description |
| --- | --- |
| item_city | City location of item. |
| item_state | State location of item. |
| item_zip | Zip code of location of item. |
| item_zip+4 | Zip+4 code of location of item. |
| item_country | Country location of item. |
| item_phone | Phone of item. |
| item_last_name | Contact last name of item. |
| aitem_first_name | Contact first name of item. |

TABLE 32

| Field | Description |
| --- | --- |
| item_id | Unique id of an item |
| item_free | Indicates whether an item is free. The shopping application populates this field dynamically whenever it decides to give the item away for a period of time. |
| item_property_class | Class from which item property is derived. |
| item_property_icon | Icon file which refers to item properties. |
| item_property_image | Image file which represents the item. |
| item_property_audio | Audio file which represents the item. |
| item_property_video | Streaming video file which represents the item. |
| item_property_language | Native or localized language of the item. |
| item_property_location(x,y) | Coordinate location of the item on page or frame. |
| item_property_vmsg_language | Item properties of the virtual sale force native or localized language. |
| item_property_vmsg_audio_message | Item properties of the virtual sales force audio messages. |
| item_property_vmsg_video_message | Item properties of the virtual sales force video messages. |

As shown in Table 30, the item_table includes the store_id field to associate the item with a particular store. For items that are not in stores, this table also includes a forum_id field and a game_id field. The forum_id field associates items outside the stores but inside a forum shopping mall. The game_id field associates items displayed by game-show applications. The tables for the items displayed by the game-show applications are stored in the game-show databases in some embodiments of the invention.

IV. Game Show Applications.

Figure 18:
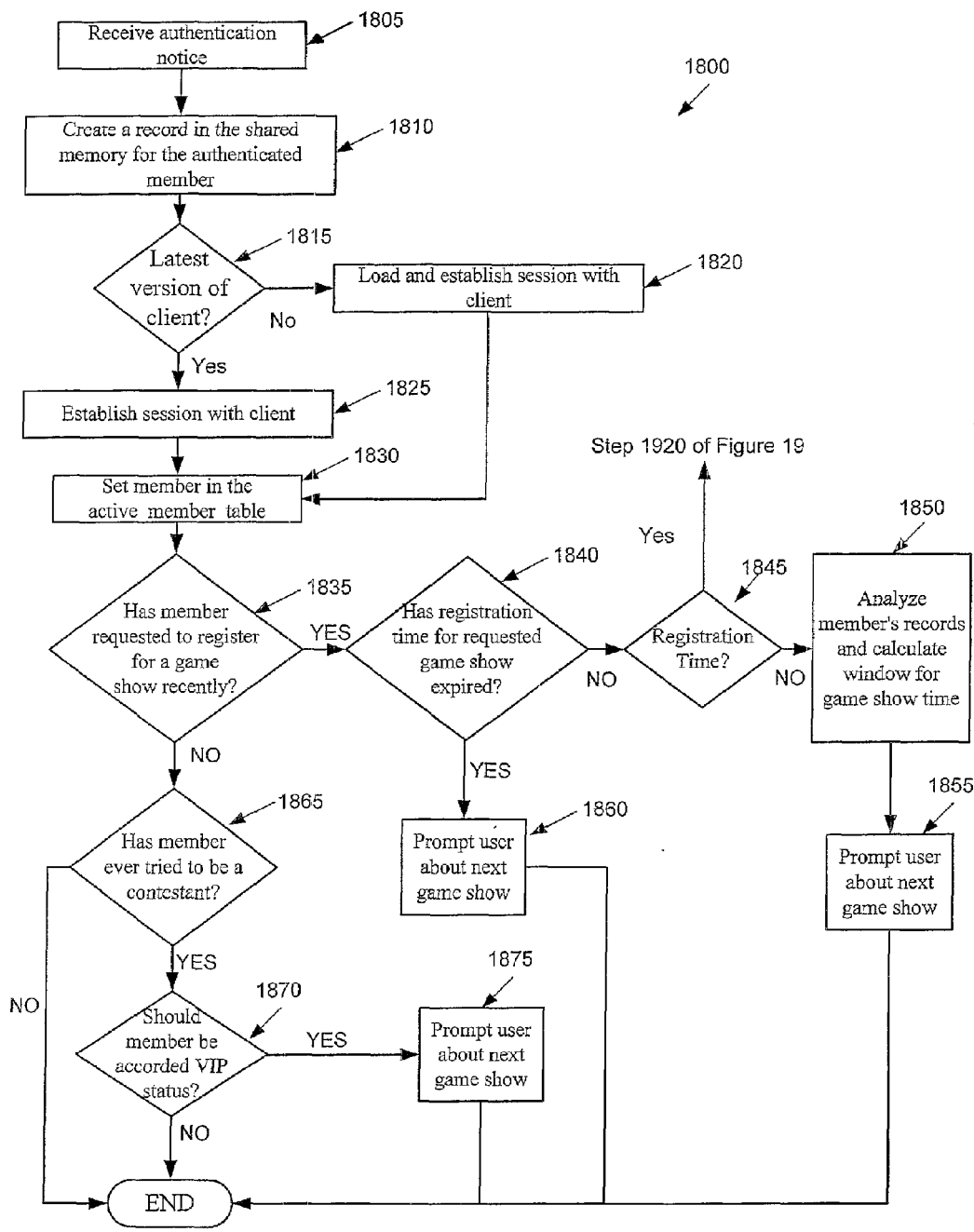
FIG. 18 presents a process that the member monitoring application goes through every time it is notified that a new member has been authenticated.

The processes that some embodiments of the computer system 100 perform in order to present game shows will now be described. FIG. 18 presents a process 1800 that the member tracking application 1015 goes through every time it is notified (e.g., by a Web server) that a new member has been authenticated.

As shown in this figure, the process 1800 starts (at 1805) when the member tracking application receives a notice that a new member has been authenticated. Next, the process creates (at 1810) a session record for the authenticated member in shared memory. This session record contains the member's identification and a time-stamp that indicates the time of the last interaction between the member and the system. In some embodiments, this record also includes the location of the member in the system (i.e., the application that interacted with the member last).

If a member decides to engage a game show or shopping application, the tracking application (1) updates the shared memory to indicate the new location of the member and the time of the request, and (2) informs (through an API) the game show or shopping application about the member's request. The requested application then has to update the member's record in the shared memory so long as the member is actively interacting with it.

Each time a member switches from one application to another, the new application is notified of the location of the member's session record in the shared memory, so that the new application can update the member's session record. In some embodiments, the previous application notifies the new application of the member's location in the shared memory. In other embodiments, the member tracking application notifies the new application. In yet other embodiments, the new application determines the location for the member's record in the shared memory from the member's unique ID.

In some embodiments, the computer system loads a client application on the user computers in order to facilitate the users' browsing of the Web sites offered by the computer system. For these embodiments, the process determines (at 1815) whether the authenticated member has the latest client application of the system loaded onto his or her computer, after creating a session record for the authenticated member in the shared memory. If not, the process (at 1820) loads the latest version of the client application onto the user's computer, and establishes a communication session with this application. Otherwise, the process establishes (at 1825) a communication link with the client application that the system previously loaded on the user's desktop.

Next, the process sets (at 1830) the member in the active_member_table to reflect that the member is currently active. The process then determines (at 1835) whether the member has requested to register for a game show recently. The process makes this determination by searching for records relating to the member (by using the member's id) in the member_game_request_table.

If so, the process (at 1840) determines whether the registration time for the requested game show has expired. In some embodiments, the process makes this determination by examining the member_game_request_table. Specifically, the process examines the member_game_request_active field in the member_game_request_table. If this field indicates that the game show time has passed, then the process concludes its examination. Otherwise, the process asks the appropriate game show application to provide the start time and grace period for its requested game show. In particular, the process retrieves the member_game_request_game_id from the member_game_request_table, and asks the appropriate game show application to provide the start time and grace period for the game show identified by the retrieved game identification. If, after querying the game show database, the process determines that the game-show registration time has expired, the process sets the member_game_request_active field to indicate that the game show has expired.

If the process determines (at 1840) that the game-show registration time has expired, the process provides (at 1860) the member with information about the next game show or shows, and asks the member whether he or she would like to register for the game show. If the member indicates that he or she would like to register for the next game show, the process 1800 calls the process 1900 of FIG. 19, which will be described below.

On the other hand, if the process determines (at 1840) that the registration time for the requested game show has not expired, the process determines (at 1845) whether it is time for the user to register for the requested game show. The process makes this determination by examining the start time and registration grace period for the game show in the game show table. As described above, the process can obtain the start time and grace period by asking the appropriate game show application to query its game-show database.

Figure 19:
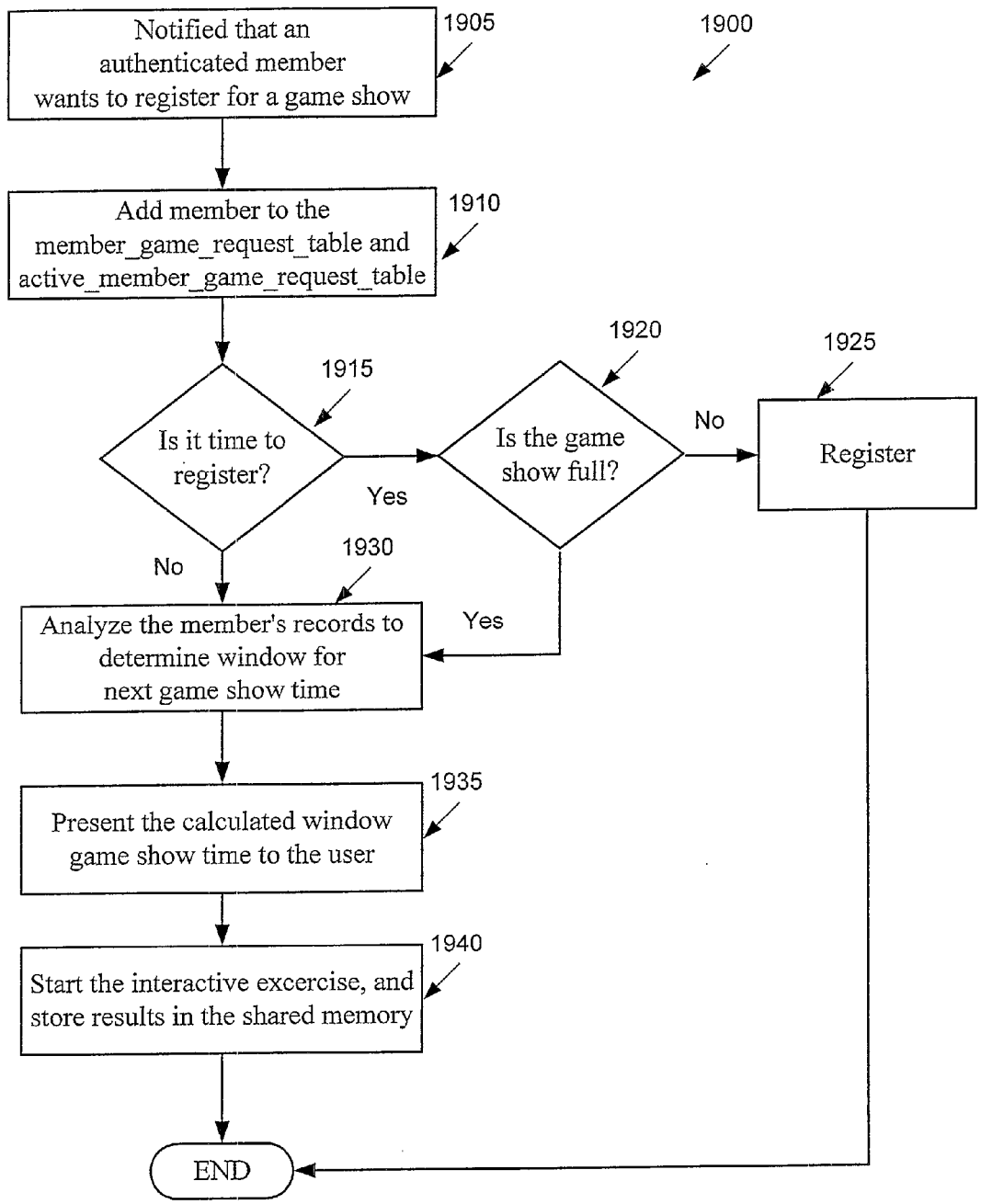
FIG. 19 presents a process that is performed each time a member requests to register for a game show.

If it is time to register for the game show, the process transitions to 1920 of FIG. 19 to determine whether the game show is full. Otherwise, the process analyzes (at 1850) the member's records and calculates a window of time for registering for the game show. To calculate the time window, some embodiments of the process 1800 analyze the member's records in the following tables: member_stat_table, time_member_stat_table, time_member_session_table, and inav_member_stat_table. Next, the process provides (at 1855) the member with a new registration time window, and then ends.

If the process determines (at 1835) that the member has not recently requested to register for a game show, the process determines (at 1865) whether the member has ever tried to be a contestant. The process determines this by searching for records relating to the member in the member_game_request_table.

If the member has not previously tried to be a contestant, the process ends. Otherwise, the process determines (at 1870) whether the member should be accorded VIP status. To make this determination, some embodiments of the process 1800 analyzes the member's records in the following tables: member_stat_table, time_member_stat_table, time_member_session_table, and inav_member_stat_table.

If the member should not be accorded VIP status, the process ends. Otherwise, the process provides (at 1875) the member with information about the next game show or shows, and asks the member whether he or she would like to register for the game show. If the member indicates that he or she would like to register for the next game show, the process 1800 calls the process 1900 of FIG. 19. The process then ends.

FIG. 19 presents the process 1900 that is performed each time a member requests to register for a game show. In some embodiments, this process is performed by each game show application for its game show. One of ordinary skill will understand that in other embodiments of the invention one game-show application or the member monitoring application performs this process for all the game shows.

The process starts (at 1905) when it is notified that an authenticated member wants to register for a game show. The process then supplies (at 1910) the game and member information to the member tracking application and asks this application to add the member to the active_member_game_request_table and the member_game_request_table. The process determines (at 1915) whether it is time to register for the requested game show. In some embodiments, the process makes this determination by examining the start time and registration grace period for the game show in the game show table.

If it is not time to register for the game show, the process analyzes (at 1930) the member's records to determine the window of registration time that it should provide to the member. In some embodiments, the process analyzes the member's records in the following tables: member_stat_table, time_member_stat_table, time_member_session_table, and inav_member_stat_table.

On the other hand, if the process determines (at 1915) that is time to register for the request game show, the process determines (at 1920) whether the game show is full. In some embodiments, the process makes this determination by comparing the maximum seat count of the game show (e.g., the gslt_max_seat in the game show_lt_table or gsgteq_max_seat in the game show_gteq_table) with a count that the process keeps of the contestants that have registered for the game show.

If the game show is not full, the process allows (at 1925) the member to register, and increments the seat count for the game show. Otherwise, the process analyzes (at 1930) the member's records to determine the time interval for registering for the next game show. The process presents (at 1935) the calculated time interval to the member. The process then starts (at 1940) an interactive exercise, which will be described further below by reference to FIG. 21.

Figure 20:
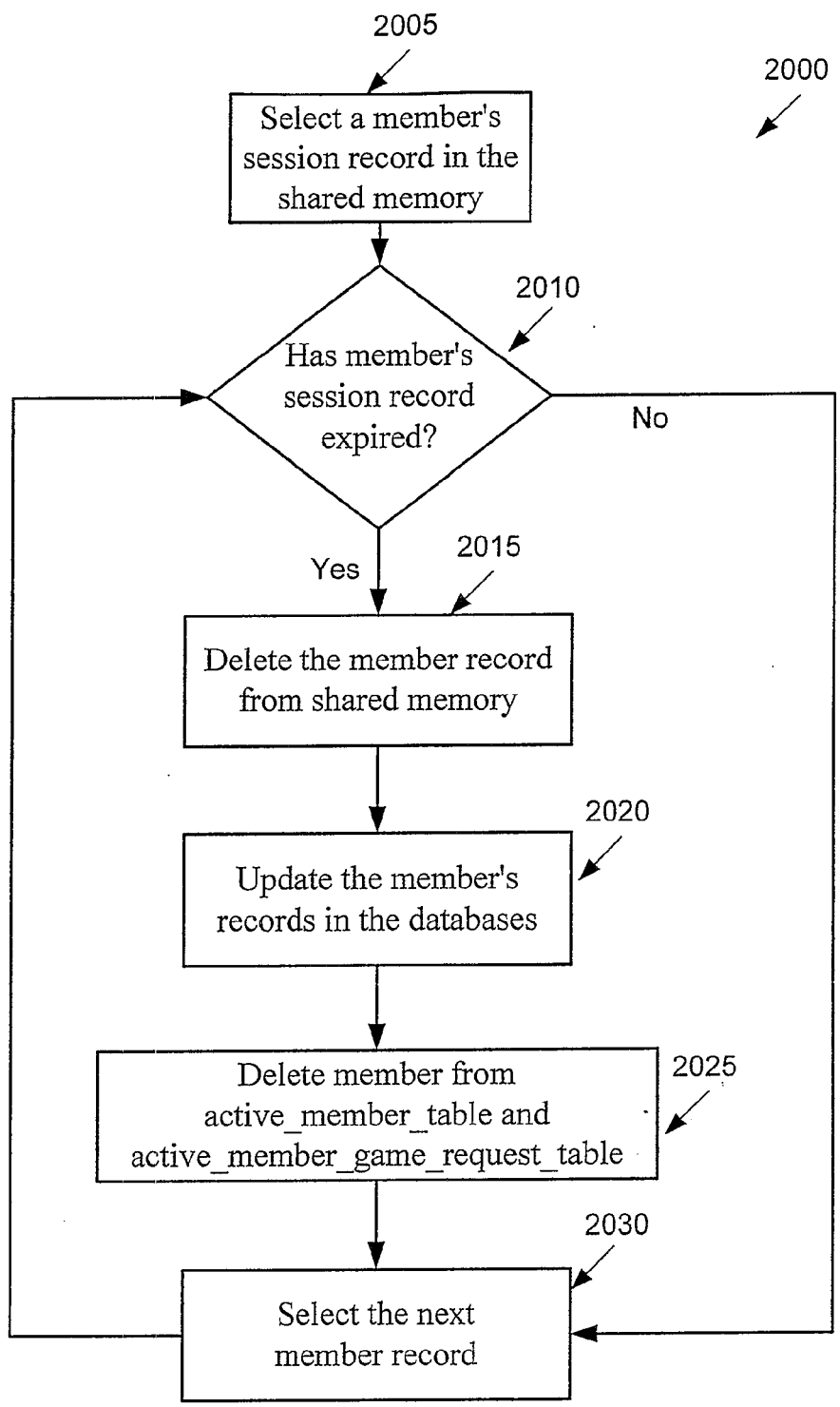
FIG. 20 presents a process performed by the member monitoring application for updating the records in the shared memory.

FIG. 20 presents the process performed by the member tracking application for updating the session records in the shared memory. The process 2000 starts (at 2005) by selecting a session record of a member in the shared memory. Next, the process determines (at 2010) whether the member's session record has expired. In some embodiments, the process determines whether a member's record has expired by examining the time stamp stored in this record (indicating the time for the members last interaction with the system) with the current time. If the difference between these two time values exceeds a threshold value, the process determines that the member's session has expired.

If the process determines (at 2010) that the member's record has not expired, the process selects (at 2030) the next session record in the shared memory, and transitions back to 2010. On the other hand, if the process determines (at 2010) that the member's session record has expired, the process deletes (at 2015) the member's record from the shared memory.

Next, the process updates (at 2020) the records of the member whose session has expired in the member tracking and time-measurement databases. For instance, the process calculates the member's total session time by subtracting the time stamp of the member's record in the shared memory from the member's session start time in the active_member_table. The process then adds the calculated total session time to time_member_session_total_accrued in time_member_session_table, time_stat_total_accrued in the time_stat_table, and the member_stat_time_accrued in the member_stat_table.

The process then deletes (at 2025) the expired member from the active_member_table. The process also deletes the expired members from the active_member_game_request_table if that member requested to play in a game show. The process then selects (at 2030) the next session record in the shared memory, and transitions back to 2010 to determine whether this record has expired. Hence, the member tracking application sequentially performs process 2000 on each session record stored in the shared memory in order to remove expired session records from the shared memory and update the records in the databases. When this application reaches the final session record in the shared memory, it cycles back to the first session record in the memory to start again.

Figure 21:
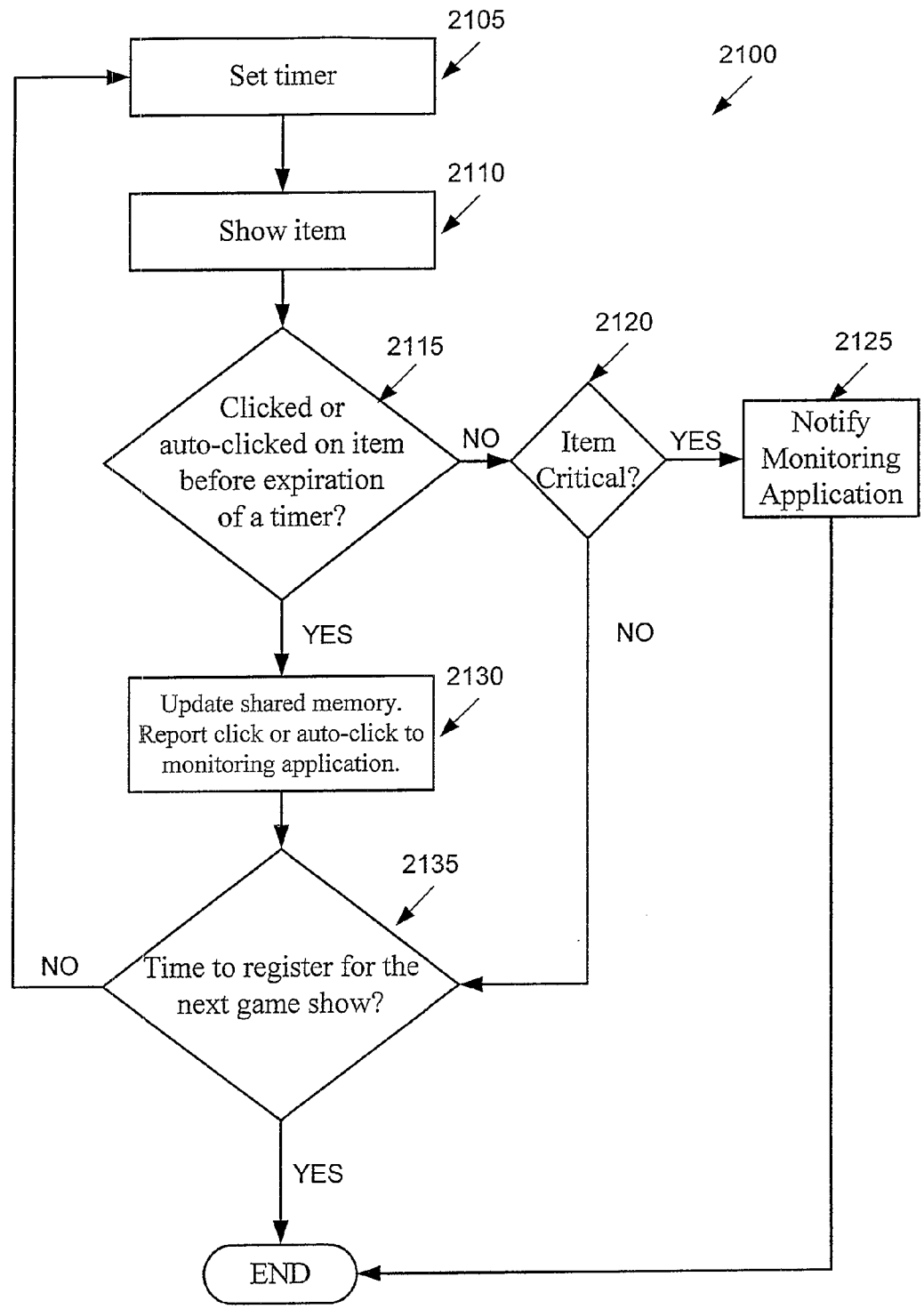
FIG. 21 presents a process performed by a game show application to provide an interactive exercise to a member who is waiting for a game show.

FIG. 21 presents the process 2100 performed by a game show application to provide an interactive exercise to a member who is waiting for a game show. Some embodiments of the invention present such interactive exercises while the members wait for game shows in the virtual game-show waiting area described above. Some of these embodiments also present these interactive exercises to members who enter the forum shops while waiting for the game shows.

The process starts (at 2105) by setting a timer. Next, the process shows (at 2110) an item to the member. In some embodiments, this item is an advertising image icon of a product or a service sold through the system's stores. After showing the item to the member, the process determines (at 2115) whether the member clicked or auto-clicked on the item before the timer expired.

If the member fails to click or auto-click on the item in time, the process determines whether the item was a critical item that the member had to select through a click or auto-click operation. In some embodiments, the process makes this determination by analyzing the selection of the current item in context of the selection of the previous items that process 2100 presented to the member. For instance, the process might determine that an item is not critical if the member had clicked or auto-clicked on the previous two items that the process 2100 presented. Alternatively, the process might determine that the item is critical if the member did not click or auto-click on the previously displayed item.

If the process determines (at 2120) that the item was not critical, the process transitions to 2135. On the other hand, if the item was critical, the process informs the member tracking application (through an API) to remove the member from the active_member_game_request_table and the active_member_table. The process then ends.

If the process determines (at 2115) that the member clicked or auto-clicked on the item before the timer expired, the process updates (at 2130) the time stamp in the member's session record in the shared memory. In some embodiments, the process at this stage also reports the click or auto-click event to member monitoring application through an API. The time-measurement and interactive-navigation applications of the monitoring application then record this click or auto-click event in their statistical tables. The records in these tables for this click or auto-click event are identified by the inav_id of the item presented at 2110.

The process then determines (at 2135) whether it is time to register for the requested game show. If so, the process ends. Otherwise, the process transitions back to 2105 and repeats.

Figure 22:
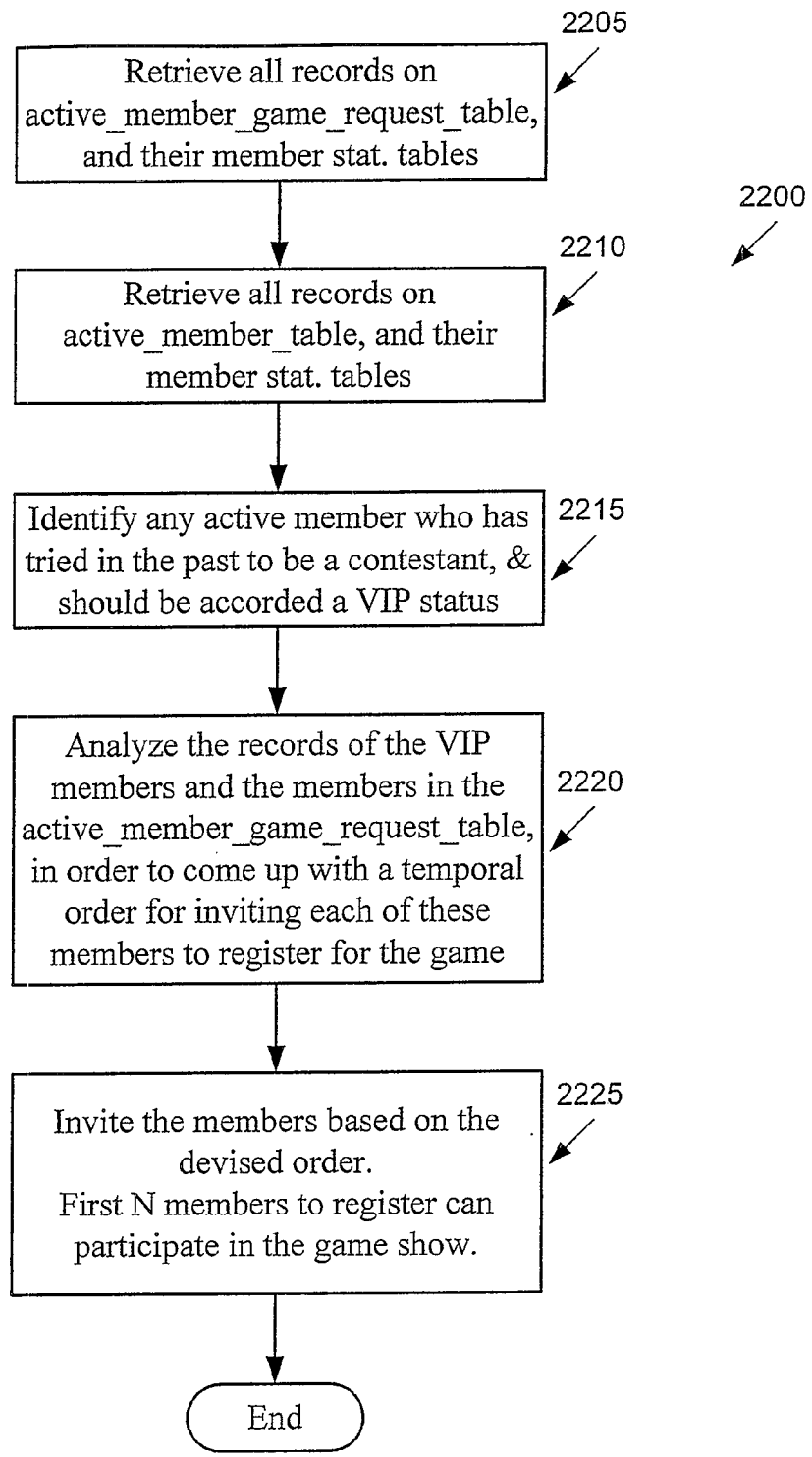
FIG. 22 presents a process that is performed to inform members that it is time to register for a game show.

FIG. 22 presents the process 2200 that is performed to inform members that it is time to register for a game show. In some embodiments of the invention, a game show application performs this process, while in other embodiments the member monitoring application performs this process.

The process starts (at 2205) by retrieving all the records in the active_member_game_request_table. For each member in this table, the process also retrieves (at 2205) the member's records from the member_stat_table, time_member_stat_table, time_member_session_table, and inav_member_stat_table.

The process then retrieves (at 2210) all the records from the active_member_table. For each member in this table, the process also retrieves (at 2210) the member's records from the member_stat_table, time_member_stat_table, time_member_session_table, and inav_member_stat_table.

From the members in the active_member_table who have not requested to play the current game show, the process identifies (at 2215) all active members who have requested a game show in the past and who should be accorded a VIP status. The process identifies all active members who previously requested a game show by examining the member_game_request_table as described above. Also, the process determines which of these members should be accorded a VIP status by examining the member records, as described above for process 1800 at 1870.

The process then analyzes (at 2220) the records of the VIP members and the members in the active_member_game_request_table, in order to come up with a temporal order for inviting each of these members to register for the game show. The process then invites (at 2225) the members to register based on the derived order. The first N members to register can participate in the game show.

V. Interactive Shopping Application.

In some embodiments of the invention, the computer system presents three-dimensional scenes of shopping malls, stores within the shopping malls, and departments within the stores to its users. The users can browse through these three-dimensional scenes in a three-dimensional manner. Also, some embodiments portray the items in these three-dimensional scenes by their real three-dimensional image, shape and form.

Figure 23:
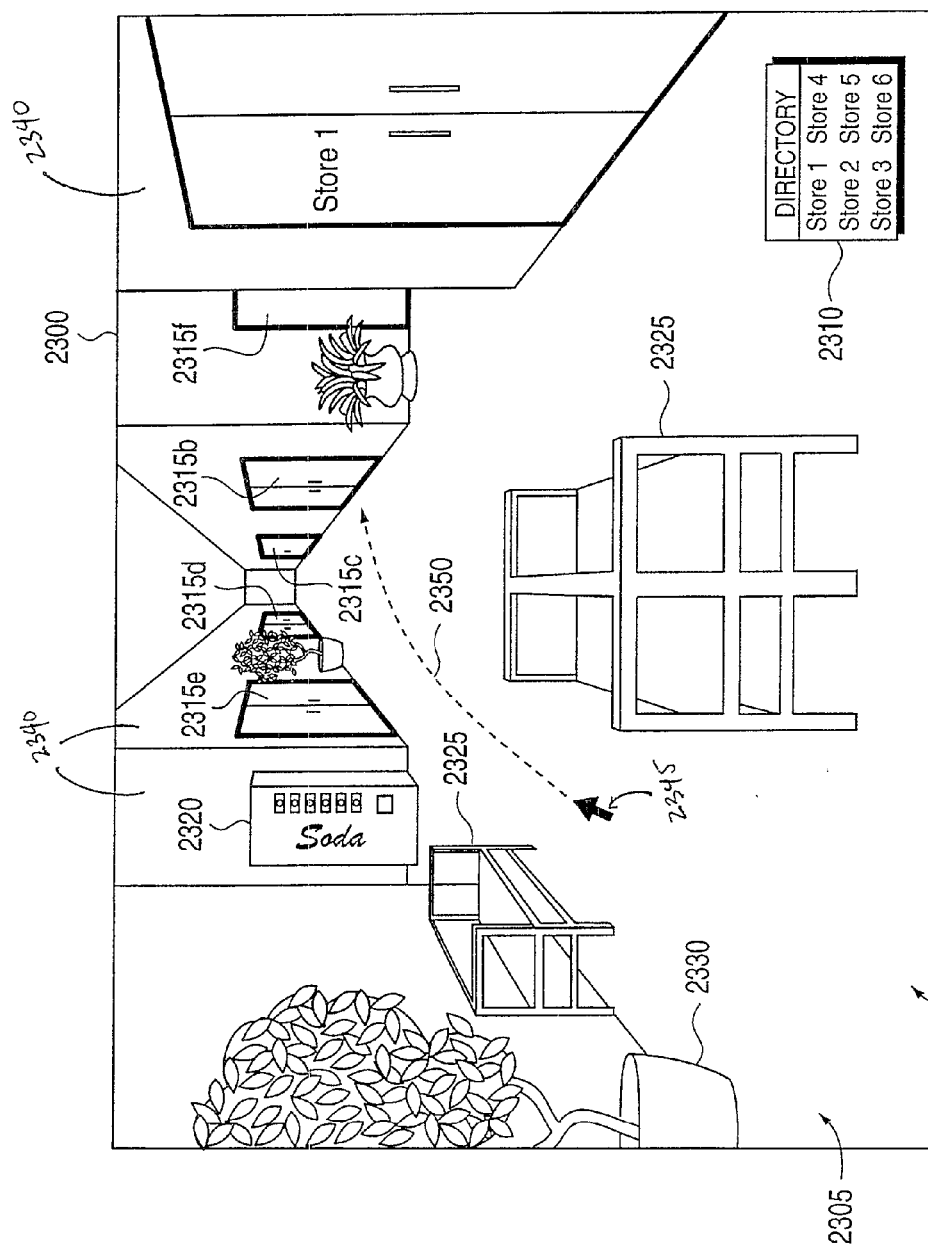
FIG. 23 illustrates a browser window that provides a three-dimensional presentation of a shopping mall.
Figure 24:
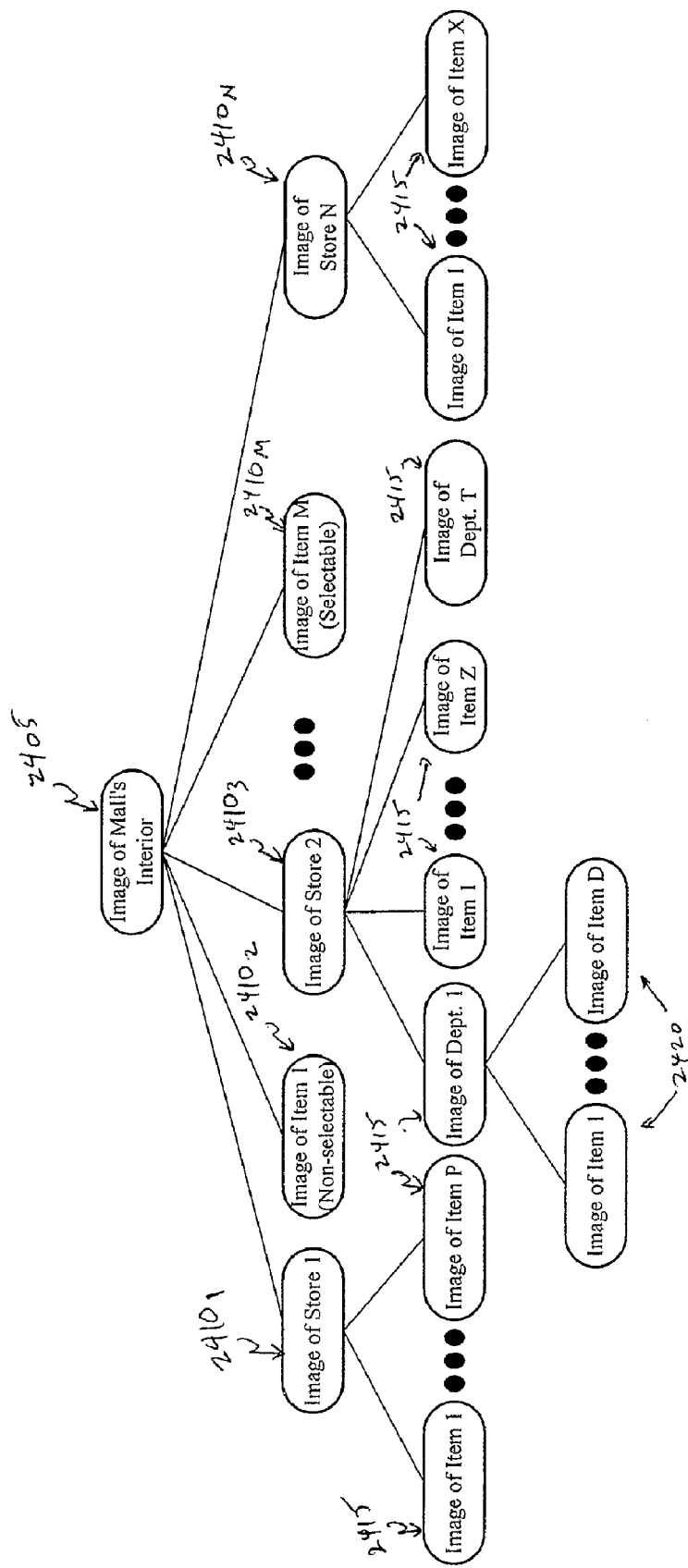
FIG. 24 illustrates a recursive approach for mapping selectable objects.

Some embodiments form the three-dimensional scenes by using a number of selectable and non-selectable objects, which are described below by reference to FIGS. 23-25. FIG. 23 illustrates a browser window 2300 that presents (1) a three-dimensional scene 2305 representing the interior of a shopping mall, and (2) a directory 2310 listing the stores in the mall.

The three-dimensional scene 2305 contains a several selectable and non-selectable objects. In some embodiments, a selectable object is an interactive screen image that represents an item or store in the mall or an item or department in a store in the mall, while a non-selectable object is a static screen image that represents a background item in a mall, a store, or a department. In FIG. 23, the selectable objects in this scene are: several stores 2315*a-f*, and a soda machine 2320. The non-selectable items are two bench seats 2325, several plants 2330, the shopping mall floor 2335, and several walls 2340.

In some embodiments, a user can perform a click (e.g., mouse-button) or auto-click on a selectable object to obtain additional information regarding the object. On the other hand, nothing happens when a user clicks or auto-clicks on a non-selectable object. One of ordinary skill will understand that the use of the term object does not necessarily imply that the selectable and non-selectable objects are defined in an object-oriented manner, although in some embodiments they are defined in such a manner.

In some embodiments of the invention, each selectable object can be mapped to a number of other selectable and non-selectable objects. For instance, some embodiments recursively define the selectable objects. FIG. 24 illustrates a recursive approach, where each selectable object can include selectable and non-selectable child images, and it can be part of a selectable parent image. As shown in this figure, not all selectable objects have child selectable images (e.g., image 2410$_M$ of item M is selectable but does not contain any child images).

In this figure, the selectable object for the mall serves as the root node image 2405, the stores and items in the mall are this root's child nodes 2410, and the different departments and/or items in the stores are this root's grandchild and great-grandchild nodes 2415 and 2420. Alternative embodiments use a different recursive approach to map all the object images in the mall. For instance, other embodiments select different root nodes, and/or select the root node's child nodes to be different sections of the mall (e.g., north, south, west, and east sections, or different floors in the mall).

Some embodiments recursively define the selectable objects by using the inav_parent_id pointer in the inav_table illustrated by FIG. 12. Specifically, this pointer field is used to map the child selectable and non-selectable objects to a parent selectable object. In addition, as discussed above, the inav_image field in an object's record in this table points to a stored image for the object. Furthermore, the inav_location field in the object's record in this table provides the location of the object relative to the other objects that have the same parent object (e.g., provide the location of an item within the store relative to the other items or departments in the store). Also, the inav_class field in the object's record in the inav_table indicates whether the object is a selectable or non-selectable object.

In some embodiments of the invention, the computer system presents the child objects of a parent selectable object when a user clicks or auto-clicks on the parent selectable object. For instance, some embodiments of the computer system provide a three-dimensional presentation of the interior of a selected store, when the user positions the cursor over shop 2315*b* in FIG. 23 and performs a click or auto-click operation.

Figure 25:
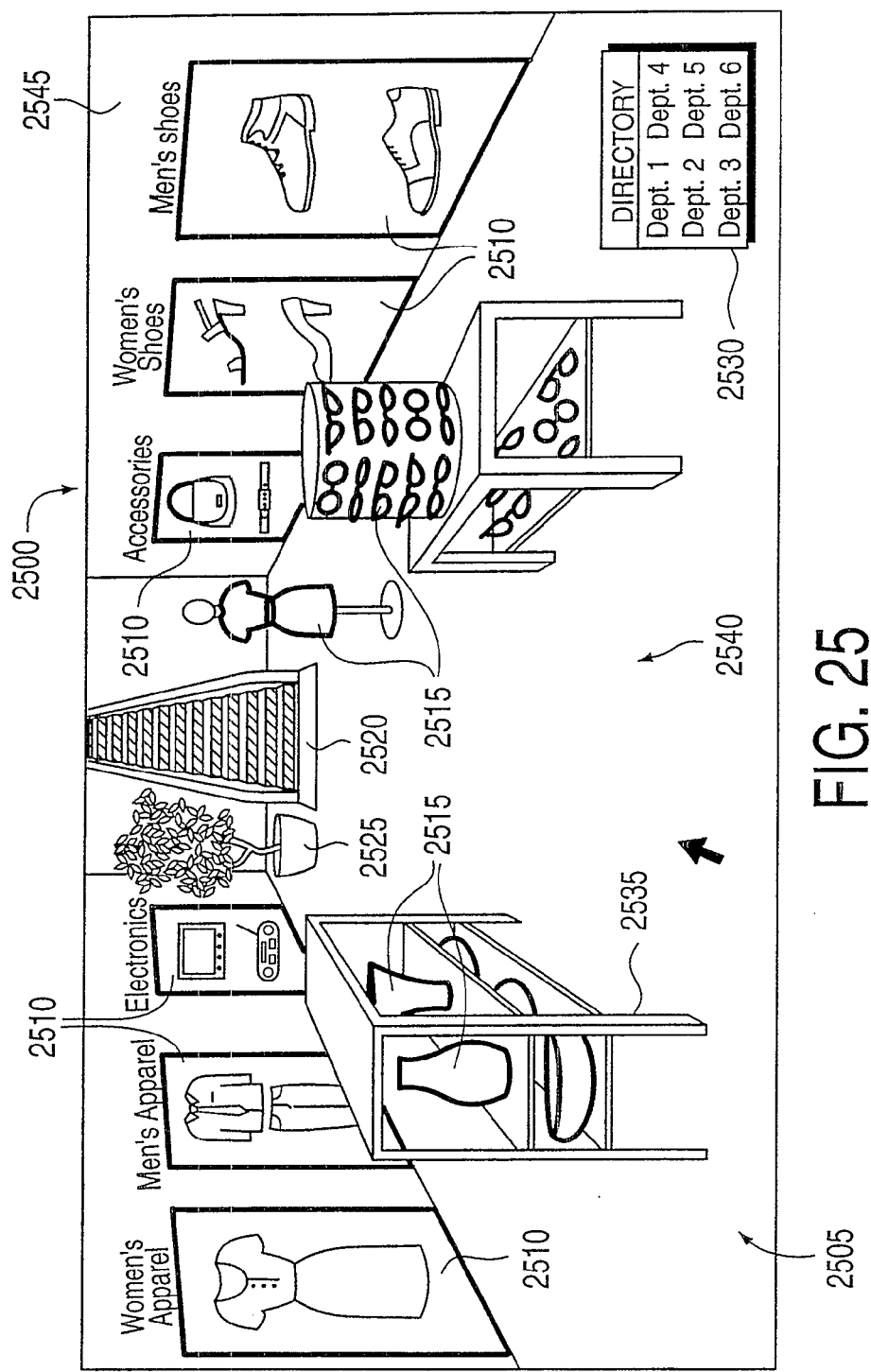
FIG. 25 illustrates a three-dimensional presentation of the interior of a store that the system shows a user after the user selects the store's selectable object.

FIG. 25 illustrates a browser window 2500 which displays a three-dimensional scene 2505 representing the interior of a store that the system shows the user after the user performs a click or auto-click operation on the store's selectable object. As shown in this figure, this three-dimensional presentation includes the store's child images. These child images include selectable objects such as departments 2510 and items 2515 within the store. The child images also include non-selectable objects, such as escalator 2520, plants 2525, shelves 2535, floor 2540, and walls 2545.

As shown in FIGS. 23 and 25, the browser window 2300 and 2500 also present directories 2310 and 2530. The directory 2310 lists all the stores in the shopping mall, while the directory 2530 lists other stores or lists departments or items within the store 2505. In some embodiments, each entry in a directory is a hypertext link that the user can select. Consequently, in these embodiments, the user can click or auto-click on a link in the directory to direct the computer system to present the outside or inside of the store (e.g., present the selectable image for the store or the selectable images that represent the items and departments inside of the store).

Figure 26:
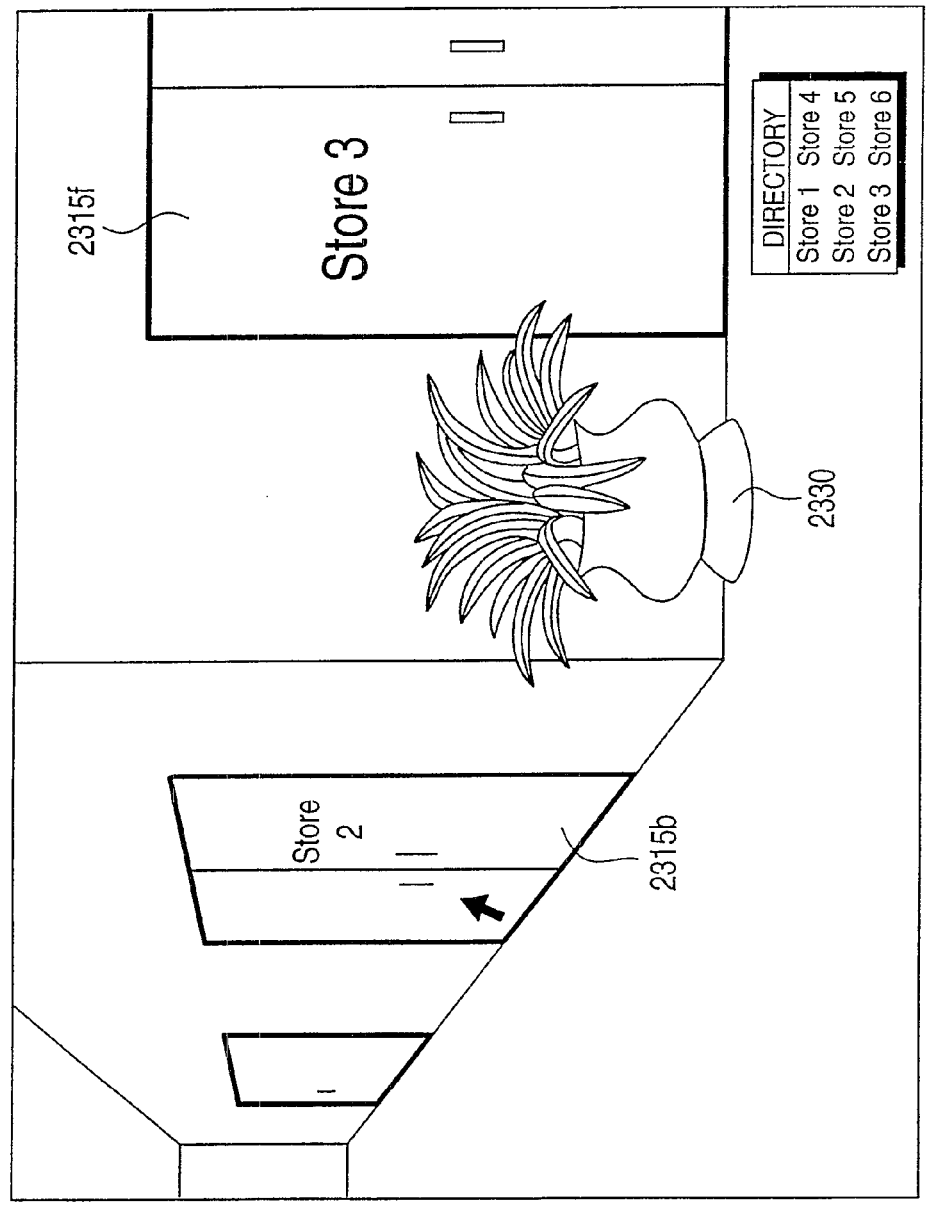
FIG. 26 illustrates a zooming operation performed on a store in a shopping mall that is in the direction of the cursor's motion.

Some embodiments of the invention load a client application in a user's computer to facilitate the user's three-dimensional browsing. This client application performs a variety of operations to speed up and simplify the user's browsing experience. For example, this client application detects the direction of the user's browsing and preloads the selectable objects in this direction and the child images of these selectable objects. The client application also enlarges the image of the selectable object or objects in the direction of the user's browsing. For instance, in FIG. 23, the cursor 2345 moves towards store 2315*b*. The client application detects the direction 2350 of the cursor's motion, and zooms in on this store, as shown in FIG. 26.

Figure 27:
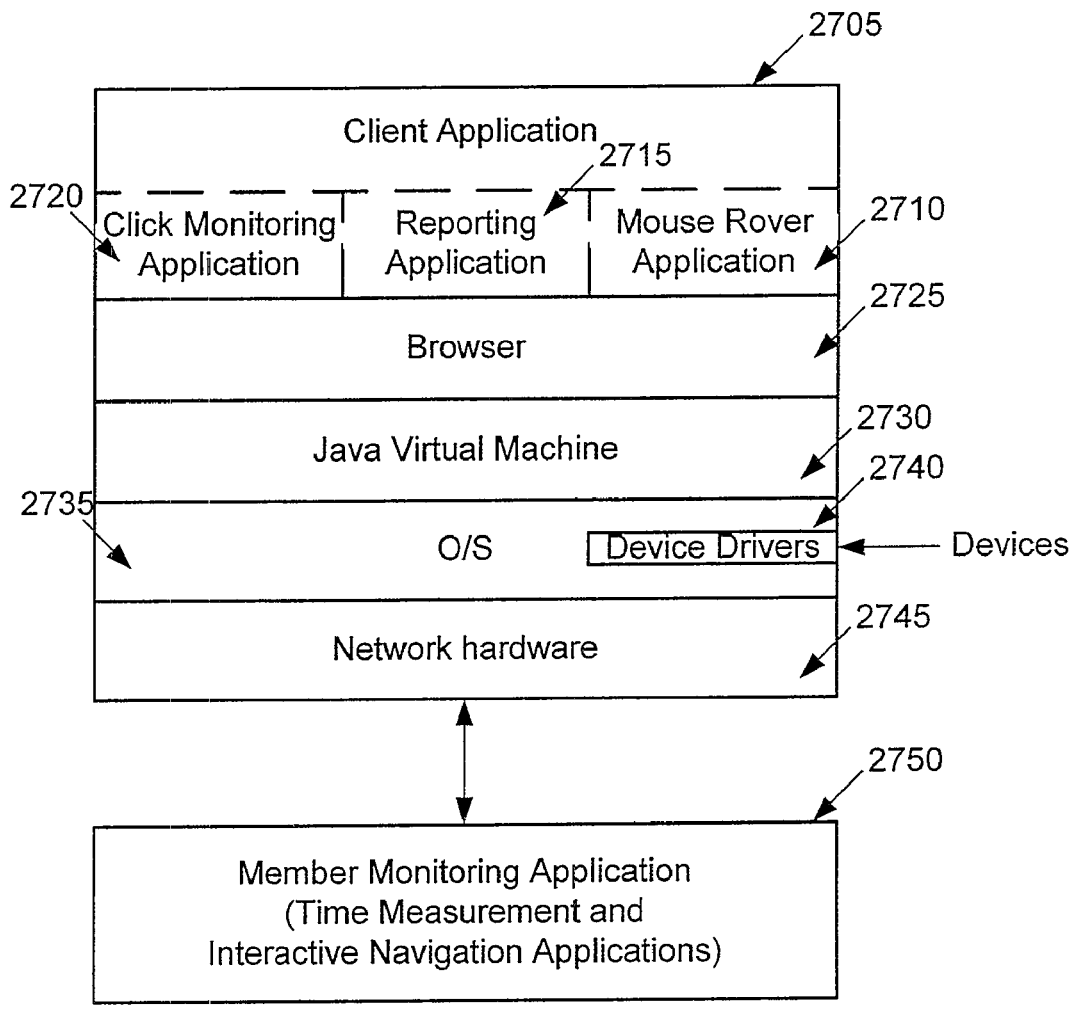
FIG. 27 presents a block diagram of the software architecture on the user's computer.

One such client application will now be described by reference to FIGS. 27-29. FIG. 27 presents a conceptual block diagram of the architecture on the client (i.e., user) computer. This architecture includes an operating system 2735, a java virtual machine 2730, a browser 2725, and a client application 2705. The client application, in turn, includes a click monitoring application 2720, a reporting application 2715, and a mouse rover application 2710.

The operating system is the software responsible for controlling the allocation and usage of the hardware resources of the user's computer. FIG. 27 shows the operating system to include device drivers 2740, which are software components that allow the operating system to communicate with the devices (such as the cursor controllers (e.g., a mouse, a touch-pad, etc.)) connected to the computer. The operating system also serves as the foundation on which other applications (such as the browser application 2725) operate.

The browser application 2725 provides the tools that allow the user to navigate the World Wide Web. Examples of browser applications include the Internet Explorer, the Netscape Navigator, etc. FIG. 27 illustrates the client application as a plug-in module for the browser application. This plug-in application extends the three-dimensional browsing capabilities as well as the reporting capabilities of the browser application. One of ordinary skill will realize that in other embodiments the client application is a stand-alone browser application. In some embodiments of the invention, the client application is written by using the Java® computer language. In these embodiments, the client application uses standard Java APIs to communicate with the java virtual machine ("JVM") 2730, which most browsers support.

More specifically, the JVM 2730 serves as an intermediary software component between the operating system 2735, the browser application 2725, and the client application 2705. For instance, when the browser application cannot decipher the client application's instructions, the browser application can use the JVM to translate these instructions for communication with the operating system. The combination of the browser and client applications 2725 and 2705 render the pages and images based on a mark-up language (such as VRML, HTML, XML), Javascript and/or Java code instructions generated by system's server applications or embedded in pages served by system's servers application.

As shown in FIG. 27, the client application includes three sub-components, which are the click-monitoring application 2720, the reporting application 2715, and the Mouse-Rover™ application 2710. The click-monitoring application 2720 detects click activities and generates auto-clicks and passive-clicks, which are further described below. The reporting application 2715 then reports to the computer system's member-monitoring application the detected and generated click activity.

The mouse-rover application 2710 controls the presentation of the selectable and non-selectable objects based on the user's mouse movement. Specifically, it detects the direction of the user's browsing, enlarges the selectable objects in the immediate vicinity of the detected direction, and preloads the selectable and non-selectable objects in the general vicinity of the detected direction. As further described below, the mouse-rover application 2710 uses the reporting application 2715 to perform its preload operation.

Figure 28:
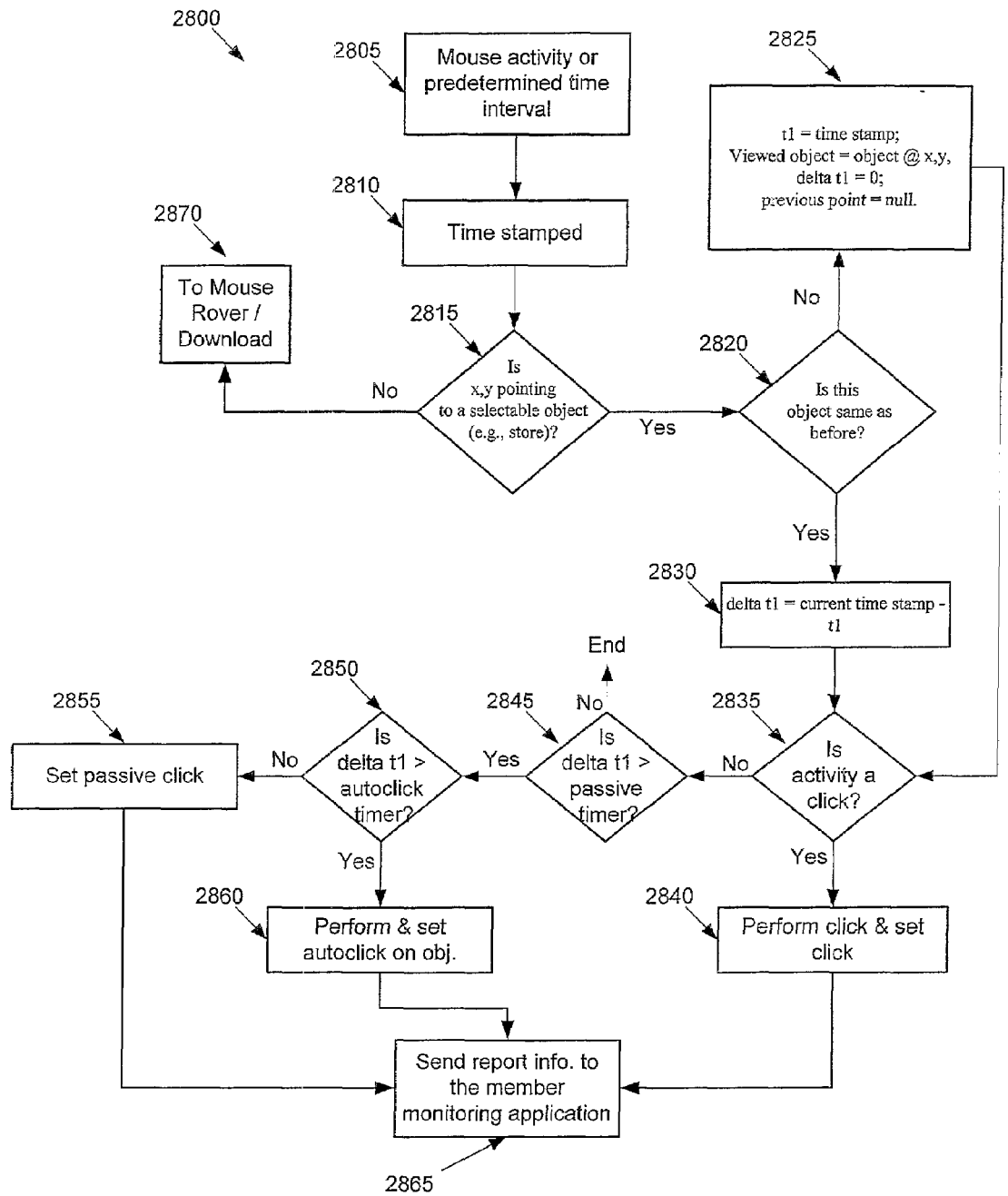
FIG. 28 illustrates a process performed by the click-monitoring application.

FIG. 28 illustrates a process 2800 performed by the click-monitoring application 2720. This process starts at 2805. This process 2800 periodically starts at pre-determined time intervals. This process also starts when the operating system 2735 notifies the client application 2705 that the mouse driver has detected a mouse activity. When the mouse activity is a cursor movement, then the operating system passes the location (i.e., x- and y-coordinates) of the cursor to the client application. When the mouse activity is a mouse-button click, the operating system passes the click activity to the client application.

Once the click monitoring application receives the mouse activity, this application time stamps (at 2810) the record for this activity. Next, the process determines (at 2815) whether the current cursor position is over a selectable object in the mall. If the cursor is not positioned over a selectable object, the process calls (at 2870) the Mouse-Rover™ application.

On the other hand, if the process determines (at 2815) that the cursor is pointing to a selectable object, the process then determines (at 2820) whether the cursor was pointing to this selectable object the last time that the process 2800 was called. If not, the process (at 2825) (1) records a start time t1 to be equal to the time stamp recorded at 2810, (2) specifies the viewed selectable object as the selectable object currently pointed to by the cursor, (3) initializes a delta t1 (Δt1) variable to zero, (4) sets a previous point variable to null, and (5) transitions to 2835. Otherwise, the process calculates (at 2830) the Δt1 by subtracting the current time stamp from the start time t1, which represents the time when the cursor first pointed to the selectable object. The process then transitions to 2835.

At 2835, the process determines whether the mouse activity was a mouse-button click. If so, the process carries out (at 2840) the click operation, and generates a record of the click activity. In some embodiments, the generated record indicates the type of click activity, the selectable object currently pointed to by the cursor, and the time for the click activity. The process then calls (at 2865) the reporting application to report the generated click-activity record. The interactive-navigation and time-measurement applications 1010 and 1005 then use this information to populate the records in their tables. These tables include the inav_stat_table, the inav_member_stat_table, the inav_vmsg_member_stat_table, the inav_vmsg_stat_table, the time_table, the time_stat_table, the time_member_stat_table, and the time_member_session_table.

If the process determines (at 2835) that the mouse activity was not a click activity, the process determines (at 2845) whether the calculated Δt1 is greater than a pre-specified passive timer value. If not, the process ends. Otherwise, the process determines (at 2850) whether the calculated Δt1 is greater than a pre-specified auto-click timer. If so, the process performs (at 2860) the auto click operation on the selectable object currently pointed to by the cursor. The process also generates (at 2860) a record of the auto-click activity, which in some embodiments is similar to the record described above for the click activity. It then calls (at 2865) the reporting application to report the generated auto-click activity to the computer system. The interactive-navigation and time-measurement applications 1010 and 1005 then use this information to populate the records in their tables, as described above.

If the process determines (at 2850) that the calculated Δt1 is not greater than the pre-specified auto click timer, the process generates (at 2855) a record of a passive-click activity, which in some embodiments is similar to the record described above for the click activity. It then calls (at 2865) the reporting application to report the generated passive-click activity to the computer system. The interactive-navigation and time-measurement applications 1010 and 1005 then use this information to populate the records in their tables, as described above. The computer system uses the passive-click functionality to gauge whether the user had some interest on an object, even though the user did not select the object.

Figure 29:
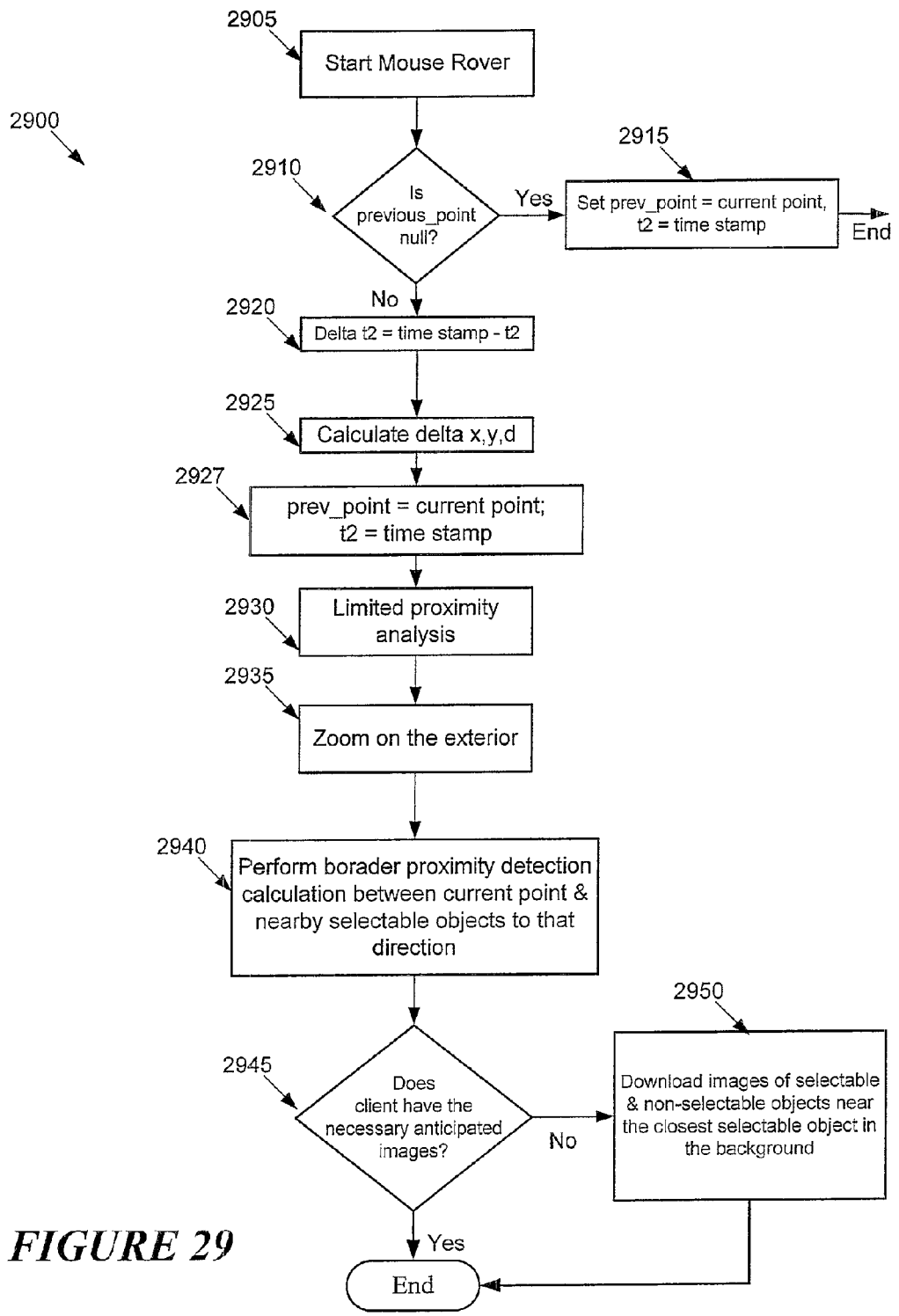
FIG. 29 presents a process performed by the mouse-rover application.

FIG. 29 presents a process 2900 performed by the mouse-rover application. This process starts (at 2905) when the click-monitoring application calls (at 2870) process 2900.

The process 2900 determines (at 2910) whether the previous_point variable is null. If so, the process (at 2915) (1) sets that previous_point variable equal to the current cursor location at position x, y, and (2) sets an initial time variable t2 equal to the current time stamp. After 2915, the process 2900 terminates.

On the other hand, if the process 2900 determines (at 2910) that the previous_point variable is not null, the process calculates (at 2920) the time differential between the current mouse activity and the mouse activity that resulted in the setting of previous_point variable. In other words, the process calculates (at 2920) a delta t2 ($\Delta t2$) by subtracting the current time stamp from the initial time t2 (where t2 indicates the time at which the previous_point variable was set at 2195).

Next, the process calculates (at 2925) the $\Delta x$ and $\Delta y$, and the distance vector. The process calculates the $\Delta x$ and $\Delta y$ values by subtracting the x- and y-coordinates of the previous position respectively from the x and y-coordinates of the current position. The process calculates the distance vector by using the $\Delta x$ and $\Delta y$ values. The magnitude of the distance vector is obtained by squaring the resulting x and y subtractions, adding these squared values, and taking their square root. The direction of the distance vector is obtained by dividing $\Delta y$ by $\Delta x$, and taking the inverse tan of this division. As further described below, the process uses (at 2930 and 2935) the computed distance vector and $\Delta t2$ values to perform a proximity analysis and a zooming operation.

The process then sets (at 2927) the prev_point variable to the current point, and start time variable t2 to the current time. Next, the process performs a proximity analysis (at 2930) to calculate the speed of the cursor movement. The speed of the cursor movement can be computed by dividing the magnitude of the distance vector by the $\Delta t2$. The limited proximity analysis also uses the direction of this movement (which is the same as the direction of the distance vector) to identify the next closest selectable object in the cursor's path. To identify this object, the analysis might also use the speed of the cursor movement.

Next, at 2935, the process enlarges the identified next selectable object depending on a variety of criteria. For instance, some embodiments of process 2900 decide whether to enlarge the identified selectable object based on the proximity of the cursor to the object, the speed at which the cursor approaches the object, and the nature of the object (e.g., the object's type). Some embodiments enlarge the identified selectable object by scaling the image of the object. The process identifies the image for the object by examining the object's record that the process downloads from the inav_table. The object's record is identified by the object's inav_id (i.e., the object identification in the computer system's database). The inav_image field in the object's record points to the object's image, which the process also downloads from the computer system.

The process then performs (at 2940) a broader proximity detection operation to identify the selectable and non-selectable objects near the cursor's current and expected positions. The process then determines (at 2945) whether the client application has already downloaded data (e.g., image data) for the identified selectable and non-selectable objects near the cursor's current and expect positions. If so, the process terminates. If not, the process performs (at 2950) a preloading operation to download the image data that it does not have. The process then terminates. The client application displays in real-time the preloaded data (for the identified selectable and non-selectable objects near the cursor's current expected positions) only if the user completes his or her movement in that direction.

As described above, the click-monitoring application reports to the computer system the click, auto-click, and passive-click activities of the user for the selectable objects in the mall, along with the user's member id. The computer system's interactive-navigation and time-measurement applications 1010 and 1005 then use the information supplied by the click monitoring application, along with the session date, to populate their statistical tables. These tables include the inav_stat_table, the inav_member_stat_table, the inav_vmsg_member_stat_table, the inav_vmsg_stat_table, the time_table, the time_stat_table, the time_member_stat_table, and the time_member_session_table.

In this manner, the computer system monitors and stores the user's active, auto, and passive clicking on selectable objects. These clicking activities are indicative of the users active and passive viewing of selectable objects. The computer system can then analyze this viewing information to dynamically generate a profile for the user's actual or potential interests, preferences, and habits. Based on this dynamically generated profile, the computer system can then dynamically modify its interactions with the user. For instance, the computer system can modify the presentation of selectable objects in the mall to the user. The system can display more prominently, in the mall, the stores, or the departments, the type of objects that the user has previously selected or passively viewed. The system can more prominently display objects by placing them in more visible locations (e.g., placing them closer to the entrance of the mall, the stores, or the departments) and/or by enlarging the image of the objects.

Some embodiments of the invention also dynamically modify the presentation of the objects in the mall by changing the language used for signs and used by virtual-sales force in the mall. The system can make this dynamic adjustment by examining the member's profile and noting that the member is more responsive to signs or sales pitches in certain languages. Alternatively, the system can make this adjustment based on the information that the member provides when he or she registers as a member.

In addition, some embodiments of the invention also dynamically modify the presentation of the objects in the mall based on the requests and advertising fees from the merchants who sell products and services through the system's shopping sites. For example, a merchant can pay greater advertising fees so that the mall more prominently positions the merchant's store or the stores more prominently position the merchant's products.

In some embodiments of the invention, certain items in the shopping mall are free, as indicated by the free_item field of their record in the item_property table. For instance, an interactive salesperson might appear as a shopper browses an item that has been secretly designated as a free item. The interactive salesperson then provides a sales pitch about the merchant or the item. At the end of the sales pitch, the shopper is informed that he or she has received the item for free. If the shopper terminates the presentation before it is completed, the shopper will be disqualified from receiving the item for free. This is to encourage shoppers to listen to all sales presentations in the hope of receiving a free item at the end of the presentations.

In some embodiments of the invention, some or all the selectable objects in the mall are dynamic objects. A dynamic object is a selectable object that has an associated audio and/or visual presentation regarding the object. Interactive navigation table (the inav_table) contains a link to the object's property table (such as the forum_property_table, store_property_table, or item_property_table), which contains the object's audio and/or video presentation or a link to this presentation. The computer system provides this presentation to a member that selects the dynamic object through a click or auto-click operation.

Some embodiments of the invention present detailed virtual sales presentations for certain selectable objects. As shown in FIG. 12, the inav_vmsg_table contains links to object property tables (such as the forum_property_table, store_property_table, or item_property_table), which contain virtual sales presentation or a link to this presentation.

Hence, the computer system can present an audio and/or video sales guide presentation for a selectable object if the object has such a presentation associated with it. In some embodiments, the system provides this presentation when the user manually asks for this presentation (e.g., through a click or auto-click operation on a GUI button for this presentation). The system might also automatically provide the sales presentation for an object in certain situations.

As mentioned above, some embodiments of the invention present virtual sales people in a graphical format to the members. In some embodiments, the virtual sales people can be the animated representation of actual sales people who interact with the members through the computer system. In other embodiments, the virtual sales people are not graphical representations of actual sales people. Instead, they are only a computer generated and controlled sales force.

In some embodiments of the invention, the virtual sales force reviews the member profiles to determine how to best approach and/or entice the members. For instance, in the embodiments where the virtual sales people represent actual sales people, the actual sales people can review the member's profile to formulate the best approach. On the other hand, in the embodiments where only the computer system controls the virtual sales force, the computer system can review the member's profile to improve the interactions of its virtual sales force with the member.

VI. Lottery Purchase.

Some embodiments of the invention's computer system also sell lottery tickets for one or more states through the Internet. State lottery sales are often restricted to individuals who are in the state at the time that they purchase the lottery tickets. Hence, the computer system needs to make sure that the individual who is purchasing a state's lottery through the Internet is currently located within that state at the time of the transaction.

To ensure this, some embodiments through the Internet provide to each prospective lottery player a code and a telephone number of the computer system. These embodiments ask the player or the player's computer to call the number and supply the code within a pre-specified time interval. The player or the player's computer can supply the code by verbally stating or dialing the code, or using another mechanism to convey the code, once the telephone session has been successfully established. In these embodiments, the player or the player's computer cannot provide the pass code when the telephone number is dialed from outside of the state, which offers the lottery that the player wants to purchase. For instance, in some embodiments, the computer system or the telephone company rejects calls to the supplied telephone number from outside of the state.

FIG. 30 illustrates an architecture diagram for a computer system 3000 used to sell state lottery in such a fashion. The architecture of computer system 3000 is identical to the computer system architecture presented in FIG. 6, with the exception that computer system 3000 also includes a location verification server ("LVS") 3030 and a phone-based system 3025.

As shown in FIG. 30, the LVS 3030 connects to the reverse proxy server, so that it can receive through the proxy server the pass code mentioned above. This server 3030 also communicatively couples to the phone-based system 3025. This system 3025 communicatively connects the server 3030 to the users who call the server by using the supplied telephone numbers. In some embodiments, the phone-based system 3025 is a modem pool. However, other phone-based systems can also be used to communicate with members or their computers.

In some embodiments, a member calls the system 3025 through a phone 3020. Some embodiments also allow a member to instruct his or her computer to dial the telephone number supplied by the server. In addition, in some embodiments, the member's computer automatically dials the supplied telephone number. Furthermore, once a telephone session has been established, the member provides the pass code. The member's computer can also provide the pass code automatically or upon the instruction of the member. In addition, the member can use any number of computing devices (e.g., desktop or laptop computer 605, Internet appliance 610, mobile phone 615, pager 620, and PDA 625) to purchase lottery from the computer system 3000.

FIG. 31 illustrates a process 3100 that the computer system 3000 performs to allow a member to purchase a state's lottery through the Internet. In some embodiments of the invention, this process is performed by a lottery application that runs on one of the application servers. This lottery application is one of the gaming applications 915 illustrated in FIG. 9.

The process starts (at 3105) when the member tries to purchase lottery from the member's state through the computer system. The process then retrieves (at 3110) the member's data (such as age and residence) from the member tables. Based on this retrieved data, the process then determines (at 3115) whether the member is eligible to purchase the requested state lottery.

Some embodiments prevent members from purchasing lottery if they have not verified the data that they previously provided to the system to register as members. For instance, some embodiments require the members to have verified their information by submitting written documentation about themselves (e.g., about their age and residence). As described above, the system requires members to submit such written documentation after winning a game show. Alternative embodiments might verify member data by accessing government agency databases (e.g., the motor vehicle bureau) and checking the member data against the information in these databases. Yet other embodiments might populate the member data only through government agency databases. Still other embodiments might employ more lax measures to confirm the member data.

If the process reviews the member data (such as age and residence data) and determines that the member is not eligible, the process so notifies the member and terminates. Otherwise, the process allows (at 3115) the member to access his state lottery game, which in some embodiments is hosted by the computer system 3000. The member then purchases (at 3120) tickets for a particular lottery game offered by the member's state. Next, the process determines (at 3125) whether the member has finished purchasing lottery tickets. If not, the process transitions to 3115 to allow the member to access again the state lottery game. Otherwise, the process determines (at 3130) whether the member passes the physical location verification.

The process 3100 performs the physical-location verification (at 3130) to ensure that the member who is purchasing a state's lottery through the Internet is physically located in that state during the lottery purchase transaction. The verification process is further explained below by reference to FIG. 32.

If the process 3100 determines (at 3130) that the member is not currently located in the state, the process ends. Otherwise, the process connects (at 3135) to the state's lottery system. Next, the lottery application asks (at 3140) the state lottery system to generate the tickets requested by the member. At 3145, the process then determines whether the requested lottery game show is lotto. If so, the process presents (at 3150) the lotto's serial number to the member through the Internet, or sends this information via an electronic notification (such as an e-mail) to the member. Next, the lottery application records (at 3155) the lotto's serial number in its own database for 180 days in order to notify winners, and then transitions to 3160.

If the requested lottery game show is not lotto, the process allows the member to play (at 3165) the non-lotto game show. The process then determines (at 3170) whether the member won the game show. If so, the process follows (at 3175) the state's rules for paying winners, and then transitions to 3160. If the member lost, the process transitions to 3160.

At 3160, the process determines whether the member wishes to play additional lottery games. If so, the process transitions to 3115 to let the member access the state lottery game shows. Otherwise, the process terminates.

Figure 32:
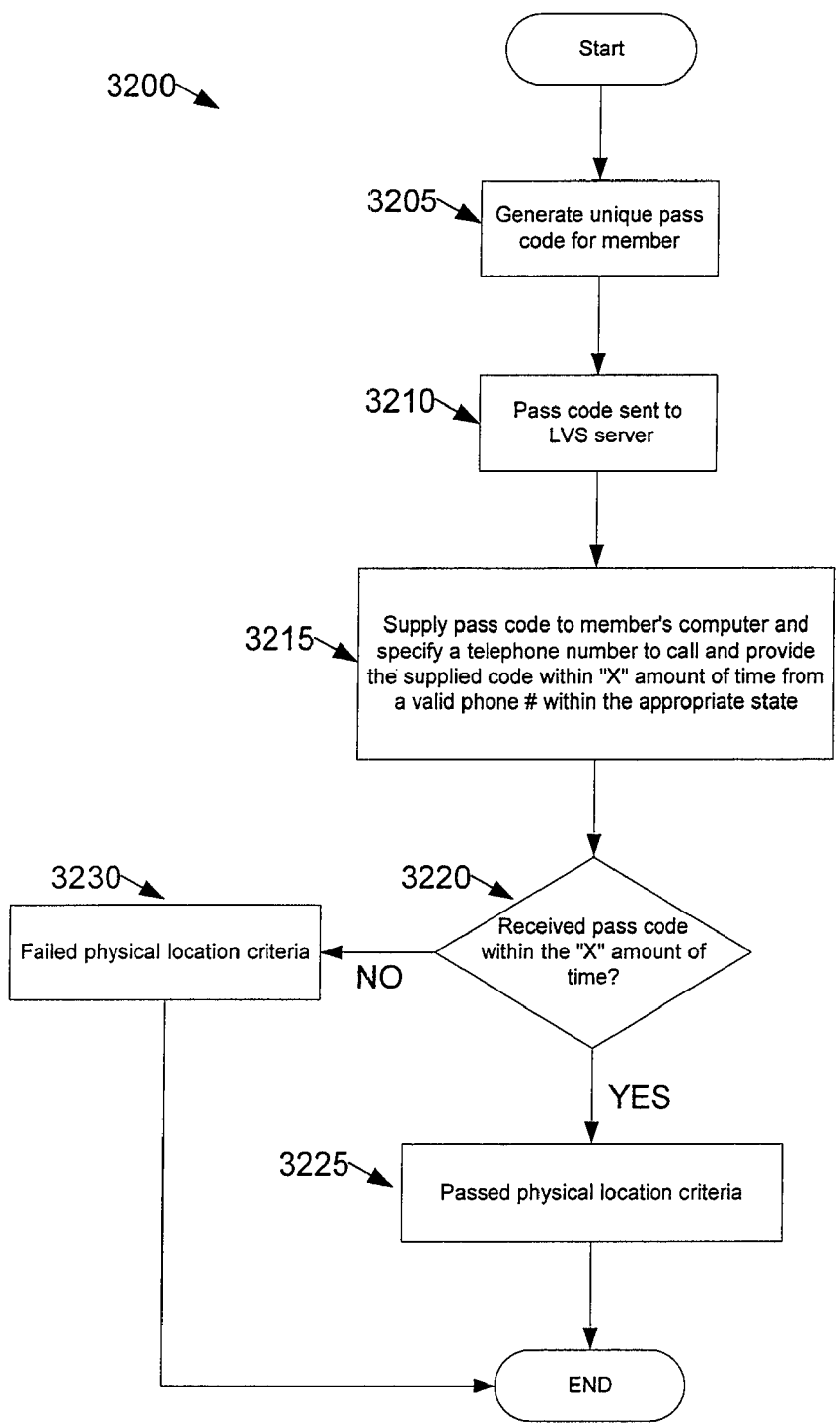
FIG. 32 illustrates a process that the computer system performs to ensure that the member who is purchasing a state's lottery from the computer system is currently located within that state.

FIG. 32 illustrates a process 3200 that ensures that the player who is purchasing a state's lottery through the Internet is physically located in that state during the lottery purchase transaction. This process initially generates (at 3205) a unique pass code for the member. In some embodiments, this pass code is generated randomly.

Next, the process provides (at 3210) this pass code to the LVS 3030. The process then transmits (at 3215) this pass code and a telephone number through the Internet to the player's computer. It also specifies that the player or the player's computer should dial the telephone number and supply the pass code within a predetermined amount of time.

The computer system 3000 or the telephone company rejects calls to the telephone number (supplied at 3215) from outside of the state, which offers the lottery that the player wants to purchase. Different embodiments of the invention use different techniques to identify and reject out-of-state calls. For instance, some embodiments use the caller ID functionality. In some of these embodiments, the LVS stores all the valid area codes for each state. The LVS then identifies the caller's telephone number through the caller ID functionality, and then compares the caller's telephone number with the stored codes to determine the location of the dialer. For lottery players who block their caller ID, the process 3200 informs the players to disable their caller ID block by pressing a particular code, so that the LVS 3030 can identify their telephone numbers.

Different embodiments respond differently to out-of-state calls identified through the caller ID functionality. Some embodiments ignore (i.e., do not answer) or disconnect out-of-state calls. Other embodiments answer the call, but notify the caller that the system cannot accept the pass code from a caller outside of the state. Some embodiments provide this notice after answering the call, while others provide this notice after the player or the player's computer provides the pass code.

Other embodiments of the invention do not use the caller ID functionality to identify and reject out-of-state calls. For instance, some embodiments supply different numbers (e.g., different 800 or 900 numbers) to the members of different states. In some of these embodiments, the telephone company then rejects calls into a state's number from telephone numbers outside of the state (e.g., the telephone company generate a busy signal or plays a recorded notice when a supplied telephone number for a state is dialed from outside of the state). In other embodiments, the telephone does not block out-of-state calls, but instead simply notifies the computer system 3000 that the call is being made from outside of the state; the system then decides whether it should ignore or disconnect the call, or whether it should answer the call and then notify the caller that the pass code cannot be submitted or accepted since the caller is outside of the state.

After providing (at 3215) the phone number and code, the process determines (at 3220) whether the LVS received the code within the pre-specified time interval. If so, the process indicates (at 3225) that the member passed the physical location verification. Otherwise, the process indicates (at 3230) that the member failed the physical location verification. In some embodiments of the invention, the pass code expires (i.e., becomes invalid) after the expiration of the pre-specified time interval. In other words, after the pre-specified time interval, the system permanently rejects the pass code or rejects it for a predetermined duration of time.

One of ordinary skill will understand that the process 3200 can be used in conjunction with many other Internet based application that need to verify their users' locations during their sessions. One of ordinary skill will also understand that other processes can be used to verify (at 3130) the member's location within the state. For instance, currently developing IP-verification processes can be used to verify the location of a member who contacts the computer system through the Internet.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method of determining whether a lottery player or player's computer is within a particular location, said player's computer is connected to a computer network, the method comprising the steps of:
   a) transmitting, through the computer network, a pass code and a telephone number to the lottery player's computer;
   b) requesting the lottery player or the player's computer to call the number and provide the pass code within a pre-determined amount of time;
   c) determining whether the pass code is provided within a predetermined amount of time after the transmission of the pass code from a telephone specified to be within the particular location; and
   d) verifying whether the lottery player or player's computer is within the particular location, based on the determination.

2. The method of claim 1 further comprising:
a) retrieving a caller identification number when the telephone number is dialed;
b) determining whether the caller identification number corresponds to a telephone number within the location;
c) if the identification number is from inside of the location, responding to the telephone call; and
d) if the identification number is from outside of the location, rejecting the telephone call.

3. The method of claim 2, wherein for cases where a telephone line of the dialer of the telephone number has caller-identification block, the method further comprising requesting the dialer to disable the caller identification block.

4. The method of claim 1, wherein a telephone company restricts calls from outside of the particular location to the supplied telephone number.

5. The method of claim 1 further comprising receiving a notice from a telephone company that a call to the supplied telephone number is from outside of the particular location.

6. The method of claim 1 further comprising rejecting the pass code when the pass code is not provided within the predetermined amount of time.

7. The method of claim 6, wherein the method rejects the pass code permanently.

8. The method of claim 6, wherein the method rejects the pass code for a pre-specified duration of time.

9. The method of claim 1, wherein said particular location is a state.

10. A computer readable medium storing a computer program for determining whether a lottery player or player's computer is within a particular location, said player's computer is connected to a computer network, said computer program comprising sets of instructions for:
a) transmitting, through the computer network, a pass code and a telephone number to the player's computer;
b) requesting the lottery player or the player's computer to call the number and provide the pass code within a pre-determined amount of time;
c) determining whether the pass code is provided within a predetermined amount of time after the transmission of the pass code from a telephone specified to be within the particular location;
d) verifying whether the lottery player or player's computer is within the particular location, based on the determination.

11. The computer readable medium of claim 10 further comprising sets of instructions for:
a) retrieving a caller identification number when the telephone number is dialed;
b) determining whether the caller identification number corresponds to a telephone number within the location;
c) if the identification number is from inside of the location, responding to the telephone call; and
d) if the identification number is from outside of the location, rejecting the telephone call.

12. The computer readable medium of claim 10, wherein for cases where a telephone line of the dialer of the telephone number has caller-identification block, said computer program further comprising a set of instructions for requesting the dialer to disable the caller identification block.

13. The computer readable medium of claim 10, wherein a telephone company restricts calls from outside of the particular location to the supplied telephone number.

14. The computer readable medium of claim 10 further comprising a set of instructions for receiving a notice from a telephone company that a call to the supplied telephone number is from outside of the particular location.

15. The computer readable medium of claim 10 further comprising a set of instructions for rejecting the pass code when the pass code is not provided within the predetermined amount of time.

16. The computer readable medium of claim 14, wherein said set of instructions rejects the pass code permanently.

17. The computer readable medium of claim 14, wherein said set of instructions rejects the pass code for a pre-specified duration of time.

* * * * *